US012367823B2

(12) United States Patent
Li et al.

(10) Patent No.: US 12,367,823 B2
(45) Date of Patent: Jul. 22, 2025

(54) DISPLAY SUBSTRATE AND DISPLAY APPARATUS

(71) Applicants: Chengdu BOE Optoelectronics Technology Co., Ltd., Sichuan (CN); BOE Technology Group Co., Ltd., Beijing (CN)

(72) Inventors: Yujing Li, Beijing (CN); Ming Hu, Beijing (CN); Xiangdan Dong, Beijing (CN); Cong Fan, Beijing (CN); Rong Wang, Beijing (CN); Zhenhua Zhang, Beijing (CN); Kemeng Tong, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/031,347

(22) PCT Filed: Jun. 2, 2022

(86) PCT No.: PCT/CN2022/096951
§ 371 (c)(1),
(2) Date: Apr. 11, 2023

(87) PCT Pub. No.: WO2023/231012
PCT Pub. Date: Dec. 7, 2023

(65) Prior Publication Data

US 2025/0029557 A1 Jan. 23, 2025

(51) Int. Cl.

| | |
|---|---|
| ***G09G 3/3233*** | (2016.01) |
| ***G09G 3/32*** | (2016.01) |
| ***G09G 3/3266*** | (2016.01) |

(52) U.S. Cl.
CPC ............ *G09G 3/3233* (2013.01); *G09G 3/32* (2013.01); *G09G 3/3266* (2013.01);
(Continued)

(58) Field of Classification Search
CPC ...... G09G 3/3233; G09G 3/32; G09G 3/3266; G09G 2310/0267; G09G 2310/0286; G09G 2310/08; G09G 2330/023
See application file for complete search history.

(56) References Cited

U.S. PATENT DOCUMENTS 10,629,133 B2 * 4/2020 Kim .................... H01L 27/1251
2009/0256831 A1 10/2009 Hsu et al.
(Continued)

FOREIGN PATENT DOCUMENTS

CN 106710525 A 5/2017
CN 107331297 A 11/2017
(Continued)

*Primary Examiner* — Doon Y Chow
(74) *Attorney, Agent, or Firm* — Ling Wu; Stephen Yang; Ling and Yang Intellectual Property

(57) ABSTRACT

Disclosed are a display substrate and a display apparatus, the display substrate includes a display region and a non-display region, the display substrate includes a base substrate and a circuit structure layer disposed on the base substrate, the circuit structure layer includes multiple pixel circuits arranged in an array and located in the display region and multiple drive circuits located in the non-display region. At least one pixel circuit includes multiple transistors and the multiple drive circuits are configured to provide drive signals to the multiple transistors; the circuit structure layer further includes: a high-level power supply line and a low-level power supply line located in the non-display region, at least one drive circuit is electrically connected with the high-level power supply line and the low-level power supply line respectively, and the high-level power
(Continued)

supply line and the low-level power supply line extend along a first direction.

18 Claims, 22 Drawing Sheets

(52) U.S. Cl.
CPC ............... *G09G 2310/0267* (2013.01); *G09G 2310/0286* (2013.01); *G09G 2310/08* (2013.01); *G09G 2330/023* (2013.01)

(56) References Cited

U.S. PATENT DOCUMENTS

| | | | | |
|---|---|---|---|---|
| 2010/0270550 | A1 | 10/2010 | Yen et al. | |
| 2017/0004771 | A1 | 1/2017 | Lee et al. | |
| 2017/0221423 | A1 | 8/2017 | Xiang et al. | |
| 2018/0166017 | A1* | 6/2018 | Li | H10K 59/12 |
| 2019/0165079 | A1* | 5/2019 | Cho | H10K 59/124 |
| 2020/0402466 | A1* | 12/2020 | Park | G09G 3/3266 |
| 2022/0077273 | A1 | 3/2022 | Qing et al. | |
| 2022/0187939 | A1* | 6/2022 | Lee | G06F 3/0416 |
| 2022/0309989 | A1 | 9/2022 | Zhou | |
| 2022/0376022 | A1 | 11/2022 | Du et al. | |

FOREIGN PATENT DOCUMENTS

| | | | |
|---|---|---|---|
| CN | 108520726 | A | 9/2018 |
| CN | 109389934 | A | 2/2019 |
| CN | 112017582 | A | 12/2020 |
| JP | 2003-308055 | A | 10/2003 |
| WO | 2022104576 | A1 | 5/2022 |

* cited by examiner

DISPLAY SUBSTRATE AND DISPLAY APPARATUS

CROSS-REFERENCE TO RELATED APPLICATION

The present application is a U.S. National Phase Entry of International Application No. PCT/CN2022/096951 having an international filing date of Jun. 2, 2022. The entire contents of the above-identified application are hereby incorporated by reference.

TECHNICAL FIELD

The present disclosure relates to, but is not limited to, the field of display technologies, in particular to a display substrate and a display apparatus.

BACKGROUND

An Organic Light Emitting Diode (OLED for short) and a Quantum dot Light Emitting Diode (QLED for short) are active light emitting display devices and have advantages such as self-luminescence, a wide viewing angle, a high contrast ratio, low power consumption, an extremely high response speed, lightness and thinness, flexibility, and low cost. With continuous development of display technologies, a flexible display apparatus (Flexible Display) in which an OLED or QLED is used as a light emitting element and signal control is performed through a Thin Film Transistor (TFT) has become a mainstream product in the field of display at present.

SUMMARY

The following is a summary of subject matters described herein in detail. The summary is not intended to limit the protection scope of claims.

In a first aspect, the present disclosure provides a display substrate including a display region and a non-display region. The display substrate includes: a base substrate and a circuit structure layer disposed on the base substrate, the circuit structure layer includes: multiple pixel circuits arranged in an array and located in the display region and multiple drive circuits located in the non-display region; at least one pixel circuit includes multiple transistors, the multiple drive circuits are configured to provide drive signals to the multiple transistors; the circuit structure layer further includes: a high-level power supply line and a low-level power supply line located in the non-display region, at least one drive circuit is electrically connected with the high-level power supply line and the low-level power supply line respectively, and the high-level power supply line and the low-level power supply line extend along a first direction; and high-level power supply lines connected with at least two drive circuits are a same power supply line and/or low-level power supply lines connected with at least two drive circuits are a same power supply line.

In some possible implementation modes, the display region includes: a first side and a second side disposed opposite to each other, and at least one drive circuit is located on the first side and/or the second side of the display region; the multiple drive circuits extend along a second direction, and the first direction intersects with the second direction.

In some possible implementation modes, the circuit structure layer includes: a semiconductor layer, a first insulation layer, a first conductive layer, a second insulation layer, a second conductive layer, a third insulation layer, a third conductive layer, a fourth insulation layer, and a fourth conductive layer that are sequentially stacked on the base substrate; the high-level power supply line and the low-level power supply line are located in the third conductive layer and/or the fourth conductive layer.

In some possible implementation modes, the circuit structure layer may further include: a fifth insulation layer and a fifth conductive layer; the fifth insulation layer and the fifth conductive layer are located between the second conductive layer and the third insulation layer, and the fifth insulation layer is located on a side of the fifth conductive layer close to the base substrate.

In some possible implementation modes, the multiple transistors include: a writing transistor, a compensation transistor, and a light emitting transistor, and the multiple drive circuits include: a light emitting drive circuit and a control drive circuit; the light emitting drive circuit is configured to provide a drive signal to the light emitting transistor, and the control drive circuit is configured to provide a drive signal to the writing transistor and/or the compensation transistor; a high-level power supply line connected with the light emitting drive circuit and a high-level power supply line connected with the control drive circuit are a same power supply line and/or a low-level power supply line connected with the light emitting drive circuit and a low-level power supply line connected with the control drive circuit are a same power supply line.

In some possible implementation modes, when the high-level power supply line connected with the light emitting drive circuit and the high-level power supply line connected with the control drive circuit are the same power supply line, an orthographic projection of the high-level power supply line on the base substrate is at least partially overlapped with an orthographic projection of the light emitting drive circuit or the control drive circuit on the base substrate, or is located between the light emitting drive circuit and the control drive circuit.

In some possible implementation modes, when the low-level power supply line connected with the light emitting drive circuit and the low-level power supply line connected with the control drive circuit are the same power supply line, an orthographic projection of the low-level power supply line on the base substrate is at least partially overlapped with an orthographic projection of the light emitting drive circuit or the control drive circuit on the base substrate, or is located between the light emitting drive circuit and the control drive circuit.

In some possible implementation modes, the light emitting drive circuit is located on a side of the control drive circuit away from the display region; the circuit structure layer further includes: a light emitting initial signal line, multiple light emitting clock signal lines, a control initial signal line, and multiple control clock signal lines which are located in the non-display region and extending along the first direction; the light emitting drive circuit is electrically connected with the light emitting initial signal line and the multiple light emitting clock signal lines respectively, and the control drive circuit is electrically connected with the control initial signal line and the multiple control clock signal lines respectively; the light emitting initial signal line and the multiple light emitting clock signal lines are located on a side of the control initial signal line and the multiple control clock signal lines away from the display region, and the light emitting initial signal line is located on a side of the multiple light emitting clock signal lines close to or away from the display region; and the control initial signal line is located on a side of the multiple control clock signal lines close to the display region or away from the display region.

In some possible implementation modes, the light emitting drive circuit includes multiple light emitting transistors and multiple light emitting capacitors, and the control drive circuit includes multiple control transistors and multiple control capacitors; the first conductive layer includes: gate electrodes of the multiple light emitting transistors, gate electrodes of the multiple control transistors, first electrode plates of the multiple light emitting capacitors, and first electrode plates of the multiple control capacitors; the second conductive layer includes: second electrode plates of the multiple light emitting capacitors and second electrode plates of the multiple control capacitors; the third conductive layer includes: source-drain electrodes of the multiple light emitting transistors and source-drain electrodes of the multiple control transistors; the fourth conductive layer includes a light emitting initial signal line, at least one light emitting clock signal line, a control initial signal line, and at least one control clock signal line.

In some possible implementation modes, the multiple transistors include: a writing transistor, a first reset transistor, a compensation transistor, and a light emitting transistor, transistor types of the first reset transistor and the compensation transistor are different from transistor types of the writing transistor and the light emitting transistor, the multiple drive circuits include: a light emitting drive circuit, a scan drive circuit, and a control drive circuit; the light emitting drive circuit is configured to provide a drive signal to the light emitting transistor, the control drive circuit is configured to provide a drive signal to the writing transistor, and the scan drive circuit is configured to provide a drive signal to the first reset transistor and/or the compensation transistor; high-level power supply lines connected with at least two adjacent drive circuits in the light emitting drive circuit, the scan drive circuit, and the control drive circuit are a same power supply line and/or low-level power supply lines connected with at least two adjacent drive circuits in the light emitting drive circuit, the scan drive circuit, and the control drive circuit are a same power supply line.

In some possible implementation modes, when the high-level power supply lines connected with two adjacent drive circuits in the light emitting drive circuit, the scan drive circuit, and the control drive circuit are the same power supply line, an orthographic projection of the high-level power supply line on the base substrate is partially overlapped with an orthographic projection of one of the drive circuits connected with the high-level power supply line on the base substrate, or is located between the connected two adjacent drive circuits; or, when high-level power supply lines connected with the light emitting drive circuit, the scan drive circuit, and the control drive circuit are a same power supply line, an orthographic projection of the high-level power supply line on the base substrate is partially overlapped with an orthographic projection of one of the drive circuits with which the high-level power supply line is connected on the base substrate, or is located between two adjacent drive circuits.

In some possible implementation modes, when the low-level power supply lines connected with two adjacent drive circuits in the light emitting drive circuit, the scan drive circuit, and the control drive circuit are the same power supply line, an orthographic projection of the low-level power supply line on the base substrate is partially overlapped with an orthographic projection of one of the drive circuits connected with the low-level power supply line on the base substrate, or is located between the connected two adjacent drive circuits; or, when low-level power supply lines connected with the light emitting drive circuit, the scan drive circuit, and the control drive circuit are a same power supply line, an orthographic projection of the low-level power supply line on the base substrate is partially overlapped with an orthographic projection of one of the drive circuits with which the low-level power supply line is connected on the base substrate, or is located between two adjacent drive circuits.

In some possible implementation modes, the light emitting drive circuit is located on a side of the scan drive circuit away from the display region, and the control drive circuit is located on a side of the scan drive circuit close to the display region; the circuit structure layer further includes a light emitting initial signal line, multiple light emitting clock signal lines, a control initial signal line, multiple control clock signal lines, a scan initial signal line, and multiple scan clock signal lines which are located in the non-display region and extending along the first direction; the light emitting drive circuit is electrically connected with the light emitting initial signal line and the multiple light emitting clock signal lines respectively, the control drive circuit is electrically connected with the control initial signal line and the multiple control clock signal lines respectively, and the scan drive circuit is electrically connected with the scan initial signal line and the multiple scan clock signal lines respectively; the light emitting initial signal line and the multiple light emitting clock signal lines are located on a side of the scan initial signal line and the multiple scan clock signal lines away from the display region, and the light emitting initial signal line is located on a side of the multiple light emitting clock signal lines close to the display region or away from the display region; the control initial signal line and the multiple control clock signal lines are located on a side of the scan initial signal line and the multiple scan clock signal lines close to the display region, and the control initial signal line is located on a side of the multiple control clock signal lines close to the display region or away from the display region; and the scan initial signal line is located on a side of the multiple scan clock signal lines close to the display region or away from the display region.

In some possible implementation modes, the light emitting drive circuit includes multiple light emitting transistors and multiple light emitting capacitors, the scan drive circuit includes multiple scan transistors and multiple scan capacitors, and the control drive circuit includes multiple control transistors and multiple control capacitors; the first conductive layer includes: gate electrodes of the multiple light emitting transistors, gate electrodes of the multiple scan transistors, gate electrodes of the multiple control transistors, first electrode plates of the multiple light emitting capacitors, first electrode plates of the multiple scan capacitors, and first electrode plates of the multiple control capacitors; the second conductive layer includes: second electrode plates of the multiple light emitting capacitors, second electrode plates of the multiple scan capacitors, and second electrode plates of the multiple control capacitors; the third conductive layer includes: source-drain electrodes of the multiple light emitting transistors, source-drain electrodes of the multiple scan transistors, and source-drain electrodes of the multiple control transistors; and the fourth conductive layer includes: a light emitting initial signal line, at least one light emitting clock signal line, a scan initial signal line, at least one scan clock signal line, a control initial signal line, and at least one control clock signal line.

In some possible implementation modes, the writing transistor and the light emitting control transistor are P-type transistors, and the first reset transistor and the compensation transistor are N-type metal oxide transistors.

In some possible implementation modes, the multiple transistors include: a writing transistor, a compensation transistor, a first reset transistor, a second reset transistor, and a light emitting transistor; the multiple drive circuits include a light emitting drive circuit, a first reset drive circuit, a second reset drive circuit, and a control drive circuit; the light emitting drive circuit is configured to provide a drive signal to the light emitting transistor, the control drive circuit is configured to provide a drive signal to the writing transistor and/or the compensation transistor, the first reset drive circuit is configured to provide a drive signal to the first reset transistor, and the second reset drive circuit is configured to provide a drive signal to the second reset transistor; and high-level power supply lines connected with at least two adjacent drive circuits in the light emitting drive circuit, the first reset drive circuit, the second reset drive circuit, and the control drive circuit are a same power supply line and/or low-level power supply lines connected with at least two adjacent drive circuits in the light emitting drive circuit, the first reset drive circuit, the second reset drive circuit, and the control drive circuit are a same power supply line.

In some possible implementation modes, when the high-level power supply lines connected with two adjacent drive circuits in the light emitting drive circuit, the first reset drive circuit, the second reset drive circuit, and the control drive circuit are the same power supply line, an orthographic projection of the high-level power supply line on the base substrate is partially overlapped with an orthographic projection of one of the drive circuits connected with the high-level power supply line on the base substrate, or is located between the connected two adjacent drive circuits; or, when high-level power supply lines connected with at least three adjacent drive circuits in the light emitting drive circuit, the first reset drive circuit, the second reset drive circuit, and the control drive circuit are a same power supply line, an orthographic projection of the high-level power supply line on the base substrate is partially overlapped with an orthographic projection of one of the drive circuits with which the high-level power supply line is connected on the base substrate, or is located between two adjacent drive circuits.

In some possible implementation modes, when the low-level power supply lines connected with two adjacent drive circuits in the light emitting drive circuit, the first reset drive circuit, the second reset drive circuit, and the control drive circuit are the same power supply line, an orthographic projection of the low-level power supply line on the base substrate is partially overlapped with an orthographic projection of one of the drive circuits connected with the low-level power supply line on the base substrate, or is located between the connected two adjacent drive circuits; or, when low-level power supply lines connected with at least three adjacent drive circuits in the light emitting drive circuit, the first reset drive circuit, the second reset drive circuit, and the control drive circuit are a same power supply line, an orthographic projection of the low-level power supply line on the base substrate is partially overlapped with an orthographic projection of one of the drive circuits with which the low-level power supply line is connected on the base substrate, or is located between two adjacent drive circuits.

In some possible implementation modes, the light emitting drive circuit is located on a side of the control drive circuit away from the display region, the first reset drive circuit is located between the light emitting drive circuit and the control drive circuit, and the second reset drive circuit is located on a side of the control drive circuit close to the display region; the circuit structure layer further includes a light emitting initial signal line, multiple light emitting clock signal lines, a control initial signal line, multiple control clock signal lines, a first reset initial signal line, multiple first reset clock signal lines, a second reset initial signal line, and multiple second reset clock signal lines which are located in the non-display region and extending along the first direction; the light emitting drive circuit is respectively electrically connected with the light emitting initial signal line and the multiple light emitting clock signal lines, the control drive circuit is respectively electrically connected with the control initial signal line and the multiple control clock signal lines, the first reset drive circuit is respectively electrically connected with the first reset initial signal line and the multiple first reset clock signal lines, and the second reset drive circuit is respectively electrically connected with the second reset initial signal line and the multiple second reset clock signal lines; the light emitting initial signal line and the multiple light emitting clock signal lines are located on a side of the first reset initial signal line and the multiple first reset clock signal lines away from the display region, and the light emitting initial signal line is located on a side of the multiple light emitting clock signal lines close to the display region or away from the display region; the first reset initial signal line and the multiple first reset clock signal lines are located on a side of the control initial signal line and the multiple control clock signal lines close to the display region, and the first reset initial signal line is located on a side of the multiple first reset clock signal lines close to the display region or away from the display region; the control initial signal line and the control clock signal lines are located on a side of the second reset initial signal line and the multiple second reset clock signal lines away from the display region, and the control initial signal line is located on a side of the multiple control clock signal lines close to the display region or away from the display region; and the second reset initial signal line is located on a side of the multiple second reset clock signal lines close to the display region or away from the display region.

In some possible implementation modes, the light emitting drive circuit includes: multiple light emitting transistors and multiple light emitting capacitors, the scan drive circuit includes multiple scan transistors and multiple scan capacitors, the first reset drive circuit includes multiple first reset transistors and multiple first reset capacitors, and the second reset drive circuit includes multiple second reset transistors and multiple second reset capacitors; the first conductive layer includes: gate electrodes of the multiple light emitting transistors, gate electrodes of the multiple control transistors, gate electrodes of the multiple first reset transistors, gate electrodes of the multiple second reset transistors, first electrode plates of the multiple light emitting capacitors, first electrode plates of the multiple control capacitors, first electrode plates of the multiple first reset capacitors, and first electrode plates of the multiple second reset capacitors; the second conductive layer includes: second electrode plates of the multiple light emitting capacitors, second electrode plates of the multiple control capacitors, second electrode plates of the multiple first reset capacitors, and second electrode plates of the multiple second reset capacitors; the third conductive layer includes source-drain electrodes of the multiple light emitting transistors, source-drain electrodes of the multiple control transistors, source-drain electrodes of the multiple first reset transistors, and source-drain electrodes of the multiple second reset transistors; and the fourth conductive layer includes a light emitting initial signal line, at least one light emitting clock signal line, a control initial signal line, at least one control clock signal line, a first reset initial signal line, at least one first reset clock signal line, a second reset initial signal line, and at least one second reset clock signal line.

In some possible implementation modes, a boundary of the display region includes: at least one arc-shaped boundary.

In a second aspect, the present disclosure also provides a display apparatus, including the above display substrate.

Other aspects may be understood upon reading and understanding drawings and detailed description.

BRIEF DESCRIPTION OF DRAWINGS

Accompanying drawings are used for providing further understanding of technical solutions of the present disclosure, constitute a part of the specification, and together with the embodiments of the present disclosure, are used for explaining the technical solutions of the present disclosure, but do not constitute limitations on the technical solutions of the present disclosure. Shapes and sizes of various components in the drawings do not reflect actual scales, but are only intended to schematically illustrate contents of the present disclosure.

DETAILED DESCRIPTION

Figure 1:
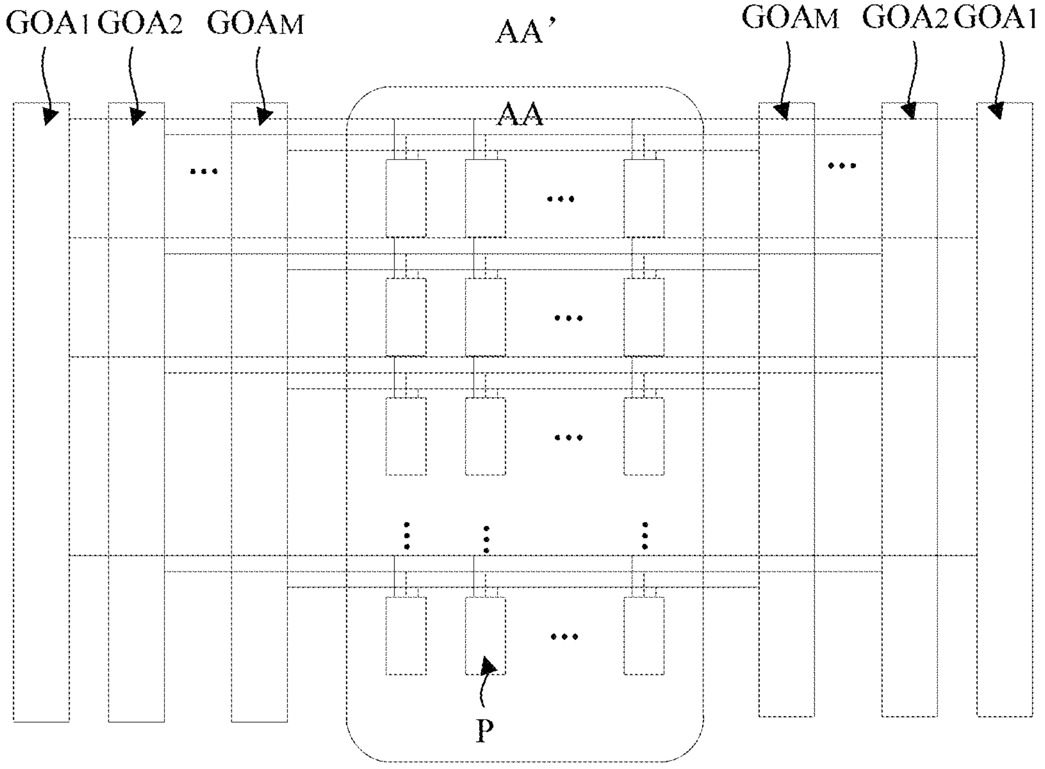
FIG. 1 is a schematic diagram of a structure of a display substrate according to an embodiment of the present disclosure.

To make objectives, technical solutions, and advantages of the present disclosure clearer, the embodiments of the present disclosure will be described in detail with reference to the accompanying drawings. It is to be noted that implementation modes may be implemented in multiple different forms. Those of ordinary skills in the art may easily understand such a fact that modes and contents may be transformed into various forms without departing from the purpose and scope of the present disclosure. Therefore, the present disclosure should not be explained as being limited to contents described in following implementation modes only. The embodiments in the present disclosure and features in the embodiments may be combined randomly with each other without conflict. In order to keep following description of the embodiments of the present disclosure clear and concise, detailed descriptions about part of known functions and known components are omitted in the present disclosure. The drawings of the embodiments of the present disclosure only involve structures involved in the embodiments of the present disclosure, and other structures may refer to usual designs.

A scale of the drawings in the present disclosure may be used as a reference in an actual process, but it is not limited thereto. For example, a width-length ratio of a channel, a thickness and a pitch of each film layer, and a width and a pitch of each signal line may be adjusted according to actual needs. A quantity of pixels in a display substrate and a quantity of sub-pixels in each pixel are not limited to numbers shown in the drawings. The drawings described in the present disclosure are structural schematic diagrams only, and one mode of the present disclosure is not limited to shapes, numerical values, or the like shown in the drawings.

Ordinal numerals such as “first”, “second”, and “third” in the specification are set to avoid confusion of constituent elements, but not to set a limit in quantity.

In the specification, for convenience, wordings indicating orientation or positional relationships, such as “middle”, “upper”, “lower”, “front”, “back”, “vertical”, “horizontal”, “top”, “bottom”, “inside”, and “outside”, are used for illustrating positional relationships between constituent elements with reference to the drawings, and are merely for facilitating the description of the specification and simplifying the description, rather than indicating or implying that a referred apparatus or element must have a particular orientation and be constructed and operated in the particular orientation. Therefore, they cannot be understood as limitations on the present disclosure. The positional relationships between the constituent elements are changed as appropriate according to directions for describing the various constituent elements. Therefore, appropriate replacements may be made according to situations without being limited to the wordings described in the specification.

In the specification, unless otherwise specified and defined explicitly, terms "mount", "mutually connect", and "connect" should be understood in a broad sense. For example, it may be a fixed connection, or a detachable connection, or an integrated connection. It may be a mechanical connection or an electrical connection. It may be a direct mutual connection, or an indirect connection through middleware, or internal communication between two elements. Those of ordinary skill in the art may understand specific meanings of these terms in the present disclosure according to specific situations.

In the specification, a transistor refers to an element which includes at least three terminals, i.e., a gate electrode, a drain electrode, and a source electrode. The transistor has a channel region between the drain electrode (drain electrode terminal, drain region, or drain) and the source electrode (source electrode terminal, source region, or source), and a current can flow through the drain electrode, the channel region, and the source electrode. It is to be noted that, in the specification, the channel region refers to a region through which the current mainly flows.

In the specification, a first electrode may be a drain electrode, and a second electrode may be a source electrode. Or, a first electrode may be a source electrode, and a second electrode may be a drain electrode. In a case that transistors with opposite polarities are used, in a case that a direction of a current is changed during operation of a circuit, or the like, functions of the "source electrode" and the "drain electrode" are sometimes interchangeable. Therefore, the "source electrode" and the "drain electrode" are interchangeable in the specification.

In the specification, an "electrical connection" includes a case that constituent elements are connected together through an element with a certain electrical effect. The "element with the certain electrical effect" is not particularly limited as long as electrical signals may be sent and received between the connected constituent elements. Examples of the "element with the certain electrical effect" not only include electrodes and wirings, but also include switching elements such as transistors, resistors, inductors, capacitors, other elements with various functions, etc.

In the specification, "parallel" refers to a state in which an angle formed by two straight lines is above −10° and below 10°, and thus also includes a state in which the angle is above −5° and below 5°. In addition, "perpendicular" refers to a state in which an angle formed by two straight lines is above 80° and below 100°, and thus also includes a state in which the angle is above 85° and below 95°.

In the specification, a "film" and a "layer" are interchangeable. For example, a "conductive layer" may be replaced with a "conductive film" sometimes. Similarly, an "insulation film" may be replaced with an "insulation layer" sometimes.

In this specification, "being disposed in a same layer" refers to a structure formed by patterning two (or more than two) structures through a same patterning process, and their materials may be the same or different. For example, materials of precursors forming multiple structures disposed in a same layer are the same, and final materials may be the same or different.

In the present disclosure, "about" refers to that a boundary is not defined so strictly and numerical values within process and measurement error ranges are allowed.

A display substrate has advantages of a high resolution, a high reaction speed, high brightness, and a high aperture ratio, etc., and has a wide application prospect. In order to get a better visual experience, a narrow bezel is a main development direction of display. A drive circuit is disposed in the display substrate to drive a pixel circuit to emit light, thereby achieving display. For the display substrate, a narrow bezel cannot be achieved.

Figure 2A:
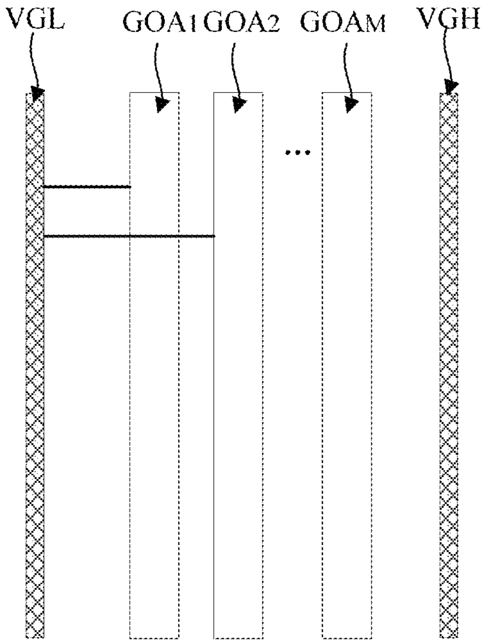
FIGS. 2A to 2C are schematic diagrams of connections between multiple drive circuits and power supply lines according to an exemplary embodiment.
Figure 2B:
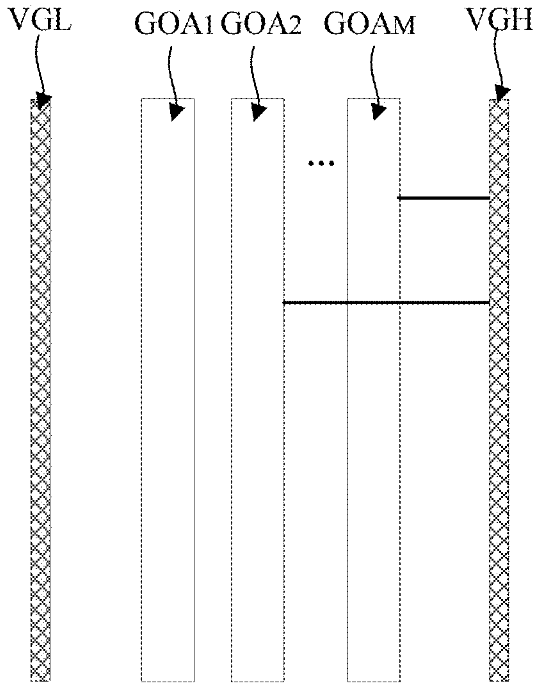
Figure 2C:
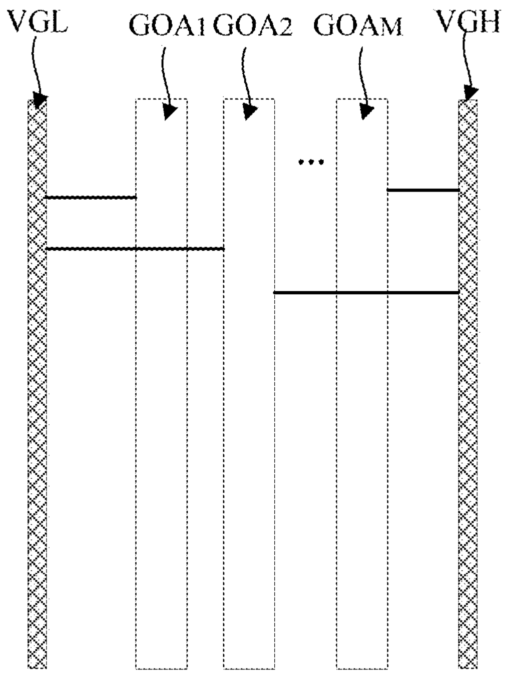

FIG. 1 is a schematic diagram of a structure of a display substrate according to an embodiment of the present disclosure. FIGS. 2A to 2C are schematic diagrams of connections between multiple drive circuits and power supply lines according to an exemplary embodiment. As shown in FIG. 1 and FIGS. 2A to 2C, the display substrate according to the embodiment of the present disclosure includes a display region AA and a non-display region AA', the display substrate includes a base substrate and a circuit structure layer disposed on the base substrate, the circuit structure layer includes multiple pixel circuits P arranged in an array and located in the display region and multiple drive circuits $GOA_1$ to $GOA_M$ located in the non-display region; at least one pixel circuit includes multiple transistors, and multiple drive circuits are disposed to provide drive signals to the multiple transistors.

In an exemplary embodiment, as shown in FIGS. 2A to 2C, the circuit structure layer further includes a high-level power supply line VGH and a low-level power supply line VGL located in the non-display region, and at least one drive circuit is electrically connected with the high-level power supply line VGH and the low-level power supply line VGL, respectively. Among them, the high-level power supply line VGH continuously provides a high-level signal, and the low-level power supply line VGL continuously provides a low-level signal.

In an exemplary embodiment, the high-level power supply line VGH and the low-level power supply line VGL extend along a first direction.

In an exemplary embodiment, as shown in FIG. 2A to FIG. 2C, high-level power supply lines connected with at least two drive circuits are a same power supply line and/or low-level power supply lines connected with at least two drive circuits are a same power supply line. FIG. 2A is illustrated by taking a case that high-level power supply lines connected with at least two drive circuits are a same power supply line as an example. FIG. 2B is illustrated by taking a case that low-level power supply lines connected with at least two drive circuits are a same power supply line as an example, FIG. 2C is illustrated by taking a case that high-level power supply lines connected with at least two drive circuits are a same power supply line and low-level power supply lines connected with at least two drive circuits are a same power supply line as an example.

In an exemplary embodiment, the display substrate of the present disclosure may be applied to a display apparatus with a pixel drive circuit, such as an OLED, a quantum dot display (QLED), a light emitting diode display (Micro LED or Mini LED), or a Quantum Dot Light Emitting Diode display (QDLED), which is not limited in the present disclosure.

In an exemplary embodiment, the display substrate may be a Low Temperature Polycrystalline Oxide (LTPO) display substrate or a Low Temperature Poly Silicon (LTPS) display substrate.

In an exemplary embodiment, the base substrate may be a rigid base substrate or a flexible base substrate, wherein the rigid base substrate may be, but is not limited to, one or more of glass and metal foil, the flexible base substrate may be, but is not limited to, one or more of polyethylene glycol terephthalate, ethylene terephthalate, polyether ether ketone, polystyrene, polycarbonate, polyarylate, polyarylester, polyimide, polyvinyl chloride, polyethylene, and textile fibers.

In an exemplary embodiment, a positional relationship of the multiple drive circuits may be determined according to a structure and functions of the display substrate, which is not limited in the present disclosure.

In an exemplary embodiment, the display substrate may further include a light emitting structure layer disposed on a side of the circuit structure layer away from the base substrate, and an encapsulation structure layer disposed on a side of the light emitting structure layer away from the base substrate.

In an exemplary embodiment, the light emitting structure layer includes light emitting elements located in the display region and arranged in an array. A light emitting element includes: a first electrode (anode), an organic emitting layer, and a second electrode (cathode). The anode is located on a side of the organic emitting layer close to the base substrate, and the cathode is located on a side of the organic emitting layer away from the base substrate; the light emitting element is electrically connected with the pixel circuit.

In an exemplary embodiment, the circuit structure layer may further include a second power supply line located in the non-display region, and the second power supply line is electrically connected with the cathode of the light emitting element.

In an exemplary embodiment, the light emitting element may be an Organic Light Emitting Diode (OLED) or a Quantum dot Light Emitting Diode (QLED).

In an exemplary embodiment, the organic emitting layer may include a Hole Injection Layer (HIL for short), a Hole Transport Layer (HTL for short), an Electron Block Layer (EBL for short), an Emitting Layer (EML for short), a Hole Block Layer (HBL for short), an Electron Transport Layer (ETL for short), and an Electron Injection Layer (EIL for short) that are stacked. In an exemplary embodiment, hole injection layers of all sub-pixels may be connected together to form a common layer, electron injection layers of all the sub-pixels may be connected together to form a common layer, hole transport layers of all the sub-pixels may be connected together to form a common layer, electron transport layers of all the sub-pixels may be connected together to form a common layer, hole block layers of all the sub-pixels may be connected together to form a common layer, emitting layers of adjacent sub-pixels may be overlapped slightly or may be isolated from each other, and electron block layers of adjacent sub-pixels may be overlapped slightly or may be isolated from each other.

In an exemplary embodiment, the display substrate may include another film layer, such as a touch control structure layer, which is not limited in the present disclosure.

In an exemplary embodiment, the pixel circuit may be of a 7TIC or 8TIC structure.

Figure 3:
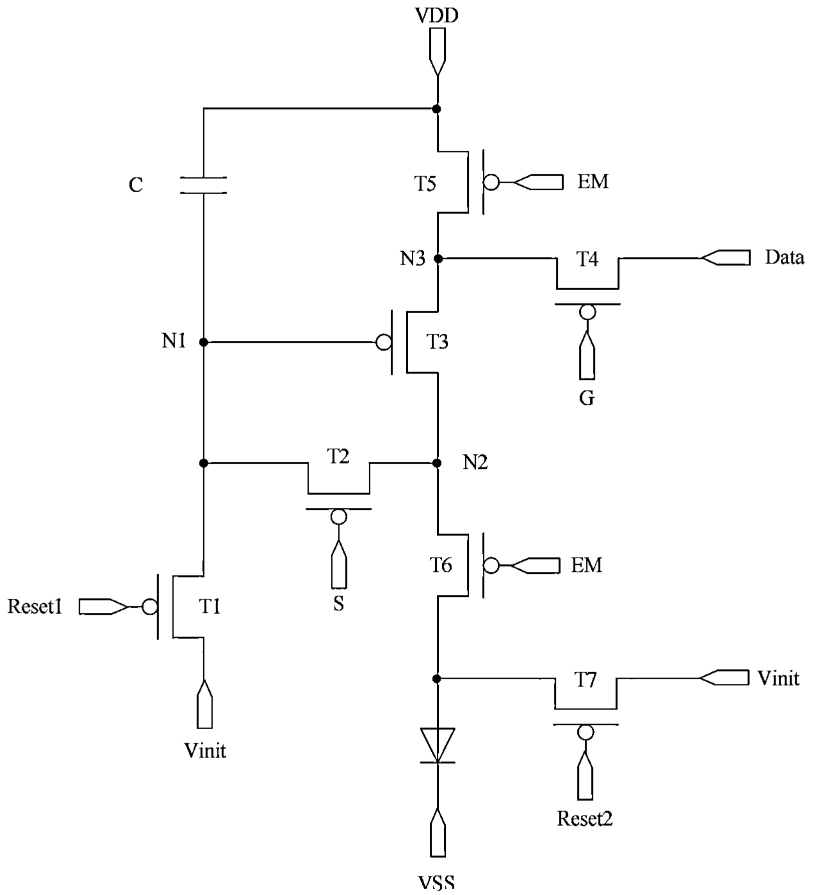
FIG. 3 is a schematic diagram of an equivalent circuit of a pixel circuit.

In an exemplary embodiment, FIG. 3 is a schematic diagram of an equivalent circuit of a pixel circuit. As shown in FIG. 3, the pixel circuit may include seven transistors (a first transistor T1 to a seventh transistor T7), one capacitor C, and nine signal terminals (a data signal terminal Data, a control signal terminal G, a scan signal terminal S, a first reset signal terminal Reset1, a second reset signal terminal Reset2, a light emitting signal terminal EM, an initial signal terminal Vinit, a first power supply terminal VDD, and a second power supply terminal VSS).

In an exemplary embodiment, a first electrode plate of the capacitor C is connected with the first power supply terminal VDD, and a second electrode plate of the capacitor C is connected with a first node N1. A control electrode of the first transistor T1 is connected with the reset signal terminal Reset, a first electrode of the first transistor T1 is connected with the initial signal terminal Vinit, and a second electrode of the first transistor is connected with the first node N1; a control electrode of the second transistor T2 is connected with the scan signal terminal S, a first electrode of the second transistor T2 is connected with the first node N1, and a second electrode of the second transistor T2 is connected with a second node N2. A control electrode of the third transistor T3 is connected with the first node N1, a first electrode of the third transistor T3 is connected with the second node N2, and a second electrode of the third transistor T3 is connected with a third node N3. A control electrode of the fourth transistor T4 is connected with the control signal terminal G, a first electrode of the fourth transistor T4 is connected with the data signal terminal Data, and a second electrode of the fourth transistor T4 is connected with the third node N3. A control electrode of the fifth transistor T5 is connected with the light emitting signal terminal EM, a first electrode of the fifth transistor T5 is connected with the first power supply terminal VDD, a second electrode of the fifth transistor T5 is connected with the third node N3; a control electrode of the sixth transistor T6 is connected with the light emitting signal terminal EM, a first electrode of the sixth transistor T6 is connected with the second node N2, and a second electrode of the sixth transistor T6 is connected with a first electrode of a light emitting device. A control electrode of the seventh transistor T7 is connected with the control signal terminal G, a first electrode of the seventh transistor T7 is connected with the initial signal terminal Vinit, a second electrode of the seventh transistor T7 is connected with the first electrode of the light emitting device, and a second electrode of the light emitting device is connected with the second power supply terminal VSS.

In an exemplary embodiment, the first transistor T1 may be referred to as a first reset transistor, and when an effective level signal is input to the first reset signal terminal Reset1, the first transistor T1 transmits an initialization voltage to the first node N1 to initialize a charge amount of the first node N1.

In an exemplary embodiment, the seventh transistor T7 may be referred to as a second reset transistor, and when an effective level signal is input to the second reset signal terminal Reset2, the seventh transistor T7 transmits an initialization voltage to an anode of a light emitting element to initialize a charge amount of the anode of the light emitting element.

In an exemplary embodiment, the second transistor T2 may be referred to as a compensation transistor, and when an effective level signal is input to the scan signal terminal S, the second transistor T2 transmits a signal of the second node to the first node N1 to compensate a control electrode of a drive transistor.

In an exemplary embodiment, the third transistor T3 may be referred to as a drive transistor. The third transistor T3 determines a drive current flowing between the first power supply terminal VDD and the second power supply terminal VSS according to a potential difference between the control electrode and the first electrode of the third transistor T3.

In an exemplary embodiment, the fourth transistor T4 may be referred to as a writing transistor, and when an effective level signal is input to the control signal terminal G, the fourth transistor T4 enables a data voltage of the data signal terminal Data to be input to the pixel circuit.

In an exemplary embodiment, the fifth transistor T5 and the sixth transistor T6 may be referred to as light emitting transistors. When an effective level signal is input to the light emitting signal terminal E, the fifth transistor T5 and the sixth transistor T6 enable a light emitting element to emit light by forming a path of a drive current between the first power supply line VDD and the second power supply line VSS.

In an exemplary embodiment, a signal of the first power supply terminal VDD is a high-level signal continuously provided, and a signal of the second power supply terminal VSS is a low-level signal.

In an exemplary embodiment, the first power supply terminal VDD is configured to continuously provide a high-level signal, and the second power supply terminal VSS is configured to continuously provide a low-level signal.

In an exemplary embodiment, the first reset signal terminal Reset1 and the second reset signal terminal Reset2 may be a same signal terminal, and the control signal terminal G and the scan signal terminal S may be a same signal terminal.

In an exemplary embodiment, the first transistor T1 to the seventh transistor T7 may be P-type transistors or N-type transistors. Using a same type of transistors in the pixel circuit may simplify a process flow, reduce process difficulties of a display panel, and improve a yield of products. Exemplarily, the first transistor T1 to the seventh transistor T7 may include a P-type transistor and an N-type transistor.

In an exemplary embodiment, for the first transistor T1 to the seventh transistors T7, a low temperature poly silicon thin film transistor may be adopted, or an oxide thin film transistor may be adopted, or a low temperature poly silicon thin film transistor and an oxide thin film transistor may be adopted. An active layer of a low temperature poly silicon thin film transistor may be made of Low Temperature Poly Silicon (LTPS for short), and an active layer of an oxide thin film transistor may be made of an oxide semiconductor (Oxide). The low temperature poly silicon thin film transistor has advantages such as a high migration rate and fast charging. The oxide thin film transistor has advantages such as a low leakage current. The low temperature poly silicon thin film transistor and the oxide thin film transistor are integrated on one display substrate to form a Low Temperature Polycrystalline Oxide (LTPO for short) display substrate, so that advantages of the low temperature poly silicon thin film transistor and the oxide thin film transistor may be utilized, low-frequency drive may be achieved, power consumption may be reduced, and display quality may be improved.

In an exemplary embodiment, the display substrate further includes a data signal line, a first reset signal line, a second reset signal line, a control signal line, a scan signal line, and a light emitting signal line. A first reset signal terminal of the pixel circuit is electrically connected with the first reset signal line, a second reset signal terminal is electrically connected with the second reset signal line, a control signal terminal is electrically connected with the control signal line, a scan signal terminal is electrically connected with the scan signal line, a light emitting signal terminal is connected with the light emitting signal line, and a data signal terminal is electrically connected with the data signal line. Among them, when the first reset signal terminal and the second reset signal terminal are a same signal terminal, the first reset signal line and the second reset signal line may be a same signal line, and when the control signal terminal and the scan signal terminal are a same signal terminal, the control signal line and the scan signal line may be a same signal line.

The display substrate according to the embodiment of the present disclosure includes a display region and a non-display region, the display substrate includes a base substrate and a circuit structure layer disposed on the base substrate, the circuit structure layer includes multiple pixel circuits arranged in an array and located in the display region and multiple drive circuits located in the non-display region; at least one pixel circuit includes multiple transistors, and multiple drive circuits are disposed to provide drive signals to the multiple transistors. the circuit structure layer further includes: a high-level power supply line and a low-level power supply line located in the non-display region, at least one drive circuit is electrically connected with the high-level power supply line and the low-level power supply line respectively, and the high-level power supply line and the low-level power supply line extend along a first direction; and high-level power supply lines connected with at least two drive circuits are a same power supply line and/or low-level power supply lines connected with at least two drive circuits are a same power supply line. According to the present disclosure, the high-level power supply lines connected with at least two drive circuits are the same power supply line and/or the low-level power supply lines connected with at least two drive circuits are the same power supply line, thus an area occupied by multiple drive circuits may be reduced and a narrow bezel may be achieved.

In an exemplary embodiment, the display region includes: a first side and a second side disposed opposite to each other, and at least one drive circuit is located on the first side and/or the second side of the display region. FIG. 1 is illustrated by taking a case that at least one drive circuit is located on the first side and the second side of the display region as an example.

In an exemplary embodiment, the multiple drive circuits extend along a second direction, and the first direction intersects with the second direction.

In an exemplary embodiment, the circuit structure layer includes a semiconductor layer, a first insulation layer, a first conductive layer, a second insulation layer, a second conductive layer, a third insulation layer, a third conductive layer, a fourth insulation layer, and a fourth conductive layer that are sequentially stacked on the base substrate. Among them, the high-level power supply line and the low-level power supply line may be located in the third conductive layer and/or the fourth conductive layer.

In an exemplary embodiment, the circuit structure layer may further include: a fifth insulation layer and a fifth conductive layer. Among them, the fifth insulation layer and the fifth conductive layer are located between the second conductive layer and the third insulation layer, and the fifth insulation layer is located on a side of the fifth conductive layer close to the base substrate.

In an exemplary embodiment, the circuit structure layer may further include a sixth insulation layer and a sixth conductive layer. Among them, the sixth insulation layer is located on a side of the fourth conductive layer away from the base substrate, and the sixth conductive layer is located on a side of the sixth insulation layer away from the base substrate.

Figure 4A:
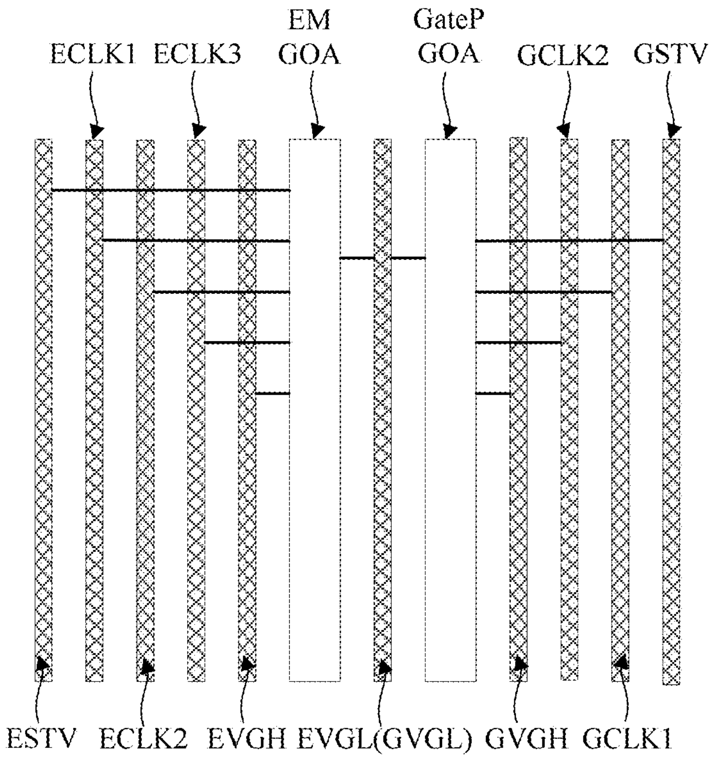
FIGS. 4A to 4C are partial schematic diagrams of a display substrate including two drive circuits according to an exemplary embodiment.
Figure 4B:
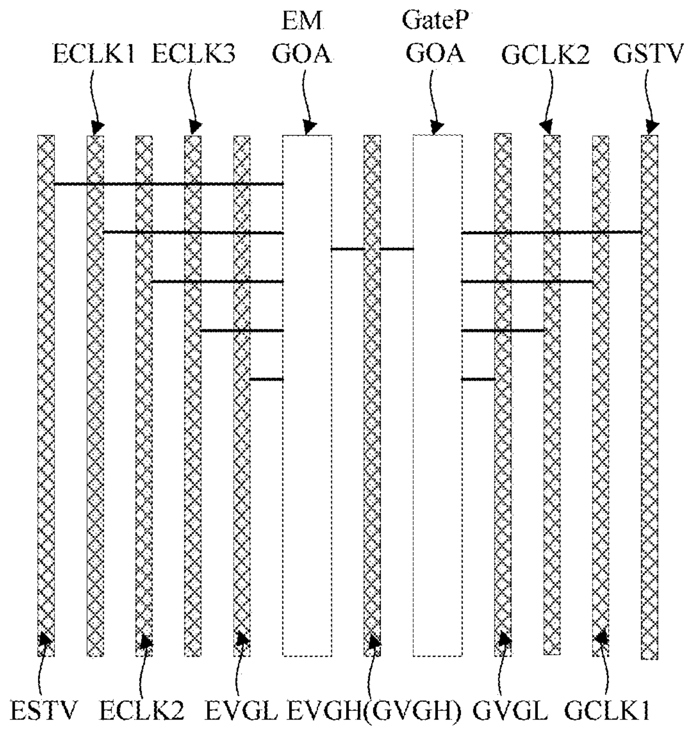
Figure 4C:
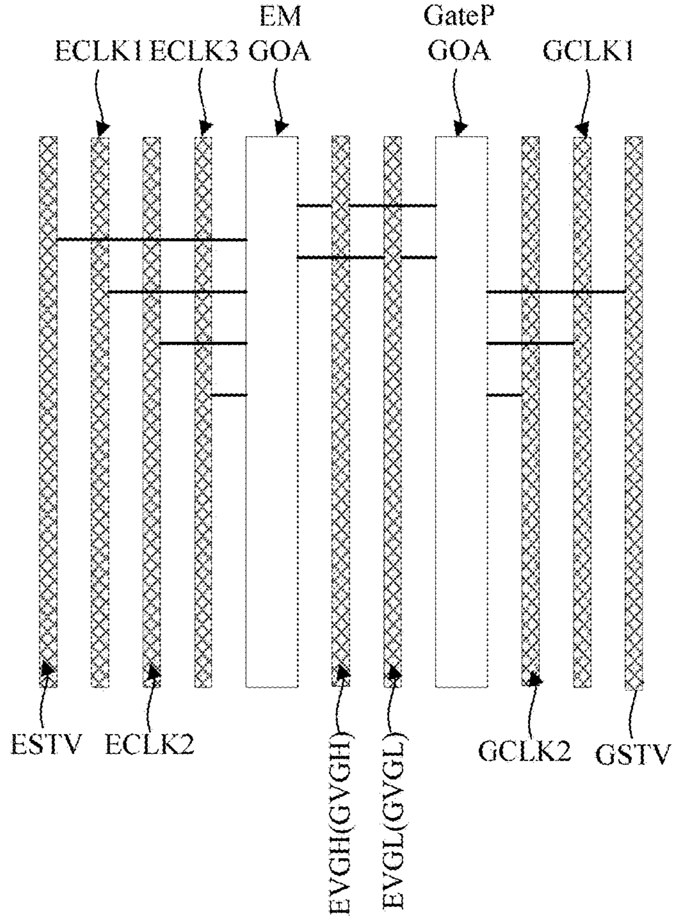

In an exemplary embodiment, FIG. 4A to FIG. 4C are partial schematic diagrams of a display substrate including two drive circuits according to an exemplary embodiment. As shown in FIG. 4A to FIG. 4C, when the display substrate is an LTPS display substrate, the writing transistor, the compensation transistor, and the light emitting transistor have a same type, the first reset signal terminal and the second reset signal terminal are a same signal terminal, and the control signal terminal and the scan signal terminal are a same signal terminal. The multiple drive circuits include a light emitting drive circuit EM GOA and a control drive circuit GateP GOA. Among them, the light emitting drive circuit EM GOA is configured to provide a drive signal to the light emitting transistor, and the control drive circuit GateP GOA is configured to provide a drive signal to the writing transistor and/or the compensation transistor.

In an exemplary embodiment, a high-level power supply line EVGH with which the light emitting drive circuit EM GOA is connected and a high-level power supply line GVGH with which the control drive circuit GateP GOA is connected are a same power supply line and/or a low-level power supply line EVGL with which the light emitting drive circuit EM GOA is connected and a low-level power supply line GVGL with which the control drive circuit GateP GOA is connected are a same power supply line.

FIG. 4A is illustrated by taking a case in which a low-level power supply line EVGL with which the light emitting drive circuit EM GOA is connected and a low-level power supply line GVGL with which the control drive circuit GateP GOA is connected are a same power supply line, and a high-level power supply line EVGH with which the light emitting drive circuit EM GOA is connected and a high-level power supply line GVGH with which the control drive circuit GateP GOA is connected are different power supply lines as an example. FIG. 4B is illustrated by taking a case in which a low-level power supply line EVGL with which the light emitting drive circuit EM GOA is connected and a low-level power supply line GVGL with which the control drive circuit GateP GOA is connected are different power supply lines, and a high-level power supply line EVGH with which the light emitting drive circuit EM GOA is connected and a high-level power supply line GVGH with which the control drive circuit GateP GOA is connected are a same power supply line as an example. FIG. 4C is illustrated by taking a case in which a low-level power supply line EVGL with which the light emitting drive circuit EM GOA is connected and a low-level power supply line GVGL with which the control drive circuit GateP GOA is connected are a same power supply line, and a high-level power supply line EVGH with which the light emitting drive circuit EM GOA is connected and a high-level power supply line GVGH with which the control drive circuit GateP GOA is connected are a same power supply line as an example.

In an exemplary embodiment, when a high-level power supply line connected with the light emitting drive circuit and a high-level power supply line connected with the control drive circuit are a same power supply line, an orthographic projection of the high-level power supply line on the base substrate is at least partially overlapped with an orthographic projection of the light emitting drive circuit or the control drive circuit on the base substrate, or is located between the light emitting drive circuit and the control drive circuit. The orthographic projection of the high-level power supply line on the base substrate is at least partially overlapped with the orthographic projection of the light emitting drive circuit or the control drive circuit on the base substrate, or is located between the light emitting drive circuit and the control drive circuit, thus an area occupied by multiple drive circuits may be reduced and a narrow bezel may be achieved.

In an exemplary embodiment, when a low-level power supply line connected with the light emitting drive circuit and a low-level power supply line connected with the control drive circuit are a same power supply line, an orthographic projection of the low-level power supply line on the base substrate is at least partially overlapped with an orthographic projection of the light emitting drive circuit or the control drive circuit on the base substrate, or is located between the light emitting drive circuit and the control drive circuit. The orthographic projection of the low-level power supply line on the base substrate is at least partially overlapped with the orthographic projection of the light emitting drive circuit or the control drive circuit on the base substrate, or is located between the light emitting drive circuit and the control drive circuit, thus an area occupied by multiple drive circuits may be reduced and a narrow bezel may be achieved.

In an exemplary embodiment, a positional relationship between the control drive circuit and the light emitting control circuit may be determined according to the structure and functions of the display substrate, and the light emitting drive circuit EM GOA may be located on a side of the control drive circuit GateP GOA away from the display region.

In an exemplary embodiment, as shown in FIGS. 4A to 4C, the circuit structure layer further includes: a light emitting initial signal line ESTV located in the non-display region and extending along the first direction, multiple light emitting clock signal lines, a control initial signal line GSTV, and multiple control clock signal lines; the light emitting drive circuit is electrically connected with the light emitting initial signal line ESTV and multiple light emitting clock signal lines respectively, and the control drive circuit is electrically connected with the control initial signal line GSTV and multiple control clock signal lines respectively. FIGS. 4A to 4C are illustrated by taking a case of three light emitting clock signal lines ECLK1 to ECLK3 and two control clock signal lines GCLK1 and GCLK2 as an example.

In an exemplary embodiment, as shown in FIGS. 4A to 4C, the light emitting initial signal line ESTV and multiple light emitting clock signal lines ECLK1 to ECLK3 are located on a side of the control initial signal line GSTV and multiple control clock signal lines GCLK1 and GCLK2 away from the display region, and the light emitting initial signal line ESTV is located on a side of the multiple light emitting clock signal lines ECLK1 to ECLK3 close to the display region or away from the display region. The control initial signal line GSTV is located on a side of the multiple control clock signal lines GCLK1 and GCLK2 close to the display region or away from the display region. FIGS. 4A to 4C are illustrated by taking a case in which the light emitting initial signal line ESTV is located on a side of multiple light emitting clock signal lines ECLK1 to ECLK3 away from the display region, and the control initial signal line GSTV is located on a side of multiple control clock signal lines GCLK1 and GCLK2 close to the display region as an example. A positional relationship among the light emitting initial signal line ESTV, the multiple light emitting clock signal lines, the control initial signal line GSTV, and the multiple control clock signal lines may be determined according to the structure and functions of the display substrate, which is not limited in the present disclosure.

In an exemplary embodiment, the light emitting drive circuit includes multiple light emitting transistors and multiple light emitting capacitors, and the control drive circuit includes multiple control transistors and multiple control capacitors. Among them, a first conductive layer includes: gate electrodes of multiple light emitting transistors, gate electrodes of multiple control transistors, first electrode plates of multiple light emitting capacitors, and first electrode plates of multiple control capacitors; a second conductive layer includes: second electrode plates of multiple light emitting capacitors and second electrode plates of multiple control capacitors; a third conductive layer includes: source-drain electrodes of multiple light emitting transistors and source-drain electrodes of multiple control transistors; a fourth conductive layer includes a light emitting initial signal line, at least one light emitting clock signal line, a control initial signal line, and at least one control clock signal line.

In an exemplary embodiment, the light emitting drive circuit may include multiple cascaded light emitting shift registers, at least one light emitting shift register includes multiple light emitting control transistors and multiple light emitting capacitors, and at least one stage light emitting shift register is electrically connected with at least one light emitting signal line.

In an exemplary embodiment, the light emitting shift register may include multiple light emitting control transistors and multiple light emitting capacitors. A circuit structure of the light emitting shift register may be 14T3C, 13T3C, or 10T3C, which is not limited in the present disclosure.

Figure 5A:
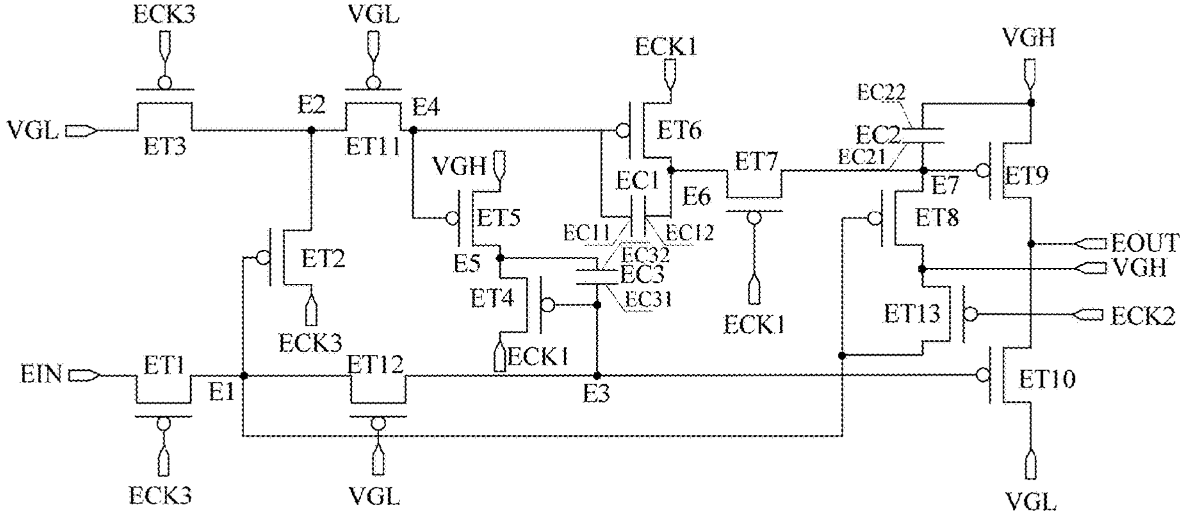
FIG. 5A is an equivalent circuit diagram of a light emitting shift register according to an exemplary embodiment.
Figure 5B:
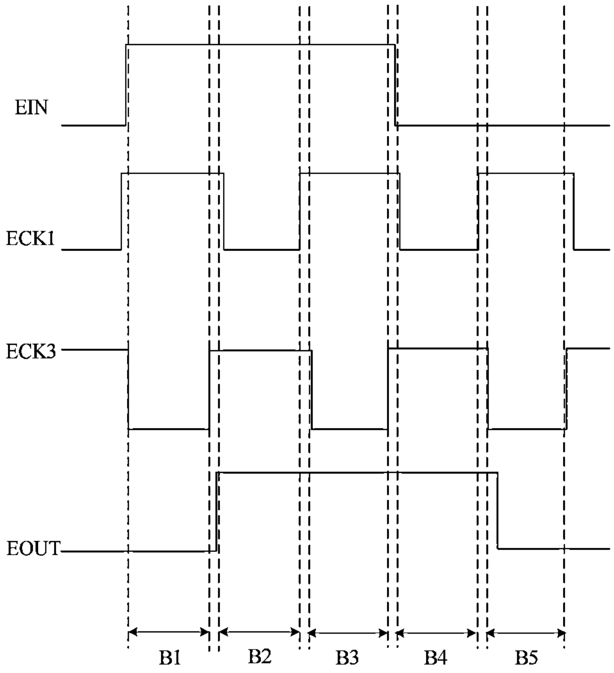
FIG. 5B is a timing diagram of the light emitting shift register provided in FIG. 5A.

FIG. 5A is an equivalent circuit diagram of a light emitting shift register according to an exemplary embodiment, and FIG. 5B is a timing diagram of the light emitting shift register provided in FIG. 5A. As shown in FIG. 5A, in the exemplary embodiment, the light emitting shift register includes a first light emitting control transistor ET1 to a thirteenth light emitting control transistor ET13 and a first light emitting capacitor EC1 to a third light emitting capacitor EC3.

In an exemplary embodiment, a control electrode of the first light emitting control transistor ET1 is electrically connected with a third clock signal terminal ECK3, a first electrode of the first light emitting control transistor ET1 is electrically connected with an input terminal EIN, and a second electrode of the first light emitting control transistor ET1 is electrically connected with a first node E1. A control electrode of the second light emitting control transistor ET2 is electrically connected with the first node E1, a first electrode of the second light emitting control transistor ET2 is electrically connected with the third clock signal line ECK3, and a second electrode of the second light emitting control transistor ET2 is electrically connected with a second node E2. A control electrode of the third light emitting control transistor ET3 is electrically connected with the third clock signal line ECK3, a first electrode of the third light emitting control transistor ET3 is electrically connected with a second power supply terminal VGL, and a second electrode of the third light emitting control transistor ET3 is electrically connected with the second node E2. A control electrode of the fourth light emitting control transistor ET4 is electrically connected with a third node E3, a first electrode of the fourth light emitting control transistor ET4 is electrically connected with a first clock signal terminal ECK1, and a second electrode of the fourth light emitting control transistor ET4 is electrically connected with a fifth node E5. A control electrode of the fifth light emitting control transistor ET5 is electrically connected with a fourth node E4, a first electrode of the fifth light emitting control transistor ET5 is electrically connected with the fifth node E5, and a second electrode of the fifth light emitting control transistor ET5 is electrically connected with a first power supply terminal VGH. A control electrode of the sixth light emitting control transistor ET6 is electrically connected with the fourth node E4, a first electrode of the sixth light emitting control transistor ET6 is electrically connected with the first clock signal terminal ECK1, and a second electrode of the sixth light emitting control transistor ET6 is electrically connected with a sixth node E6. A control electrode of the seventh light emitting control transistor ET7 is electrically connected with the first clock signal terminal ECK1, a first electrode of the seventh light emitting control transistor ET7 is electrically connected with the sixth node E6, and a second electrode of the seventh light emitting control transistor ET7 is electrically connected with a seventh node E7. A control electrode of the eighth light emitting control transistor ET8 is electrically connected with the first node E1, a first electrode of the eighth light emitting control transistor ET8 is electrically connected with the first power supply terminal VGH, and a second electrode of the eighth light emitting control transistor ET8 is electrically connected with the seventh node E7. A control electrode of the ninth light emitting control transistor ET9 is electrically connected with the seventh node E7, a first electrode of the ninth light emitting control transistor ET9 is electrically connected with the first power supply terminal VGH, and a second electrode of the ninth light emitting control transistor ET9 is electrically connected with an output terminal EOUT. A control electrode of the tenth light emitting control transistor ET10 is electrically connected with the third node E3, a first electrode of the tenth light emitting control transistor ET10 is electrically connected with the second power supply terminal VGL, and a second electrode of the tenth light emitting control transistor ET10 is electrically connected with the output terminal EOUT. A control electrode of the eleventh light emitting control transistor ET11 is electrically connected with the second power supply terminal VGL, a first electrode of the eleventh light emitting control transistor ET11 is electrically connected with the second node E2, and a second electrode of the eleventh light emitting control transistor ET11 is electrically connected with the fourth node E4. A control electrode of the twelfth light emitting control transistor ET12 is electrically connected with the second power supply terminal VGL, a first electrode of the twelfth light emitting control transistor ET12 is electrically connected with the first node E1, and a second electrode of the twelfth light emitting control transistor ET12 is electrically connected with the third node E3. A control electrode of the thirteenth light emitting control transistor ET13 is electrically connected with a second clock signal terminal ECK2, a first electrode of the thirteenth light emitting control transistor ET13 is electrically connected with the first node E1, and a second electrode of the thirteenth light emitting control transistor ET13 is electrically connected with the first power supply terminal VGH. A first electrode plate EC11 of the first light emitting capacitor EC1 is electrically connected with the fourth node E4, and a second electrode plate EC12 of the first light emitting capacitor EC1 is electrically connected with the sixth node E6. A first electrode plate EC21 of the second light emitting capacitor EC2 is connected with the seventh node E7, and a second electrode plate EC22 of the second light emitting capacitor EC2 is connected with the first power supply terminal VGH. A first electrode plate EC31 of the third light emitting capacitor EC3 is connected with the third node E3, and a second electrode plate EC32 of the third light emitting capacitor EC3 is connected with the fifth node E5.

In an exemplary embodiment, the first light emitting control transistor ET1 to the thirteenth light emitting control transistor ET13 may be P-type transistors or may be N-type transistors.

In an exemplary embodiment, the first power supply terminal VGH continuously provides a high-level signal, and the second power supply terminal VGL continuously provides a low-level signal. Since the second power supply terminal VGL continuously provides the low-level signal, the eleventh light emitting control transistor ET11 and the twelfth light emitting control transistor ET12 are continuously turned on.

In an exemplary embodiment, the second clock signal terminal ECK2 has a low-level signal in a startup initialization stage, which prevents a ninth light emitting control transistor ET9 and a tenth light emitting control transistor ET10 of a last light emitting shift register from simultaneously being turned on due to delay of an output signal, or has a low-level signal in an abnormal shutdown stage, which prevents the ninth light emitting control transistor ET9 and the tenth light emitting control transistor ET10 from simultaneously being turned on. The second clock signal terminal ECK2 continuously provides a high-level signal in a normal display stage, that is, the thirteenth light emitting control transistor ET13 is continuously turned off in the normal display stage.

Taking a case in which the first light emitting control transistor ET1 to the thirteenth light emitting control transistor ET13 are P-type transistors as an example, as shown in FIG. 5B, a working process of a light emitting shift register according to an exemplary embodiment includes following stages.

In a first stage B1, a signal of the first clock signal terminal ECK1 is a high-level signal, and a signal of the third clock signal terminal ECK3 is a low-level signal. The signal of the third clock signal terminal ECK3 is the low-level signal, the first light emitting control transistor ET1, the third light emitting control transistor ET3, and the twelfth light emitting control transistor ET12 are turned on, the turned-on first light emitting control transistor ET1 transmits a high-level signal of the input terminal EIN to the first node E1, so that a level of the first node E1 becomes a high-level, the turned-on twelfth light emitting control transistor ET12 transmits a high-level signal of the first node E1 to the third node E3, and the second light emitting control transistor ET2, the fourth light emitting control transistor ET4, the eighth light emitting control transistor ET8, and the tenth light emitting control transistor ET10 are turned off. In addition, the turned-on third light emitting control transistor ET3 transmits a low-level signal of the second power supply terminal VGL to the second node E2, so that a level of the second node E2 becomes a low-level, the turned-on eleventh light emitting control transistor ET11 transmits a low-level signal of the second node E2 to the fourth node E4, so that a level of the fourth node E4 becomes a low-level, and the fifth light emitting control transistor ET5 and the sixth light emitting control transistor ET6 are turned on. The signal of the first clock signal terminal ECK1 is the high-level signal, and the seventh light emitting control transistor ET7 is turned off. In addition, the ninth light emitting control transistor ET9 is turned off under an action of the third light emitting capacitor EC3. In the first stage B1, since both the ninth light emitting control transistor ET9 and the tenth light emitting control transistor ET10 are turned off, a signal of the output terminal EOUT is kept at a previous low-level.

In a second stage B2, a signal of the first clock signal terminal ECK1 is a low-level signal, and a signal of the third clock signal terminal ECK3 is a high-level signal. The signal of the first clock signal terminal ECK1 is the low-level signal, and the seventh light emitting control transistor ET7 is turned on. The signal of the third clock signal terminal ECK3 is the high-level signal, and the first light emitting control transistor ET1 and the third light emitting control transistor ET3 are turned off. Under an action of the third light emitting capacitor EC3, the first node E1 and the third node E3 may continue to maintain the high-level signal of a previous stage, and under an action of the first light emitting capacitor EC1, the fourth node E4 may continue to be kept at the low-level of the previous stage, so the fifth light emitting control transistor ET5 and the sixth light emitting control transistor ET6 are turned on. The second light emitting control transistor ET2, the fourth light emitting control transistor ET4, the eighth light emitting control transistor ET8, and the tenth light emitting control transistor ET10 are turned off. In addition, the low-level signal of the first clock signal terminal ECK1 is transmitted to the seventh node E7 through the turned-on sixth light emitting control transistor ET6 and the seventh light emitting control transistor ET7, the ninth light emitting control transistor ET9 is turned on, and the turned-on ninth light emitting control transistor ET9 outputs a high-level signal of the first power supply terminal VGH, so a signal of the output terminal EOUT is a high-level signal.

In a third stage B3, a signal of the third clock signal terminal ECK3 is a low-level signal and a signal of the first clock signal terminal ECK1 is a high-level signal. The signal of the first clock signal terminal ECK1 is the high-level signal, and the seventh light emitting control transistor ET7 is turned off. The second light emitting control transistor ET2, the fourth light emitting control transistor ET4, the eighth light emitting control transistor ET8, and the tenth light emitting control transistor ET10 are turned off. The signal of the third clock signal terminal ECK3 is the low-level signal, and the first light emitting control transistor ET1 and the third light emitting control transistor ET3 are turned on. Under an action of the second light emitting capacitor EC2, the ninth light emitting control transistor ET9 maintains a turned-on state, and the turned-on ninth light emitting control transistor ET9 outputs a high-level signal of the first power supply terminal VGH, so a signal of the output terminal EOUT is still a high-level signal.

In a fourth stage B4, a signal of the first clock signal terminal ECK1 is a low-level signal and a signal of the third clock signal terminal ECK3 is a high-level signal. The signal of the third clock signal terminal ECK3 is the high-level signal, and the first light emitting control transistor ET1 and the third light emitting control transistor ET3 are turned off. The signal of the first clock signal terminal ECK1 is at a low-level, and the seventh light emitting control transistor ET7 is turned on. Due to a storage function of the third light emitting capacitor EC3, levels of the first node E1 and the third node E3 are kept at high-levels of a previous stage, so that the second light emitting control transistor ET2, the fourth light emitting control transistor ET4, the eighth light emitting control transistor ET8, and the tenth light emitting control transistor ET10 are turned off. Due to a storage function of the first light emitting capacitor EC1, the fourth node E4 continues to be kept at the low-level of the previous stage, so that the fifth light emitting control transistor ET5 and the sixth light emitting control transistor ET6 are turned on. In addition, the low-level signal of the first clock signal terminal ECK1 is transmitted to the seventh node E7 through the turned-on sixth light emitting control transistor ET6 and the seventh light emitting control transistor ET7, the turned-on ninth light emitting control transistor ET9 outputs a high-level signal of the first power supply terminal VGH, so a signal of the output terminal EOUT is still a high-level signal.

In a fifth stage B5, a signal of the first clock signal terminal ECK1 is a high-level signal and a signal of the third clock signal terminal ECK3 is a low-level signal. The signal of the third clock signal terminal ECK3 is the low-level signal, and the first light emitting control transistor ET1 and the third light emitting control transistor ET3 are turned on. The signal of the first clock signal terminal ECK1 is the high-level signal, and the seventh light emitting control transistor ET7 is turned off. The turned-on first light emitting control transistor ET1 transmits a low-level signal of the input terminal EIN to the first node E1, so that a level of the first node E1 becomes a low-level, the turned-on twelfth light emitting control transistor ET12 transmits a low-level signal of the first node E1 to the third node E3, so that a level of the third node E3 becomes a low-level, and the second light emitting control transistor ET2, the fourth light emitting control transistor ET4, the eighth light emitting control transistor ET8, and the tenth light emitting control transistor ET10 are turned on. The turned-on second light emitting control transistor ET2 transmits the low-level signal of the third clock signal terminal ECK3 to the second node E2, so that a level of the second node E2 may be further lowered and the second node E2 and the fourth node E4 continue to be kept at low-levels of the previous stage, and thus the fifth light emitting control transistor ET5 and the sixth light emitting control transistor ET6 are turned on. The signal of the first clock signal terminal ECK1 is the high-level signal, and the seventh light emitting control transistor ET7 is turned off. In addition, the turned-on eighth light emitting control transistor ET8 transmits a high-level signal of the first power supply terminal VGH to the seventh node E7, and the ninth light emitting control transistor ET9 is turned off. The turned-on tenth light emitting control transistor ET10 outputs a low-level signal of the second power supply terminal VGL, so a signal of the output terminal EOUT turns to be at a low-level.

An input terminal of a first stage light emitting shift register is electrically connected with the light emitting initial signal line, and an output terminal of an i-th stage light emitting shift register is electrically connected with an input terminal of an (i+1)-th stage light emitting shift register; the i-th stage light emitting shift register has a first clock signal terminal electrically connected with the first light emitting clock signal line, a second clock signal terminal electrically connected with the second light emitting clock signal line, and a third clock signal terminal electrically connected with the third light emitting clock signal line; the (i+1)-th stage light emitting shift register has a first clock signal terminal electrically connected with the third light emitting clock signal line, a second clock signal terminal electrically connected with the second light emitting clock signal line, and a third clock signal terminal electrically connected with the first light emitting clock signal line; a first power supply terminal of the i-th stage light emitting shift register is electrically connected with a high-level power supply line connected with the light emitting drive circuit, and a second power supply terminal of the i-th stage light emitting shift register is electrically connected with a low-level power supply line connected with the light emitting drive circuit.

In an exemplary embodiment, the scan signal line and the control signal line are a same signal line, and the control drive circuit includes multiple cascaded control shift registers, and at least one stage control shift register is electrically connected with the control signal line. At least one stage control shift register includes multiple control transistors and multiple control capacitors.

In an exemplary embodiment, the control shift register includes multiple control transistors and multiple control capacitors, and a circuit structure of the control shift register may be 8T2C, which is not limited in the present disclosure.

Figure 6A:
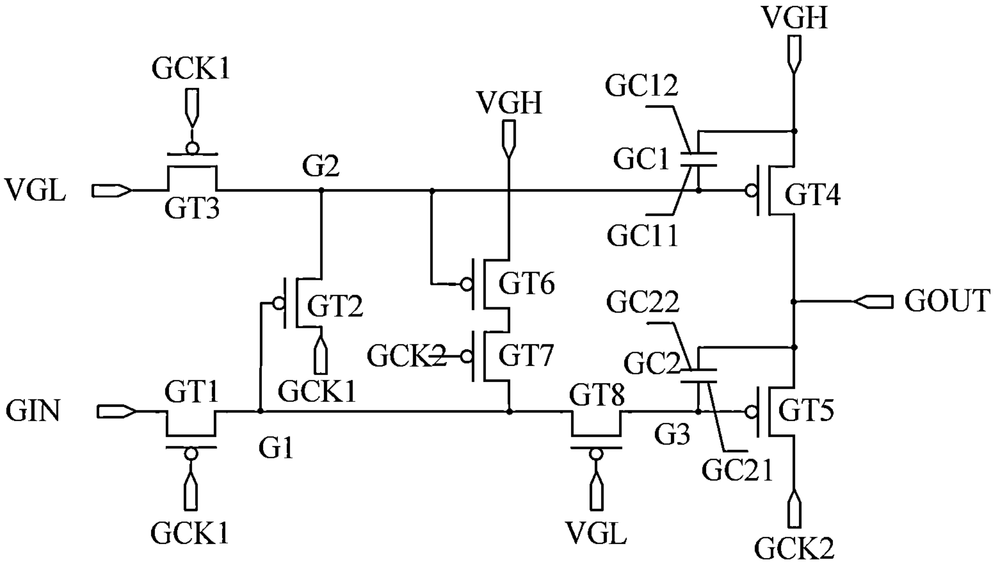
FIG. 6A is an equivalent circuit diagram of a control shift register according to an exemplary embodiment.
Figure 6B:
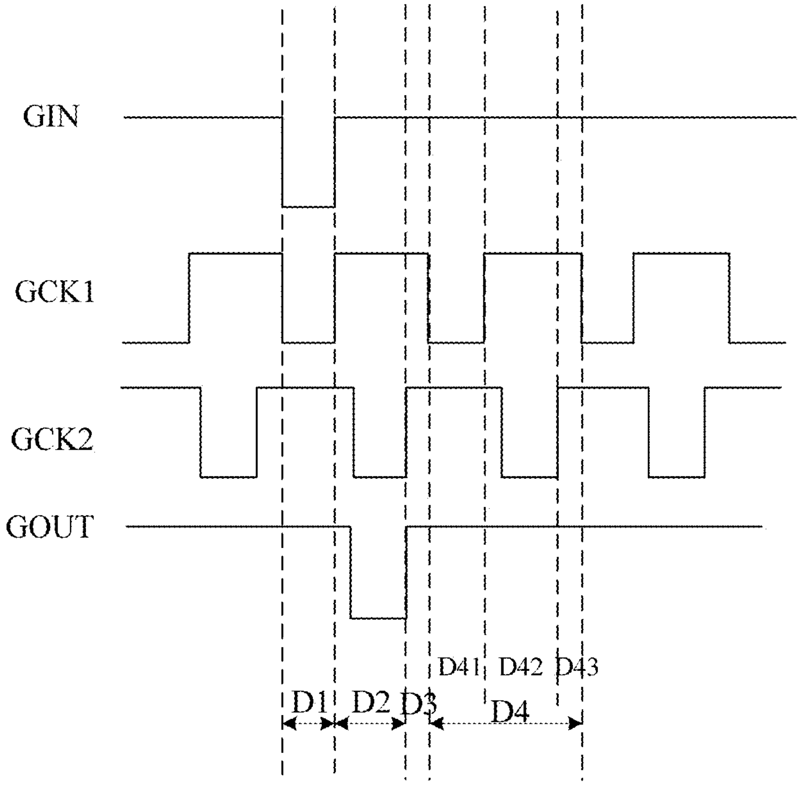
FIG. 6B is a timing diagram of the control shift register provided in FIG. 6A.

FIG. 6A is an equivalent circuit diagram of a control shift register according to an exemplary embodiment, and FIG. 6B is a timing diagram of the control shift register provided in FIG. 6A. As shown in FIG. 6A, the control shift register includes a first control transistor GT1 to an eighth control transistor GT8, a first control capacitor GC1, and a second control capacitor GC2.

In an exemplary embodiment, a control electrode of the first control transistor GT1 is electrically connected with a first clock signal terminal CK, a first electrode of the first control transistor GT1 is electrically connected with an input terminal GIN, and a second electrode of the first control transistor GT1 is electrically connected with a first node G1. A control electrode of the second control transistor GT2 is electrically connected with the first node G1, a first electrode of the second control transistor GT2 is electrically connected with the first clock signal terminal CK, and a second electrode of the second control transistor GT2 is electrically connected with a second node G2. A control electrode of the third control transistor GT3 is electrically connected with a first clock signal terminal GGCK11, a first electrode of the third control transistor GT3 is electrically connected with a second power supply terminal VGL, and a second electrode of the third control transistor GT3 is electrically connected with the second node G2. A control electrode of the fourth control transistor GT4 is electrically connected with the second node G2, a first electrode of the fourth control transistor GT4 is electrically connected with a first power supply terminal VGH, and a second electrode of the fourth control transistor GT4 is electrically connected with an output terminal GOUT. A control electrode of the fifth control transistor GT5 is electrically connected with a third node G3, a first electrode of the fifth control transistor GT5 is electrically connected with a second clock signal terminal GCK2, and a second electrode of the fifth control transistor GT5 is electrically connected with the output terminal GOUT. A control electrode of the sixth control transistor GT6 is electrically connected with the second node G2, a first electrode of the sixth control transistor GT6 is electrically connected with the first power supply terminal VGH, and a second electrode of the sixth control transistor GT6 is electrically connected with a first electrode of the seventh control transistor GT7. A control electrode of the seventh control transistor GT7 is electrically connected with the second clock signal terminal GCK2, and a second electrode of the seventh control transistor GT7 is electrically connected with the first node G1. A control electrode of the eighth control transistor GT8 is electrically connected with the second power supply terminal VGL, a first electrode of the eighth control transistor GT8 is electrically connected with the first node G1, and a second electrode of the eighth control transistor GT8 is electrically connected with the third node G3. A first electrode plate GC11 of the first control capacitor GC1 is electrically connected with the first power supply terminal VGH, and a second electrode plate GC12 of the first control capacitor GC1 is electrically connected with the second node G2. A first electrode plate GC21 of the second control capacitor GC2 is electrically connected with the output terminal GOUT, and a second electrode plate GC22 of the second control capacitor GC2 is electrically connected with the third node G3.

In an exemplary embodiment, the first control transistor GT1 to the eighth control transistor GT8 may be P-type transistors or may be N-type transistors.

In an exemplary embodiment, the first power supply terminal VGH continuously provides a high-level signal, and the second power supply terminal VGL continuously provides a low-level signal.

Taking a case in which the first control transistor GT1 to the eighth control transistor GT8 are P-type transistors as an example, as shown in FIG. 6B, a working process of the control shift register according to the exemplary embodiment includes following stages.

In an input stage D1, signals of the first clock signal terminal GCK1 and the input terminal GIN are low-level signals, and a signal of the second clock signal terminal GCK2 is a high-level signal. Since a signal of the first clock signal terminal GCK1 is a low-level signal, the first control transistor GT1 is turned on, and a signal of the input terminal GIN is transmitted to the first node G1 via the first control transistor GT1. Since the eighth control transistor GT8 receives a low-level signal of the second power supply terminal VGL, the eighth control transistor GT8 is in a turned-on state. A level of the third node G3 may control the fifth control transistor GT5 to be turned on, and the signal of the second clock signal terminal GCK2 is transmitted to the output terminal GOUT via the fifth control transistor GT5, that is, in the input stage D1, the output terminal GOUT has the signal of the second clock signal terminal GCK2 which is the high-level signal. In addition, since the signal of the first clock signal terminal GCK1 is the low-level signal, the third control transistor GT3 is turned on, and the low-level signal of the second power supply terminal VGL is transmitted to the second node G2 via the third control transistor GT3. At this time, both the fourth control transistor GT4 and the sixth control transistor GT6 are turned on. Since the signal of the second clock signal terminal GCK2 is the high-level signal, the seventh control transistor GT7 is turned off.

In an output stage D2, a signal of the first clock signal terminal GCK1 is a high-level signal, a signal of the second clock signal terminal GCK2 is a low-level signal, and a signal of the input terminal GIN is a high-level signal. The fifth control transistor GT5 is turned on, and the signal of the second clock signal terminal GCK2 is used as a signal of the output terminal GOUT via the fifth control transistor GT5. In the output stage D2, a level of one terminal of the second control capacitor GC2 connected with the output terminal OUT becomes a signal of the second power supply terminal VGL. Due to a bootstrap function of the second control capacitor GC2, the eighth control transistor GT8 is turned off, the fifth control transistor GT5 may be turned on better, and a signal of the output terminal GOUT is a low-level signal. In addition, the signal of the first clock signal terminal GCK1 is the high-level signal, so that both the first control transistor GT1 and the third control transistor GT3 are turned off. The second control transistor GT2 is turned on, and the high-level signal of the first clock signal terminal GCK1 is transmitted to the second node G2 via the second control transistor GT2, so that both the fourth control transistor GT4 and the sixth control transistor GT6 are turned off. Since the signal of the second clock signal terminal GCK2 is the low-level signal, the seventh control transistor GT7 is turned on.

In a buffering stage D3, signals of the first clock signal terminal GCK1 and the second clock signal terminal GCK2 are both high-level signals, a signal of the input terminal GIN is a high-level signal, the fifth control transistor GT5 is turned on, and a signal of the second clock signal terminal GCK2 is used as an output signal GOUT via the fifth control transistor GT5. Due to the bootstrap function of the second control capacitor C2, a level of the first node G1 is changed to be VGL-VthN1. In addition, a signal of the first clock signal terminal GCK1 is a high-level signal, so that the first control transistor GT1 and the third control transistor GT3 are both turned off, the eighth control transistor GT8 is turned on, the second control transistor GT2 is turned on, and the high-level signal of the first clock signal terminal GCK1 is transmitted to the second node G2 via the second control transistor GT2, and thus both the fourth control transistor GT4 and the sixth control transistor GT6 are turned off. Since the signal of the second clock signal terminal GCK2 is a high-level signal, the seventh control transistor GT7 is turned off.

In a first sub-stage D41 of a stabilization stage D4, a signal of the first clock signal terminal GCK1 is a low-level signal, and signals of the second clock signal terminal GCK2 and the input terminal GIN are high-level signals. Since the signal of the first clock signal terminal GCK1 is the low-level signal, the first control transistor GT1 is turned on, and a signal of the input terminal GIN is transmitted to the first node G1 via the first control transistor GT1, and the second control transistor GT2 is turned off. Since the eighth control transistor GT8 is in a turned-on state, the fifth control transistor GT5 is turned off. Since the signal of the first clock signal terminal GCK1 is at a low-level, the third control transistor GT3 is turned on, the fourth control transistor GT4 and the sixth control transistor GT6 are both turned on, and a high-level signal of the first power supply terminal VGH is transmitted to the output terminal GOUT via the fourth control transistor GT4, that is, a signal of the output terminal GOUT is a high-level signal.

In a second sub-stage D42 of the stabilization stage D4, a signal of the first clock signal terminal GCK1 is a high-level signal, a signal of the second clock signal terminal GCK2 is a low-level signal, and a signal of the input terminal GIN is a high-level signal. Both the fifth control transistor GT5 and the second control transistor GT2 are turned off. The signal of the first clock signal terminal GCK1 is the high-level signal, so that the first control transistor GT1 and the third control transistor GT3 are both turned off. Under a holding function of the first control capacitor GC1, the fourth control transistor GT4 and the sixth control transistor GT6 are both turned on, and a high-level signal is transmitted to the output terminal GOUT via the fourth control transistor GT4, that is, a signal of the output terminal GOUT is a high-level signal.

In the second sub-stage D42, since the signal of the second clock signal terminal GCK2 is the low-level signal, the seventh control transistor GT7 is turned on, so that a high-level signal is transmitted to the third node G3 and the first node G1 via the sixth control transistor GT6 and the seventh control transistor GT7, so that signals of the third node G3 and the first node G1 are kept as high-level signals.

In a third sub-stage D43, signals of the first clock signal terminal GCK1 and the second clock signal terminal GCK2 are both high-level signals, and a signal of the input terminal GIN is a high-level signal. The fifth control transistor GT5 and the second control transistor GT2 are turned off. A signal of the first clock signal terminal GCK1 is a high-level signal, so that the first control transistor GT1 and the third control transistor GT3 are both turned off, and the fourth control transistor GT4 and the sixth control transistor GT6 are both turned on. A high-level signal is transmitted to the output terminal GOUT via the fourth control transistor GT4, that is, a signal of the output terminal GOUT is a high-level signal.

An input terminal of a first stage control shift register is electrically connected with a control initial signal line, and an output terminal of an i-th stage control shift register is electrically connected with an input terminal of an (i+1)-th stage control shift register. The i-th stage control shift register has a first clock signal terminal electrically connected with a first control clock signal line, and a second clock signal terminal electrically connected with a second control clock signal line. The (i+1)-th stage control shift register has a first clock signal terminal electrically connected with a second control clock signal line, and a second clock signal terminal electrically connected with a first control clock signal line. A first power supply terminal of the i-th stage control shift register is electrically connected with a high-level power supply line connected with a control drive circuit, and a second power supply terminal of the i-th stage control shift register is electrically connected with a low-level power supply line connected with the control drive circuit.

In an exemplary embodiment, FIG. 7A to FIG. 7F are partial schematic diagrams of a display substrate including three drive circuits according to an exemplary embodiment. As shown in FIG. 7A to FIG. 7F, when the display substrate is an LTPO display substrate, multiple transistors include: a writing transistor, a first reset transistor, a compensation transistor, and a light emitting transistor. Transistor types of the first reset transistor and the compensation transistor are different from those of the writing transistor and the light emitting transistor, the first reset signal terminal and the second reset signal terminal are a same signal terminal, and the control signal terminal and the scan signal terminal are different signal terminals. Multiple drive circuits include a light emitting drive circuit EM GOA, a scan drive circuit GateN GOA, and a control drive circuit GateP GOA. The light emitting drive circuit EM GOA is configured to provide a drive signal to the light emitting transistor, the control drive circuit GateP GOA is configured to provide a drive signal to the writing transistor, and the scan drive circuit GateN GOA is configured to provide a drive signal to the first reset transistor and/or the compensation transistor.

In an exemplary embodiment, the writing transistor and the light emitting control transistor may be P-type transistors.

In an exemplary embodiment, the first reset transistor and the compensation transistor may be N-type metal oxide transistors.

In an exemplary embodiment, high-level power supply lines connected with at least two adjacent drive circuits in the light emitting drive circuit EM GOA, the scan drive circuit GateN GOA, and the control drive circuit GateP GOA are a same power supply line and/or low-level power supply lines connected with at least two adjacent drive circuits in the light emitting drive circuit EM GOA, the scan drive circuit GateN GOA, and the control drive circuit GateP GOA are a same power supply line. When the high-level power supply lines connected with at least two adjacent drive circuits in the light emitting drive circuit EM GOA, the scan drive circuit GateN GOA, and the control drive circuit GateP GOA are the same power supply line and the low-level power supply lines connected with at least two adjacent drive circuits in the light emitting drive circuit EM GOA, the scan drive circuit GateN GOA, and the control drive circuit GateP GOA are the same power supply line, a drive circuit connected with the same low-level power supply line and a drive circuit connected with the same high-level power supply line may be a same drive circuit or may be different drive circuits.

In an exemplary embodiment, a power supply line may be a high-level power supply line and/or a low-level power supply line, and two drive circuits connected with power supply lines connected with two drive circuits may be the light emitting drive circuit EM GOA and the scan drive circuit GateN GOA, or the scan drive circuit GateN GOA and the control drive circuit GateP GOA.

Figure 7A:
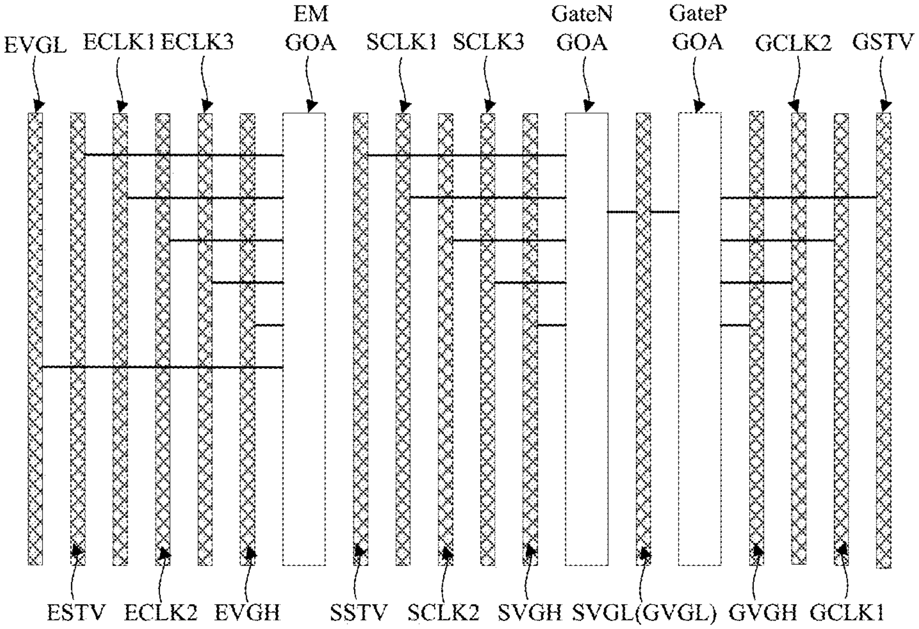
FIG. 7A to FIG. 7F are partial schematic diagrams of a display substrate including three drive circuits according to an exemplary embodiment.
Figure 7B:
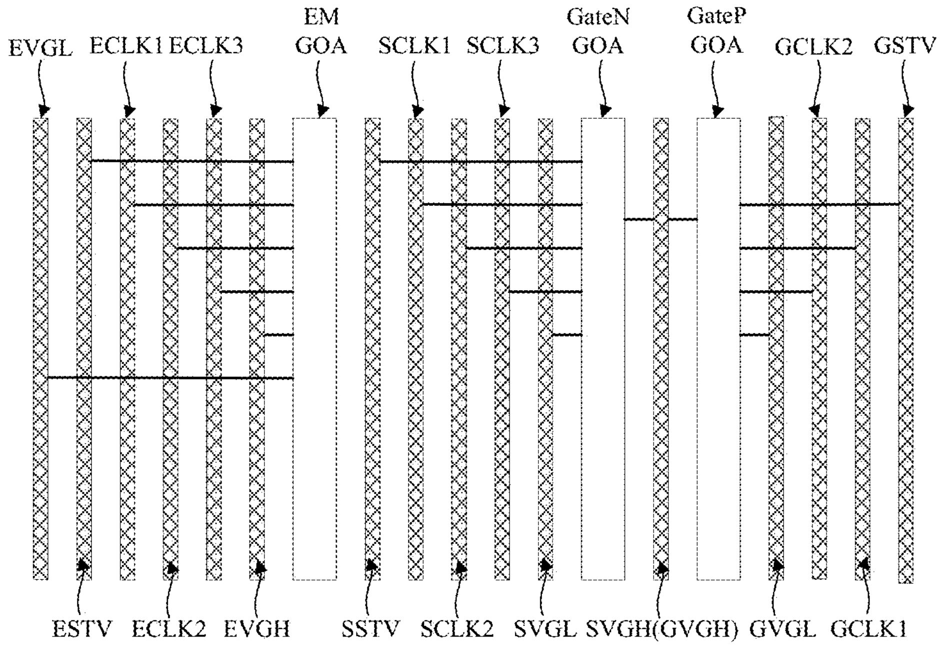
Figure 7C:
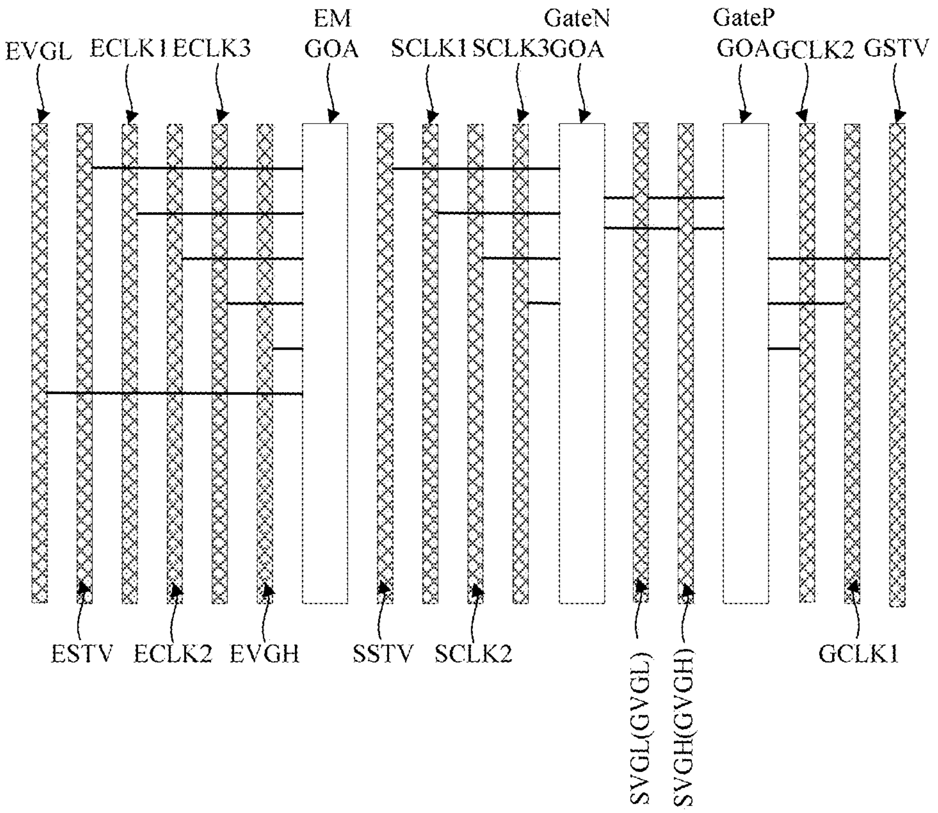
Figure 7D:
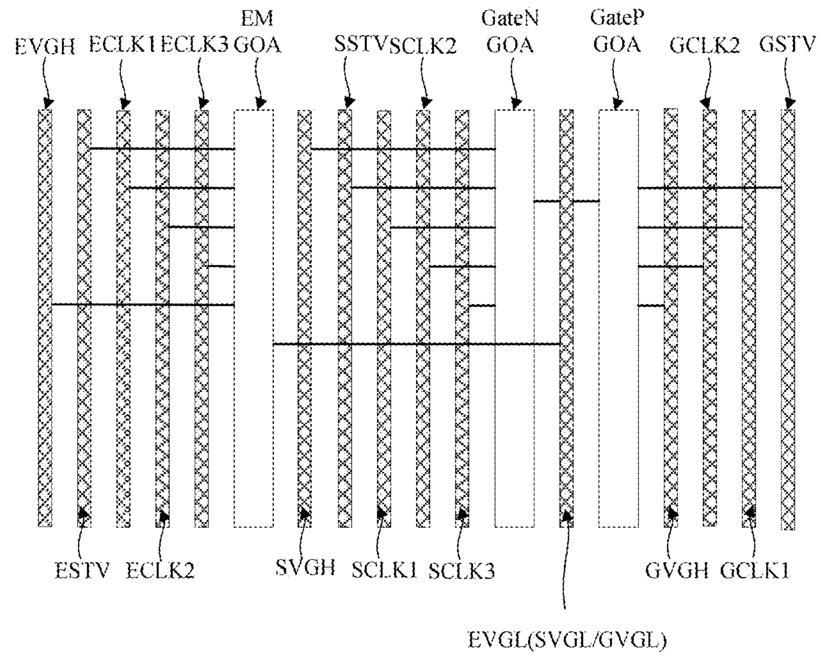
Figure 7E:
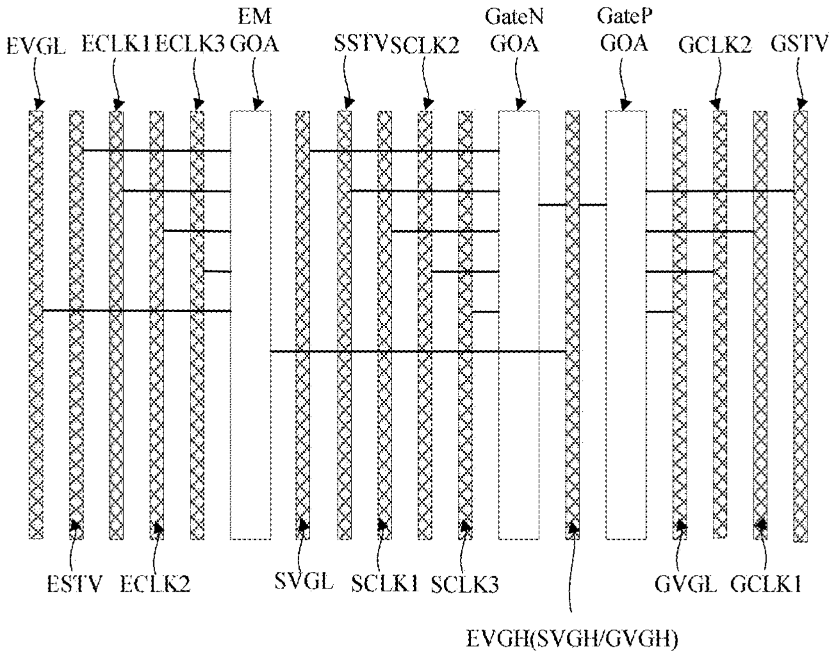
Figure 7F:
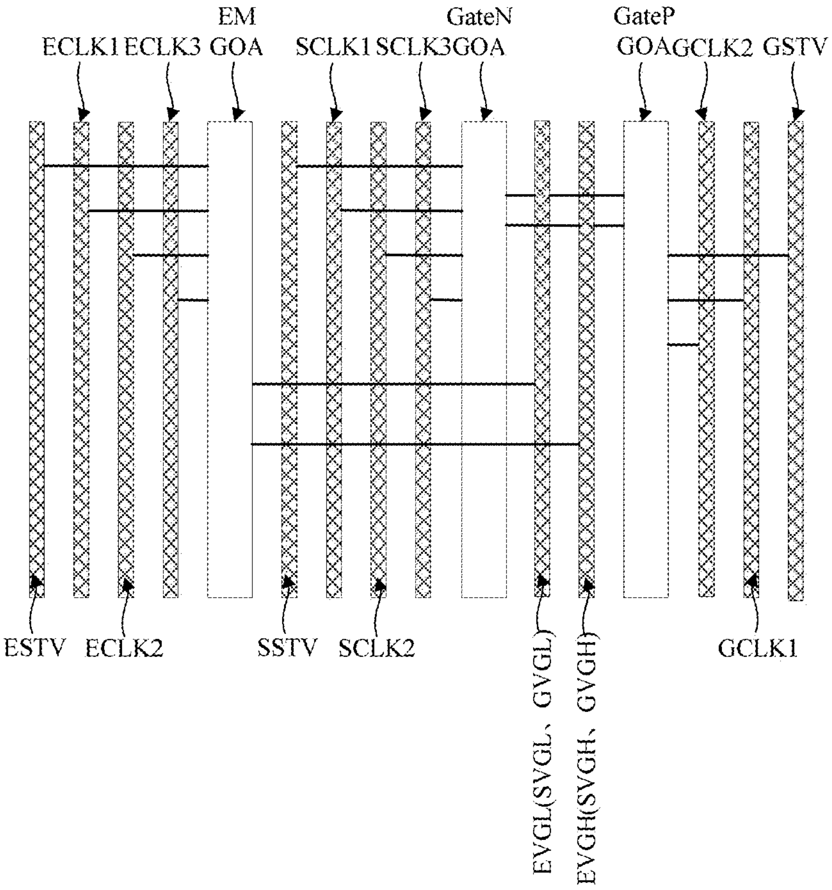

FIG. 7A is illustrated by taking a case in which a low-level power supply line SVGL connected with the scan drive circuit GateN GOA and a low-level power supply line GVGL connected with the control drive circuit GateP GOA are a same power supply line as an example. FIG. 7B is illustrated by taking a case in which a high-level power supply line SVGH connected with the scan drive circuit GateN GOA and a low-level power supply line GVGH connected with the control drive circuit GateP GOA are a same power supply line as an example. FIG. 7C is illustrated by taking a case in which a low-level power supply line SVGL connected with the scan drive circuit GateN GOA and a low-level power supply line GVGL connected with the control drive circuit GateP GOA are a same power supply line, and a high-level power supply line SVGH connected with the scan drive circuit GateN GOA and a low-level power supply line GVGH connected with the control drive circuit GateP GOA are a same power supply line as an example. FIG. 7D is illustrated by taking a case in which a low-level power supply line EVGL connected with the light emitting drive circuit EM GOA, a low-level power supply line SVGL connected with the scan drive circuit GateN GOA, and a low-level power supply line GVGL connected with the control drive circuit GateP GOA are a same power supply line as an example. FIG. 7E is illustrated by taking a case in which a low-level power supply line EVGH connected with the light emitting drive circuit EM GOA, a high-level power supply line SVGH connected with the scan drive circuit GateN GOA, and a low-level power supply line GVGH connected with the control drive circuit GateP GOA are a same power supply line as an example. FIG. 7F is illustrated by taking a case in which the a low-level power supply line EVGL connected with the light emitting drive circuit EM GOA, a low-level power supply line SVGL connected with the scan drive circuit GateN GOA, and a low-level power supply line GVGL connected with the control drive circuit GateP GOA are a same power supply line, and a low-level power supply line EVGH connected with the light emitting drive circuit EM GOA, a high-level power supply line SVGH connected with the scan drive circuit GateN GOA, and a low-level power supply line GVGH connected with the control drive circuit GateP GOA are a same power supply line as an example.

In an exemplary embodiment, when high-level power supply lines connected with two adjacent drive circuits in the light emitting drive circuit EM GOA, the scan drive circuit GateN GOA, and the control drive circuit GateP GOA are a same power supply line, an orthographic projection of the high-level power supply line on the base substrate is partially overlapped with an orthographic projection of one of the drive circuits connected with the high-level power supply line on the base substrate, or is located between the connected two adjacent drive circuits. Or, when high-level power supply lines connected with the light emitting drive circuit EM GOA, the scan drive circuit GateN GOA, and the control drive circuit GateP GOA are a same power supply line, an orthographic projection of the high-level power supply line on the base substrate is partially overlapped with an orthographic projection of one of the drive circuits connected with the high-level power supply line on the base substrate, or is located between two adjacent drive circuits.

In an exemplary embodiment, when low-level power supply lines connected with two adjacent drive circuits in the light emitting drive circuit EM GOA, the scan drive circuit GateN GOA, and the control drive circuit GateP GOA are a same power supply line, an orthographic projection of the low-level power supply line on the base substrate is partially overlapped with an orthographic projection of one of the drive circuits connected with the low-level power supply line on the base substrate, or is located between the connected two adjacent drive circuits. Or, when low-level power supply lines connected with the light emitting drive circuit EM GOA, the scan drive circuit GateN GOA, and the control drive circuit GateP GOA are a same power supply line, an orthographic projection of the low-level power supply line on the base substrate is partially overlapped with an orthographic projection of one of the drive circuits connected with the low-level power supply line on the base substrate, or is located between two adjacent drive circuits.

In an exemplary embodiment, a positional relationship of the control drive circuit, the scan drive circuit, and the light emitting control circuit may be determined according to the structure and functions of the display substrate. The light emitting drive circuit EM GOA may be located on a side of the scan drive circuit GateN GOA away from the display region, and the control drive circuit GateP GOA may be located on a side of the scan drive circuit GateN GOA close to the display region.

In an exemplary embodiment, the circuit structure layer further includes a light emitting initial signal line ESTV, multiple light emitting clock signal lines, a control initial signal line GSTV, multiple control clock signal lines, a scan initial signal line SSTV, and multiple scan clock signal lines which are located in the non-display region and extend along the first direction; the light emitting drive circuit EM GOA is electrically connected with the light emitting initial signal line and multiple light emitting clock signal lines respectively, the control drive circuit GateP GOA is electrically connected with the control initial signal line GSTV and multiple control clock signal lines respectively, and the scan drive circuit GateN GOA is electrically connected with the scan initial signal line SSTV and multiple scan clock signal lines respectively. FIG. 7A to FIG. 7F are illustrated by taking a case of three light emitting clock signal lines ECLK1 to ECLK3, three scan clock signal lines SCLK1 to SCLK3, and two control clock signal lines GCLK1 and GCLK2 as an example.

In an exemplary embodiment, as shown in FIG. 7A to FIG. 7F, the light emitting initial signal line and the multiple light emitting clock signal lines are located on a side of the scan initial signal line and the multiple scan clock signal lines away from the display region, and the light emitting initial signal line is located on a side of the multiple light emitting clock signal lines close to or away from the display region. FIG. 7A to FIG. 7F are illustrated by taking a case in which the light emitting initial signal line is located on a side of the multiple light emitting clock signal lines away from the display region as an example.

In an exemplary embodiment, as shown in FIG. 7A to FIG. 7F, the control initial signal line and the multiple control clock signal lines are located on a side of the scan initial signal line and the multiple scan clock signal lines close to the display region, and the control initial signal line is located on a side of the multiple control clock signal lines close to the display region or away from the display region. FIG. 7A to FIG. 7F are illustrated by taking a case in which the control initial signal line is located on a side of the multiple control clock signal lines away from the display region as an example.

In an exemplary embodiment, as shown in FIG. 7A to FIG. 7F, the scan initial signal line is located on a side of the multiple scan clock signal lines close to the display region or away from the display region. FIG. 7A to FIG. 7F are illustrated by taking a case in which the scan initial signal line is located on a side of the multiple scan clock signal lines close to the display region as an example.

In an exemplary embodiment, the scan drive circuit may include multiple cascaded scan shift registers, at least one stage scan shift register is electrically connected with at least one reset signal line respectively. In an exemplary embodiment, the scan shift register may include multiple scan transistors and multiple scan capacitors. A circuit structure of the scan shift register may be 13T3C or 10T3C, which is not limited in the present disclosure.

Figure 8A:
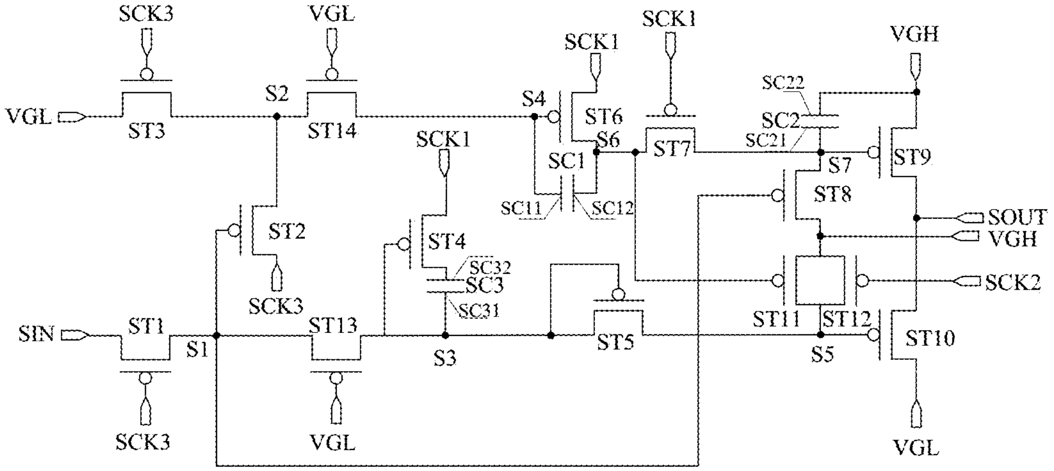
FIG. 8A is an equivalent circuit diagram of a scan shift register according to an exemplary embodiment.
Figure 8B:
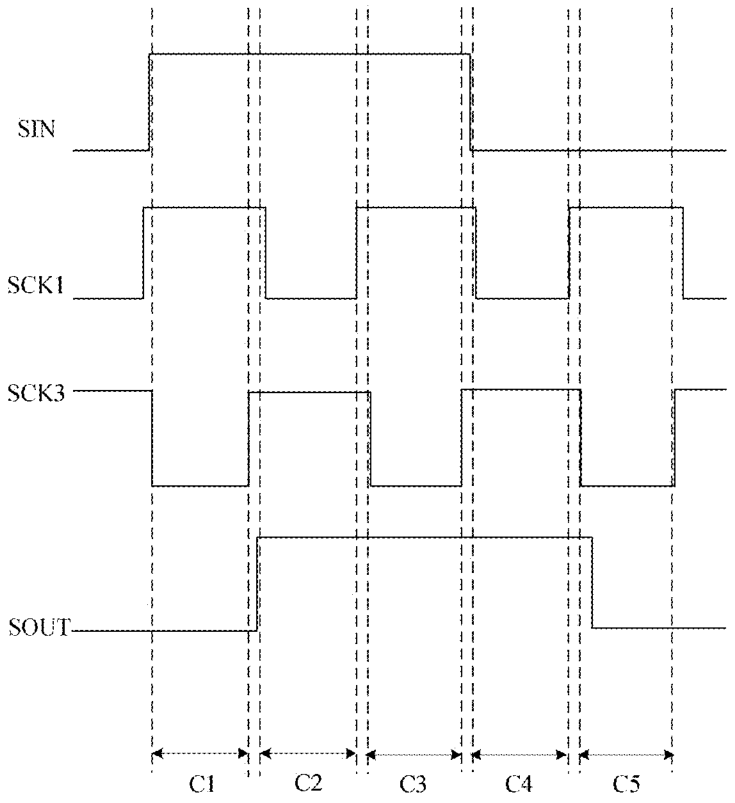
FIG. 8B is a timing diagram of the scan shift register provided in FIG. 8A.

FIG. 8A is an equivalent circuit diagram of a scan shift register according to an exemplary embodiment, and FIG. 8B is a timing diagram of the scan shift register provided in FIG. 8A. As shown in FIG. 8A, in the exemplary embodiment, the scan shift register includes a first scan transistor ST1 to a thirteenth scan transistor ST13, and a first scan capacitor SC1 to a third scan capacitor SC3.

In an exemplary embodiment, a control electrode of the first scan transistor ST1 is electrically connected with a third clock signal terminal SCK3, a first electrode of the first scan transistor ST1 is electrically connected with an input terminal SIN, and a second electrode of the first scan transistor ST1 is electrically connected with a first node S1. A control electrode of the second scan transistor ST2 is electrically connected with the first node S1, a first electrode of the second scan transistor ST2 is electrically connected with the third clock signal terminal SCK3, and a second electrode of the second scan transistor ST2 is electrically connected with a second node S2. A control electrode of the third scan transistor ST3 is electrically connected with the third clock signal terminal SCK3, a first electrode of the third scan transistor ST3 is electrically connected with a second power supply terminal VGL, and a second electrode of the third scan transistor ST3 is electrically connected with the second node S2. A control electrode of the fourth scan transistor ST4 is electrically connected with a third node S3, a first electrode of the fourth scan transistor ST4 is electrically connected with a first clock signal terminal SCK1, and a second electrode of the fourth scan transistor ST4 is electrically connected with a fifth node S5. A control electrode of the fifth scan transistor ST5 is electrically connected with a fourth node S4, a first electrode of the fifth scan transistor ST5 is electrically connected with the fifth node S5, and a second electrode of the fifth scan transistor ST5 is electrically connected with a first power supply terminal VGH. A control electrode of the sixth scan transistor ST6 is electrically connected with the fourth node S4, a first electrode of the sixth scan transistor ST6 is electrically connected with the first clock signal terminal SCK1, and a second electrode of the sixth scan transistor ST6 is electrically connected with a sixth node S6. A control electrode of the seventh scan transistor ST7 is electrically connected with the first clock signal terminal SCK1, a first electrode of the seventh scan transistor ST7 is electrically connected with the sixth node S6, and a second electrode of the seventh scan transistor ST7 is electrically connected with a seventh node S7. A control electrode of the eighth scan transistor ST8 is electrically connected with the first node S1, a first electrode of the eighth scan transistor ST8 is electrically connected with the first power supply terminal VGH, and a second electrode of the eighth scan transistor ST8 is electrically connected with the seventh node S7. A control electrode of the ninth scan transistor ST9 is electrically connected with the seventh node S7, a first electrode of the ninth scan transistor ST9 is electrically connected with the first power supply terminal VGH, and a second electrode of the ninth scan transistor ST9 is electrically connected with an output terminal SOUT. A control electrode of the tenth scan transistor ST10 is electrically connected with the third node S3, a first electrode of the tenth scan transistor ST10 is electrically connected with the second power supply terminal VGL, and a second electrode of the tenth scan transistor ST10 is electrically connected with the output terminal SOUT. A control electrode of the eleventh scan transistor ST11 is electrically connected with the second power supply terminal VGL, a first electrode of the eleventh scan transistor ST11 is electrically connected with the second node S2, and a second electrode of the eleventh scan transistor ST11 is electrically connected with the fourth node S4. A control electrode of the twelfth scan transistor ST12 is electrically connected with the second power supply terminal VGL, a first electrode of the twelfth scan transistor ST12 is electrically connected with the first node S1, and a second electrode of the twelfth scan transistor ST12 is electrically connected with the third node S3. A control electrode of the thirteenth scan transistor ST13 is electrically connected with a second clock signal terminal SCK2, a first electrode of the thirteenth scan transistor ST13 is electrically connected with the first node S1, and a second electrode of the thirteenth scan transistor ST13 is electrically connected with the first power supply terminal VGH. A first electrode plate SC11 of the first scan capacitor SC1 is electrically connected with the fourth node S4, and a second electrode plate SC12 of the first scan capacitor SC1 is electrically connected with the sixth node S6. A first electrode plate SC21 of the second scan capacitor SC2 is electrically connected with the seventh node S7, and a second electrode plate SC22 of the second scan capacitor SC2 is electrically connected with the first power supply terminal VGH. A first electrode plate SC31 of the third scan capacitor SC3 is electrically connected with the third node S3, and a second electrode plate SC32 of the third scan capacitor SC3 is electrically connected with the fifth node S5.

In an exemplary embodiment, the first scan transistor ST1 to the thirteenth scan transistor ST13 may be P-type transistors or may be N-type transistors. The tenth scan transistor ST10 is an output transistor.

In an exemplary embodiment, the first power supply terminal VGH continuously provides a high-level signal, and the second power supply terminal VGL continuously provides a low-level signal. Since the second power supply terminal VGL continuously provides the low-level signal, the eleventh scan transistor ST11 and the twelfth scan transistor ST12 are continuously turned on.

In an exemplary embodiment, the second clock signal terminal SCK2 has a low-level signal in a startup initialization stage, which prevents a ninth scan transistor ST9 and a tenth scan transistor ST10 of a last stage scan shift register from simultaneously being turned on due to delay of an output signal, or has a low-level signal in an abnormal shutdown stage, which prevents the ninth scan transistor ST9 and the tenth scan transistor ST10 from simultaneously being turned on. The second clock signal terminal SCK2 continuously provides a high-level signal in a normal display stage, that is, the thirteenth scan transistor ST13 is continuously turned off in the normal display stage.

Taking a case in which the first scan transistor ST1 to the thirteenth scan transistor ST13 are P-type transistors as an example, as shown in FIG. 8B, a working process of the scan shift register according to the exemplary embodiment includes following stages.

In a first stage C1, a signal of the first clock signal terminal SCK1 is a high-level signal, and a signal of the third clock signal terminal SCK3 is a low-level signal. The signal of the third clock signal terminal SCK3 is the low-level signal, the first scan transistor ST, the third scan transistor ST3, and the twelfth scan transistor ST12 are turned on, the turned-on first scan transistor ST1 transmits a high-level signal of the input terminal SIN to the first node S1, thus, a level of the first node S1 becomes a high-level, the turned-on twelfth scan transistor ST12 transmits a high-level signal of the first node S1 to the third node S3, and the second scan transistor ST2, the fourth scan transistor ST4, the eighth scan transistor ST8, and the tenth scan transistor ST10 are turned off. In addition, the turned-on third scan transistor ST3 transmits a low-level signal of the second power supply terminal VGL to the second node S2, thus, a level of the second node S2 becomes a low-level, the turned-on eleventh scan transistor ST11 transmits a low-level signal of the second node S2 to the fourth node S4, so that a level of the fourth node S4 becomes a low-level, and the fifth scan transistor ST5 and the sixth scan transistor ST6 are turned on. The signal of the first clock signal line SCK1 is the high-level signal, and the seventh scan transistor ST7 is turned off. In addition, the ninth scan transistor ST9 is turned off under an action of the third scan capacitor SC3. In the first stage C1, since both the ninth scan transistor ST9 and the tenth scan transistor ST10 are turned off, a signal of the output terminal SOUT is kept at a previous low-level.

In a second stage C2, a signal of the first clock signal terminal SCK1 is a low-level signal, and a signal of the third clock signal terminal SCK3 is a high-level signal. The signal of the first clock signal terminal SCK1 is the low-level signal, and the seventh scan transistor ST7 is turned on. The signal of the third clock signal terminal SCK3 is the high-level signal, and the first scan transistor ST1 and the third scan transistor ST3 are turned off. Under an action of the third scan capacitor SC3, the first node S1 and the third node S3 may continue to maintain a high-level signal of a previous stage, and under an action of the first scan capacitor SC1, so the fourth node S4 may continue to be kept at the low-level of the previous stage, and the fifth scan transistor ST5 and the sixth scan transistor ST6 are turned on. The second scan transistor ST2, the fourth scan transistor ST4, the eighth scan transistor ST8, and the tenth scan transistor ST10 are turned off. In addition, the low-level signal of the first clock signal terminal SCK1 is transmitted to the seventh node S7 through the turned-on sixth scan transistor ST6 and the seventh scan transistor ST7, the ninth scan transistor ST9 is turned on, and the turned-on ninth scan transistor ST9 outputs a high-level signal of the first power supply terminal VGH, so a signal of the output terminal SOUT is a high-level signal.

In a third stage C3, a signal of the third clock signal terminal SCK3 is a low-level signal and a signal of the first clock signal terminal SCK1 is a high-level signal. The signal of the first clock signal terminal SCK1 is the high-level signal, and the seventh scan transistor ST7 is turned off. The second scan transistor ST2, the fourth scan transistor ST2, the eighth scan transistor ST8, and the tenth scan transistor ST10 are turned off. The signal of the third clock signal terminal SCK3 is the low-level signal, and the first scan transistor ST1 and the third scan transistor ST3 are turned on. Under an action of the third scan capacitor SC3, the ninth scan transistor ST9 maintains a turned-on state, and the turned-on ninth scan transistor ST9 outputs a high-level signal of the first power supply terminal VGH, so a signal of the output terminal SOUT is still a high-level signal.

In a fourth stage C4, a signal of the first clock signal terminal SCK1 is a low-level signal and a signal of the third clock signal terminal SCK3 is a high-level signal. The signal of the third clock signal terminal SCK3 is the high-level signal, and the first scan transistor ST1 and the third scan transistor ST3 are turned off. The signal of the first clock signal terminal SCK1 is at a low-level, and the seventh scan transistor ST7 is turned on. Due to a storage function of the third scan capacitor SC3, levels of the first node S1 and the third node S3 are kept at high-levels of the previous stage, so that the second scan transistor ST2, the fourth scan transistor ST4, the eighth scan transistor ST8, and the tenth scan transistor ST10 are turned off. Due to a storage function of the first scan capacitor SC1, the fourth node S4 continues to be kept at the low-level of the previous stage, so that the fifth scan transistor ST5 and the sixth scan transistor ST6 are turned on. In addition, the low-level signal of the first clock signal terminal SCK1 is transmitted to the seventh node S7 through the turned-on sixth scan transistor ST6 and the seventh scan transistor ST7, the turned-on ninth scan transistor ST9 outputs a high-level signal of the first power supply terminal VGH, so a signal of the output terminal SOUT is still a high-level signal.

In a fifth stage C5, a signal of the first clock signal terminal SCK1 is a high-level signal and a signal of the third clock signal terminal SCK3 is a low-level signal. The signal of the third clock signal terminal SCK3 is the low-level signal, and the first scan transistor ST1 and the third scan transistor ST3 are turned on. The signal of the first clock signal terminal SCK1 is the high-level signal, and the seventh scan transistor ST7 is turned off. The turned-on first scan transistor ST1 transmits a low-level signal of the input terminal SIN to the first node S1, so that a level of the first node S1 becomes a low-level, the turned-on twelfth scan transistor ST12 transmits a low-level signal of the first node S1 to the third node S3, so that a level of the third node S3 becomes a low-level, and the second scan transistor ST2, the fourth scan transistor ST4, the eighth scan transistor ST8, and the tenth scan transistor ST10 are turned on. The turned-on second scan transistor ST2 transmits the low-level signal of the third clock signal terminal SCK3 to the second node S2, thus a level of the second node S2 may be further lowered, so the second node S2 and the fourth node S4 continue to be kept at low-levels of the previous stage, so that the fifth scan transistor ST5 and the sixth scan transistor ST6 are turned on. The signal of the first clock signal terminal SCK1 is the high-level signal, and the seventh scan transistor ST7 is turned off. In addition, the turned-on eighth scan transistor ST8 transmits a high-level signal of the first power supply terminal VGH to the seventh node S7, and the ninth scan transistor ST9 is turned off. The turned-on tenth scan transistor ST10 outputs a low-level signal of the second power supply terminal VGL, so a signal of the output terminal SOUT turns to be at a low-level.

In an exemplary embodiment, an input terminal of a first stage scan shift register is electrically connected with the scan initial signal line, and an output terminal of an i-th stage scan shift register is electrically connected with an input terminal of an (i+1)-th stage scan shift register; the i-th stage scan shift register has a first clock signal terminal electrically connected with a first scan clock signal line, a second clock signal terminal electrically connected with a second scan clock signal line, and a third clock signal terminal electrically connected with a third scan clock signal line; the (i+1)-th stage scan shift register has a first clock signal terminal electrically connected with a third scan clock signal line, a second clock signal terminal electrically connected with a second scan clock signal line, and a third clock signal terminal electrically connected with a first scan clock signal line; a first power supply terminal of the i-th stage scan shift register is electrically connected with a high-level power supply line connected with the scan drive circuit, and a second power supply terminal of the i-th stage scan shift register is electrically connected with a low-level power supply line connected with the scan drive circuit.

In an exemplary embodiment, a first conductive layer may include gate electrodes of multiple light emitting transistors, gate electrodes of multiple scan transistors, gate electrodes of multiple control transistors, first electrode plates of multiple light emitting capacitors, first electrode plates of multiple scan capacitors, and first electrode plates of multiple control capacitors.

In an exemplary embodiment, a second conductive layer may include second electrode plates of multiple light emitting capacitors, second electrode plates of multiple scan capacitors, and second electrode plates of multiple control capacitors.

In an exemplary embodiment, a third conductive layer may include: source-drain electrodes of multiple light emitting transistors, source-drain electrodes of multiple scan transistors, and source-drain electrodes of multiple control transistors.

In an exemplary embodiment, a fourth conductive layer may include: a light emitting initial signal line, at least one light emitting clock signal line, a scan initial signal line, at least one scan clock signal line, a control initial signal line, and at least one control clock signal line.

In an exemplary embodiment, FIG. 9A to FIG. 9I are partial schematic diagrams of a display substrate including four drive circuits according to an exemplary embodiment. As shown in FIG. 9A to FIG. 9I, when the display substrate is an LTPO display substrate, as shown in FIG. 9A to FIG. 9I, when the display substrate is an LTPS display substrate, the first reset signal terminal and the second reset signal terminal are different signal terminals, and the control signal terminal and the scan signal terminal are a same signal terminal. Multiple drive circuits include a light emitting drive circuit EM GOA, a first reset drive circuit RST1 GOA, a second reset drive circuit RST2 GOA, and a control drive circuit GateP GOA. The light emitting drive circuit EM GOA is configured to provide a drive signal to a light emitting transistor, the control drive circuit GateP GOA is configured to provide a drive signal to the writing transistor and/or the compensation transistor, the first reset drive circuit RST1 GOA is configured to provide a drive signal to the first reset transistor, and the second reset drive circuit RST2 GOA is configured to provide a drive signal to the second reset transistor.

In an exemplary embodiment, high-level power supply lines connected with at least two adjacent drive circuits in the light emitting drive circuit EM GOA, the first reset drive circuit RST1 GOA, the second reset drive circuit RST2 GOA, and the control drive circuit GateP GOA are a same power supply line and/or low-level power supply lines connected with at least two adjacent drive circuits in the light emitting drive circuit, the first reset drive circuit, the second reset drive circuit, and the control drive circuit are a same power supply line. When the high-level power supply lines connected with at least two adjacent drive circuits in the light emitting drive circuit EM GOA, the first reset drive circuit RST1 GOA, the second reset drive circuit RST2 GOA, and the control drive circuit GateP GOA are the same power supply line and the low-level power supply lines connected with at least two adjacent drive circuits in the light emitting drive circuit EM GOA, the first reset drive circuit RST1 GOA, the second reset drive circuit RST2 GOA, and the control drive circuit GateP GOA are the same power supply line, a drive circuit connected with the same low-level power supply line and a drive circuit connected with the same high-level power supply line may be a same drive circuit or may be different drive circuits.

In an exemplary embodiment, a power supply line may be a high-level power supply line and/or a low-level power supply line, and two drive circuits connected with power supply lines connected with two drive circuits may be the light emitting drive circuit EM GOA and the first reset drive circuit RST1 GOA, or the first reset drive circuit RST1 GOA and the control drive circuit GateP GOA, or the control drive circuit GateP GOA and the second reset drive circuit RST2 GOA. Three drive circuits connected with power supply lines connected with three drive circuits may be the light emitting drive circuit EM GOA, the first reset drive circuit RST1 GOA, and the control drive circuit GateP GOA, or the first reset drive circuit RST1 GOA, the control drive circuit GateP GOA, and the second reset drive circuit RST2 GOA.

Figure 9A:
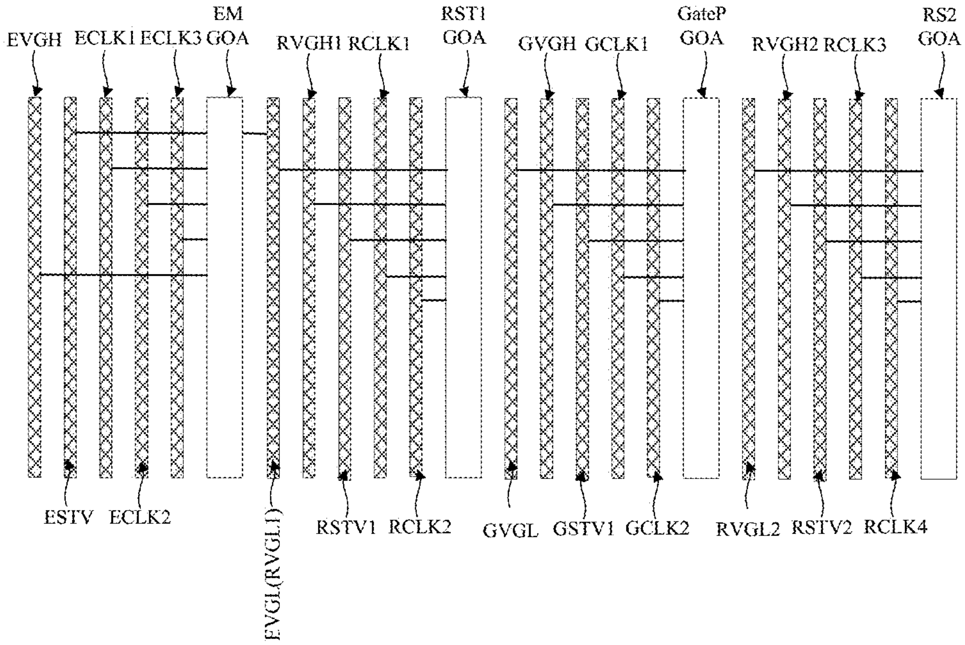
FIG. 9A to FIG. 9I are partial schematic diagrams of a display substrate including four drive circuits according to an exemplary embodiment.
Figure 9B:
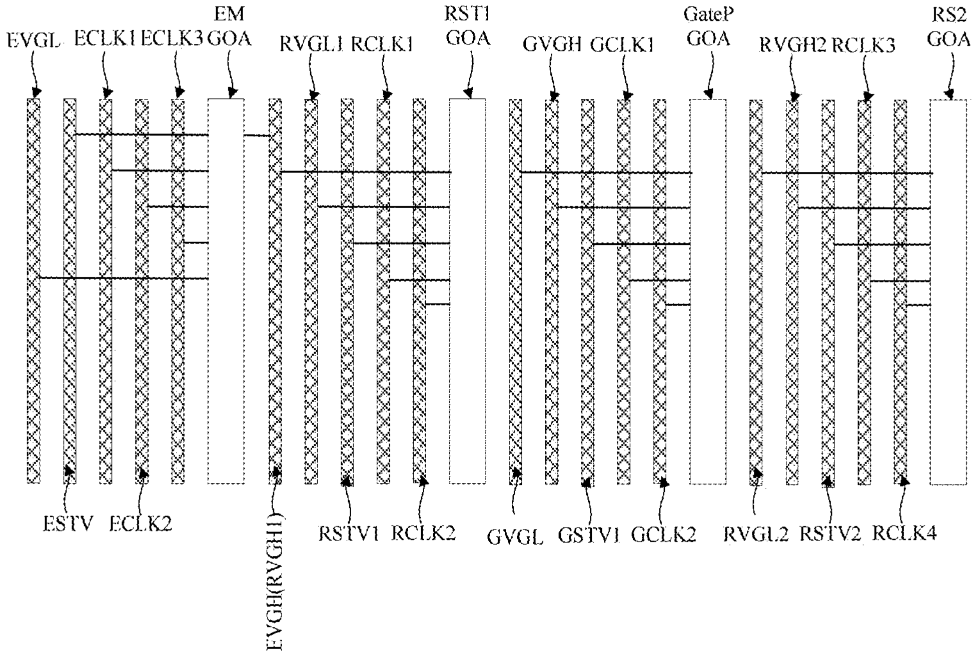
Figure 9C:
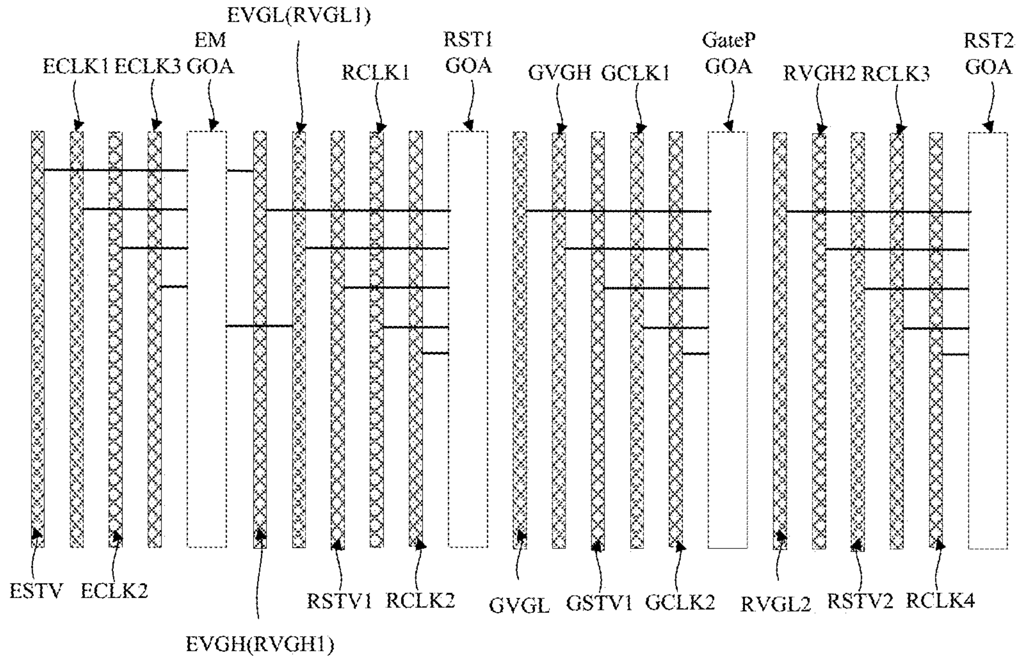
Figure 9D:
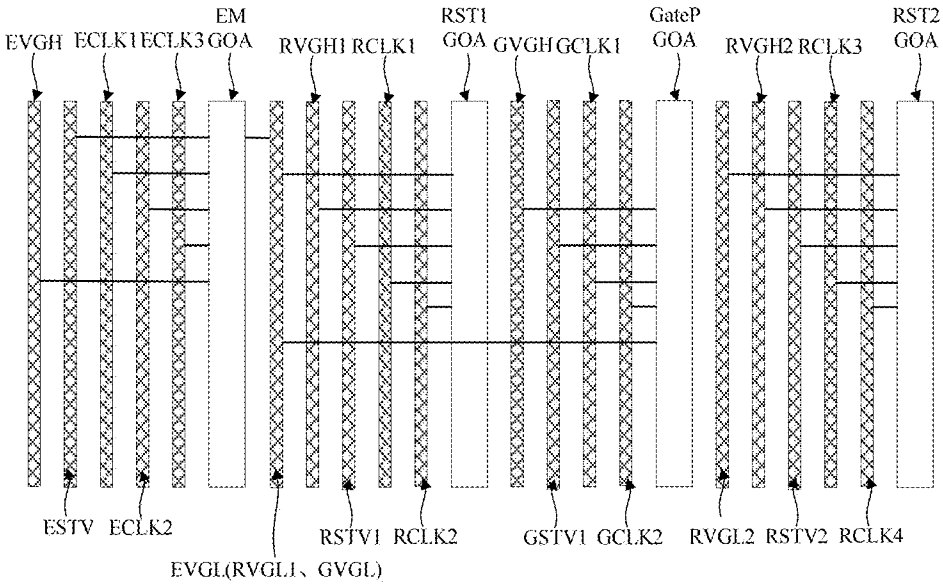
Figure 9E:
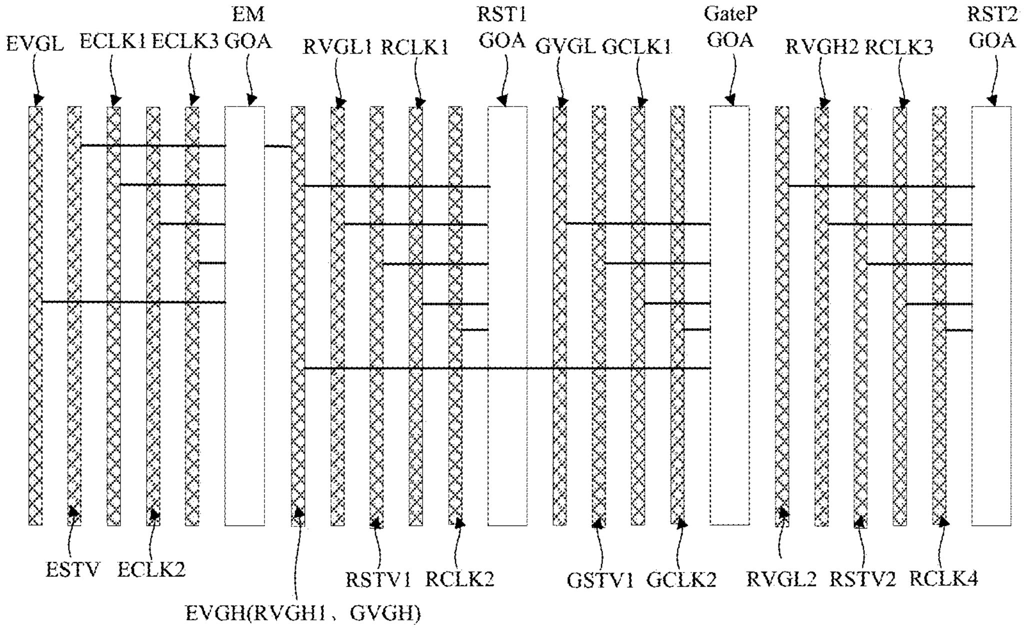
Figure 9F:
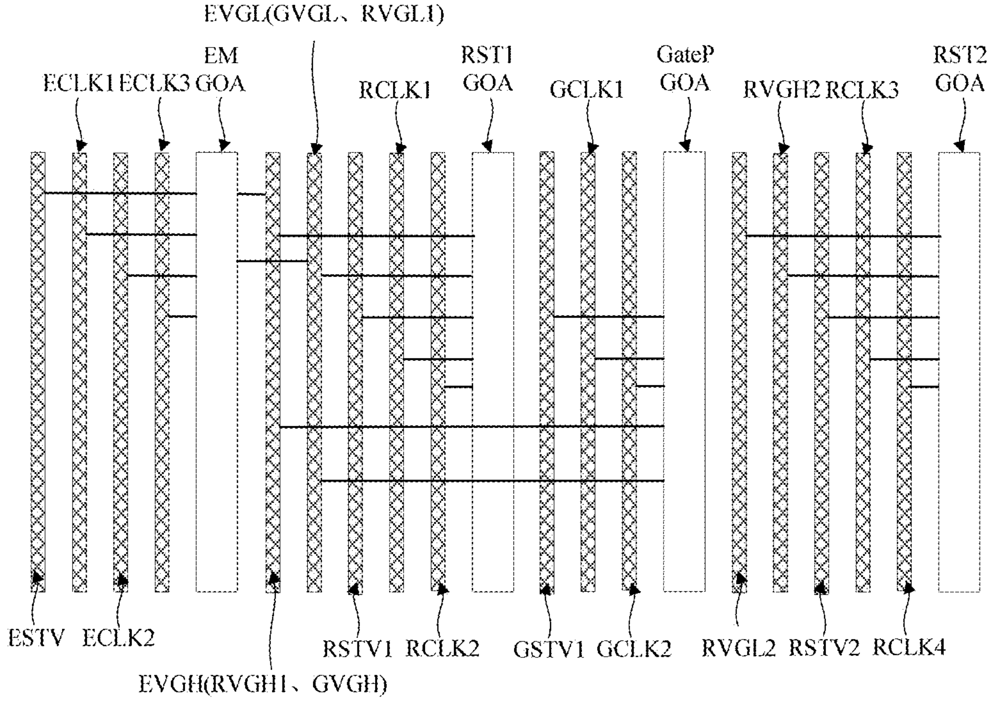
Figure 9G:
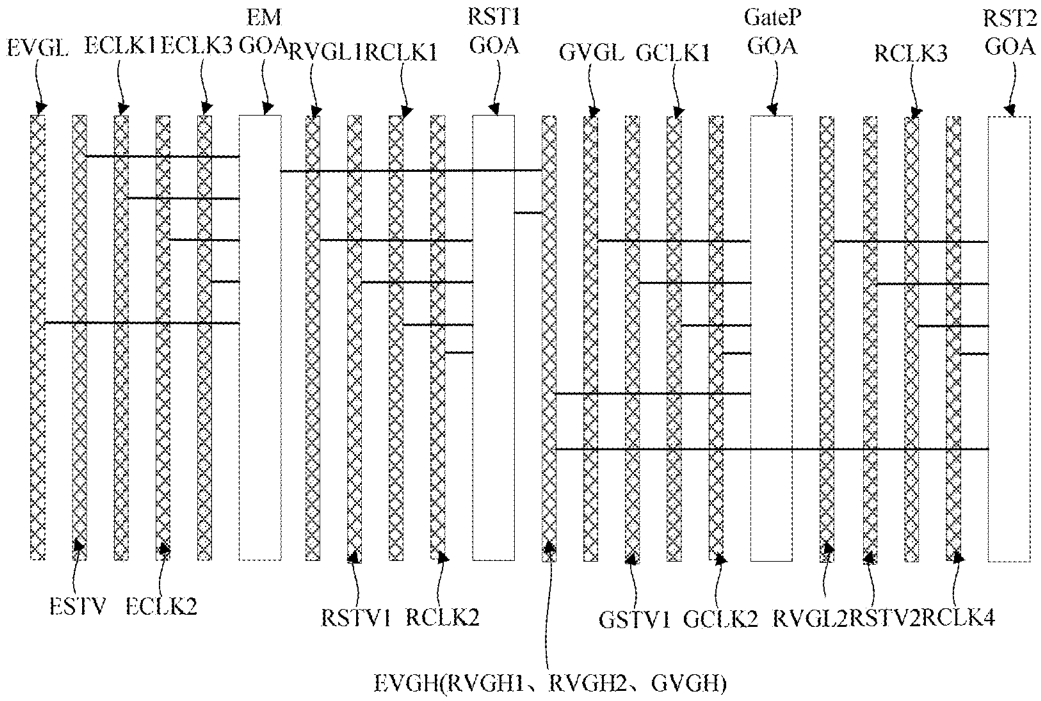
Figure 9H:
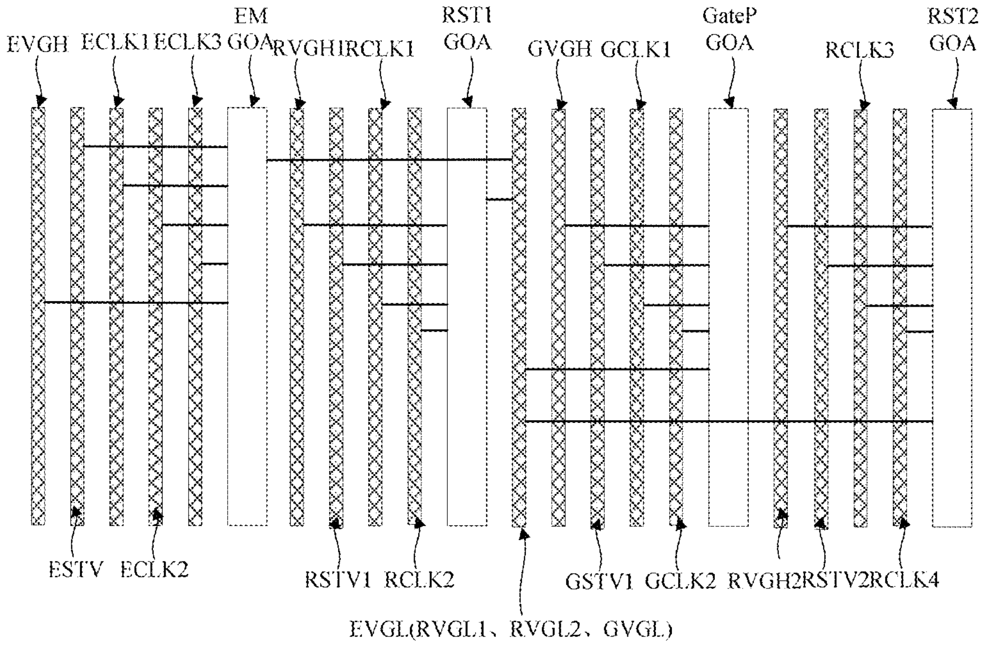
Figure 9I:
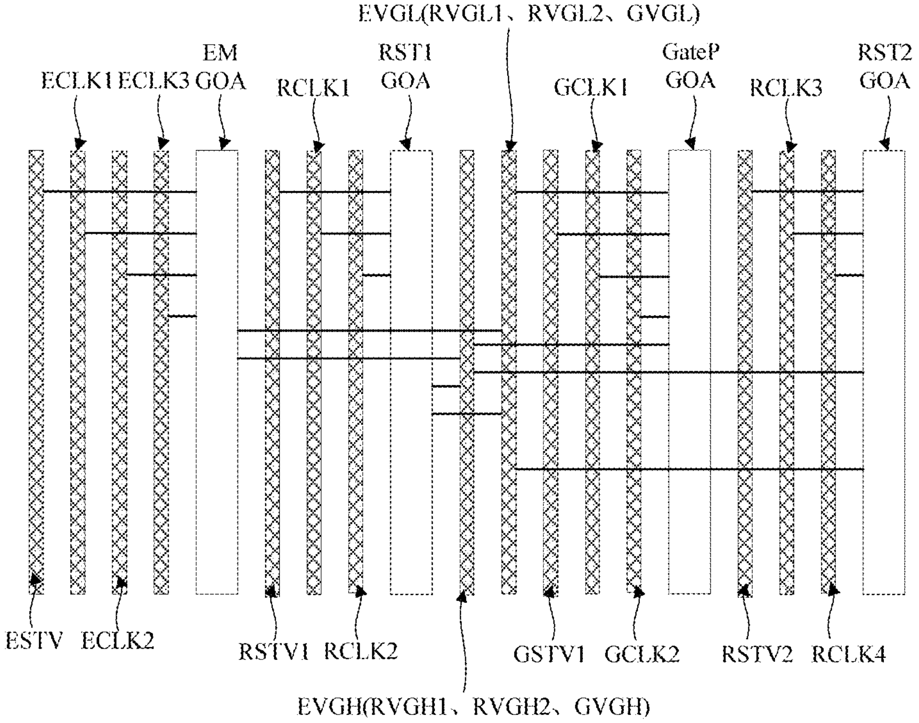

FIG. 9A is illustrated by taking a case in which a low-level power supply line EVGL connected with the light emitting drive circuit EM GOA and a low-level power supply line RVGL connected with the first reset drive circuit RST1 GOA are a same power supply line as an example. FIG. 9B is illustrated by taking a case in which a high-level power supply line EVGH connected with the light emitting drive circuit EM GOA and a high-level power supply line RVGH connected with the first reset drive circuit RST1 GOA are a same power supply line as an example. FIG. 9C is illustrated by taking a case in which a low-level power supply line EVGL connected with the light emitting drive circuit EM GOA and a low-level power supply line RVGL connected with the first reset drive circuit RST1 GOA are a same power supply line, and a high-level power supply line EVGH connected with the light emitting drive circuit EM GOA and a high-level power supply line RVGH connected with the first reset drive circuit RST1 GOA are a same power supply line as an example. FIG. 9D is illustrated by taking a case in which a low-level power supply line EVGL connected with the light emitting drive circuit EM GOA, a low-level power supply line RVGL1 connected with the first reset drive circuit RST1 GOA, and a low-level power supply line GVGL connected with the control drive circuit GateP GOA are a same power supply line as an example. FIG. 9E is illustrated by taking a case in which a high-level power supply line EVGL connected with the light emitting drive circuit EM GOA, a high-level power supply line RVGH1 connected with the first reset drive circuit RST1 GOA, and a high-level power supply line GVGH connected with the control drive circuit GateP GOA are a same power supply line as an example. FIG. 9F is illustrated by taking a case in which a low-level power supply line EVGL connected with the light emitting drive circuit EM GOA, a low-level power supply line RVGL1 connected with the first reset drive circuit RST1 GOA, and a low-level power supply line GVGL connected with the control drive circuit GateP GOA are a same power supply line, and a high-level power supply line EVGL connected with the light emitting drive circuit EM GOA, a high-level power supply line RVGH1 connected with the first reset drive circuit RST1 GOA, and a high-level power supply line GVGH connected with the control drive circuit GateP GOA are a same power supply line as an example. FIG. 9G is illustrated by taking a case in which a low-level power supply line EVGL connected with the light emitting drive circuit EM GOA, a low-level power supply line RVGL1 connected with the first reset drive circuit RST1 GOA, a low-level power supply line GVGL connected with the control drive circuit GateP GOA, and a low-level power supply line RVGL2 connected with the second reset drive circuit RST2 GOA are a same power supply line as an example. FIG. 9H is illustrated by taking a case in which a high-level power supply line EVGL connected with the light emitting drive circuit EM GOA, a high-level power supply line RVGH1 connected with the first reset drive circuit RST1 GOA, a high-level power supply line GVGH connected with the control drive circuit GateP GOA, and a high-level power supply line RVGH2 connected with the second reset drive circuit RST2 GOA are a same power supply line as an example. FIG. 9I is illustrated by taking a case in which a low-level power supply line EVGL connected with the light emitting drive circuit EM GOA, a low-level power supply line RVGL1 connected with the first reset drive circuit RST1 GOA, a low-level power supply line GVGL connected with the control drive circuit GateP GOA, and a low-level power supply line RVGL2 connected with the second reset drive circuit RST2 GOA are a same power supply line, and a high-level power supply line EVGL connected with the light emitting drive circuit EM GOA, a high-level power supply line RVGH1 connected with the first reset drive circuit RST1 GOA, a high-level power supply line GVGH connected with the control drive circuit GateP GOA, and a high-level power supply line RVGH2 connected with the second reset drive circuit RST2 GOA are a same power supply line as an example.

In an exemplary embodiment, when high-level power supply lines connected with two adjacent drive circuits in the light emitting drive circuit EM GOA, the first reset drive circuit RST1 GOA, the second reset drive circuit RST2 GOA, and the control drive circuit GateP GOA are a same power supply line, an orthographic projection of the high-level power supply line on the base substrate is partially overlapped with an orthographic projection of one of the drive circuits connected with the high-level power supply line on the base substrate, or is located between the connected two adjacent drive circuits; or, when high-level power supply lines connected with at least three adjacent drive circuits in the light emitting drive circuit EM GOA, the first reset drive circuit RST1 GOA, the second reset drive circuit RST2 GOA, and the control drive circuit GateP GOA are a same power supply line, an orthographic projection of the high-level power supply line on the base substrate is partially overlapped with an orthographic projection of one of the drive circuits connected with the high-level power supply line on the base substrate, or is located between two adjacent drive circuits.

In an exemplary embodiment, when low-level power supply lines connected with two adjacent drive circuits in the light emitting drive circuit EM GOA, the first reset drive circuit RST1 GOA, the second reset drive circuit RST2 GOA, and the control drive circuit GateP GOA are a same power supply line, an orthographic projection of the low-level power supply line on the base substrate is partially overlapped with an orthographic projection of one of the drive circuits connected with the low-level power supply line on the base substrate, or is located between the connected two adjacent drive circuits; or, when low-level power supply lines connected with at least three adjacent drive circuits in the light emitting drive circuit EM GOA, the first reset drive circuit RST1 GOA, the second reset drive circuit RST2 GOA, and the control drive circuit GateP GOA are a same power supply line, an orthographic projection of the low-level power supply line on the base substrate is partially overlapped with an orthographic projection of one of the drive circuits connected with the low-level power supply line on the base substrate, or is located between two adjacent drive circuits.

In an exemplary embodiment, the light emitting drive circuit EM GOA is located on a side of the control drive circuit GateP GOA away from the display region, the first reset drive circuit RST1 GOA is located between the light emitting drive circuit and the control drive circuit GateP GOA, and the second reset drive circuit RST2 GOA is located on a side of the control drive circuit GateP GOA close to the display region.

In an exemplary embodiment, as shown in FIG. 9A to FIG. 9I, the circuit structure layer further includes a light emitting initial signal line ESTV, multiple light emitting clock signal lines, a control initial signal line GSTV, multiple control clock signal lines, a first reset initial signal line RSTV1, multiple first reset clock signal lines, a second reset initial signal line RSTV2, and multiple second reset clock signal lines which are located in the non-display region and extend along the first direction. The light emitting drive circuit EM GOA is respectively electrically connected with the light emitting initial signal line ESTV and multiple light emitting clock signal lines, the control drive circuit GateP GOA is respectively electrically connected with the control initial signal line GSTV and multiple control clock signal lines, the first reset drive circuit RST1 GOA is respectively electrically connected with the first reset initial signal line RSTV1 and multiple first reset clock signal lines, and the second reset drive circuit RST2 GOA is respectively electrically connected with the second reset initial signal line RSTV2 and multiple second reset clock signal lines. FIG. 9A to FIG. 9I are illustrated by taking a case of three light emitting clock signal lines ECLK1 to ECLK3, two control clock signal lines GCLK1 and GCLK2, two first reset clock signal lines RCLK1 and RCLK2, and two second reset clock signal lines RCLK3 and RCLK4 as an example.

In an exemplary embodiment, as shown in FIG. 9A to FIG. 9I, the light emitting initial signal line and the multiple light emitting clock signal lines are located on a side of the first reset initial signal line and the multiple first reset clock signal lines away from the display region, and the light emitting initial signal line is located on a side of the multiple light emitting clock signal lines close to or away from the display region. FIG. 9A to FIG. 9I are illustrated by taking a case in which the light emitting initial signal line is located on a side of the multiple light emitting clock signal lines away from the display region as an example.

In an exemplary embodiment, as shown in FIG. 9A to FIG. 9I, the first reset initial signal line and the multiple first reset clock signal lines are located on a side of the control initial signal line and the multiple control clock signal lines close to the display region, and the first reset initial signal line is located on a side of the multiple first reset clock signal lines close to the display region or away from the display region. FIG. 9A to FIG. 9I are illustrated by taking a case in which the first reset initial signal line is located on a side of the multiple first reset clock signal lines away from the display region as an example.

In an exemplary embodiment, as shown in FIG. 9A to FIG. 9I, the control initial signal line and the control clock signal line are located on a side of the second reset initial signal line and the multiple second reset clock signal lines away from the display region, and the control initial signal line is located on a side of the multiple control clock signal lines close to the display region or away from the display region. FIG. 9A to FIG. 9I are illustrated by taking a case in which the control initial signal line is located on a side of the multiple control clock signal lines away from the display region as an example.

In an exemplary embodiment, as shown in FIG. 9A to FIG. 9I, the second reset initial signal line is located on a side of the multiple second reset clock signal lines close to the display region or away from the display region. FIG. 9A to FIG. 9I are illustrated by taking a case in which the second reset initial signal line is located on a side of the multiple second reset clock signal lines away from the display region as an example.

In an exemplary embodiment, an arrangement of signal lines connected with multiple drive circuits may be determined according to the structure and functions of the display substrate, which is not limited in the present disclosure.

In an exemplary embodiment, the first reset drive circuit includes: multiple cascaded first reset shift registers, and at least one stage first reset shift register is electrically connected with the control signal line. At least one stage first reset shift register includes multiple first reset transistors and multiple first reset capacitors.

In an exemplary embodiment, the first reset shift register includes multiple first reset transistors and multiple first reset capacitors, and a circuit structure of the first reset shift register may be 8T2C, which is not limited in the present disclosure. The circuit structure of the first reset shift register may be the same as a circuit structure of the control shift register, which will not be repeated in the present disclosure.

Multiple cascaded first reset shift registers are connected with the first reset initial signal line and two first reset clock signal lines in a same manner as multiple cascaded control shift registers are connected with the control initial signal line and two control clock signal lines, which will not be repeated in the present disclosure.

In an exemplary embodiment, a second reset shift register includes multiple second reset transistors and multiple second reset capacitors, and a circuit structure of the second reset shift register may be 8T2C, which is not limited in the present disclosure. The circuit structure of the second reset shift register may be the same as the circuit structure of the control shift register, which will not be repeated in the present disclosure.

Multiple cascaded second reset shift registers are connected with the second reset initial signal line and two second reset clock signal lines in a same manner as multiple cascaded control shift registers are connected with the control initial signal line and two control clock signal lines, which will not be repeated in the present disclosure.

In an exemplary embodiment, a boundary of the display region AA includes at least one arc-shaped boundary. In an exemplary embodiment, a shape of the boundary of the display region may be a rounded rectangle.

The display substrate according to the present disclosure may achieve a function of bending four sides at a large angle, improving a wrinkling problem of module attaching, and improving a yield of products.

In an exemplary embodiment, the display substrate may further include another film layer, such as a post spacer, which is not limited in the present disclosure.

A "patterning process" mentioned in the present disclosure includes coating with a photoresist, mask exposure, development, etching, photoresist stripping, and other treatments for a metal material, an inorganic material, or a transparent conductive material, and includes coating with an organic material, mask exposure, development, and other treatments for an organic material. Deposition may be any one or more of sputtering, evaporation, and chemical vapor deposition. Coating may be any one or more of spray coating, spin coating, and inkjet printing. Etching may be any one or more of dry etching and wet etching, which is not limited in present disclosure. A "thin film" refers to a layer of thin film made of a material on a base substrate through a process such as deposition and coating. If the "thin film" does not need a patterning process in an entire preparation process, the "thin film" may also be called a "layer". If the "thin film" needs a patterning process in an entire preparation process, it is called a "thin film" before the patterning process, and called a "layer" after the patterning process. The "layer" after the patterning process includes at least one "pattern". "A and B being disposed in a same layer" mentioned in the present disclosure means that A and B are formed simultaneously through a same patterning process, and a "thickness" of a film layer is a dimension of the film layer in a direction perpendicular to a display substrate. In an exemplary embodiment of the present disclosure, "an orthographic projection of B is within a range of an orthographic projection of A" refers to a boundary of the orthographic projection of B falls within a range of a boundary of the orthographic projection of A, or a boundary of the orthographic projection of A is overlapped with a boundary of the orthographic projection of B.

A display substrate according to an exemplary embodiment is described through a preparation process of the display substrate by taking a case in which multiple drive circuits includes: a light emitting drive circuit, a scan drive circuit, and a control drive circuit as an example.

Figure 10:
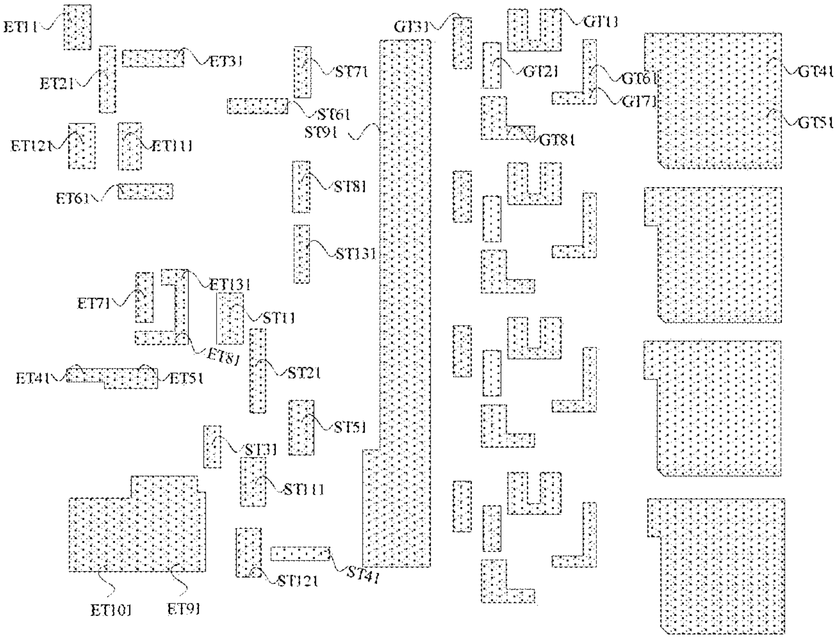
FIG. 10 is a schematic diagram after a semiconductor layer is formed.

(1) An active layer is formed on a base substrate, which includes: a semiconductor thin film is deposited on the base substrate, and the semiconductor thin film is patterned through a patterning process to form a semiconductor layer. As show in FIG. 10, FIG. 10 is a schematic diagram after the semiconductor layer is formed.

In an exemplary embodiment, the semiconductor layer includes an active layer ET11 of a first light emitting control transistor to an active layer ET131 of a thirteenth light emitting control transistor, an active layer ST11 of a first scan transistor to an active layer ST131 of a thirteenth scan transistor, and an active layer GT11 of a first control transistor to an active layer GT81 of an eighth control transistor.

In an exemplary embodiment, the active layer ET41 of the fourth light emitting control transistor and the active layer ET51 of the fifth light emitting control transistor are integrally formed, the active layer ET81 of the eighth light emitting control transistor and the active layer ET131 of the thirteenth light emitting control transistor are integrally formed, the active layer ET91 of the ninth light emitting control transistor and the active layer ET101 of the tenth light emitting control transistor are integrally formed, the active layer ST91 of the ninth scan transistor and the active layer ST101 of the tenth scan transistor are integrally molded, the active layer GT41 of the fourth control transistor and the active layer GT51 of the fifth control transistor are integrally molded, and the active layer GT61 of the sixth control transistor and the active layer GT71 of the seventh control transistor are integrally formed.

Figure 11:
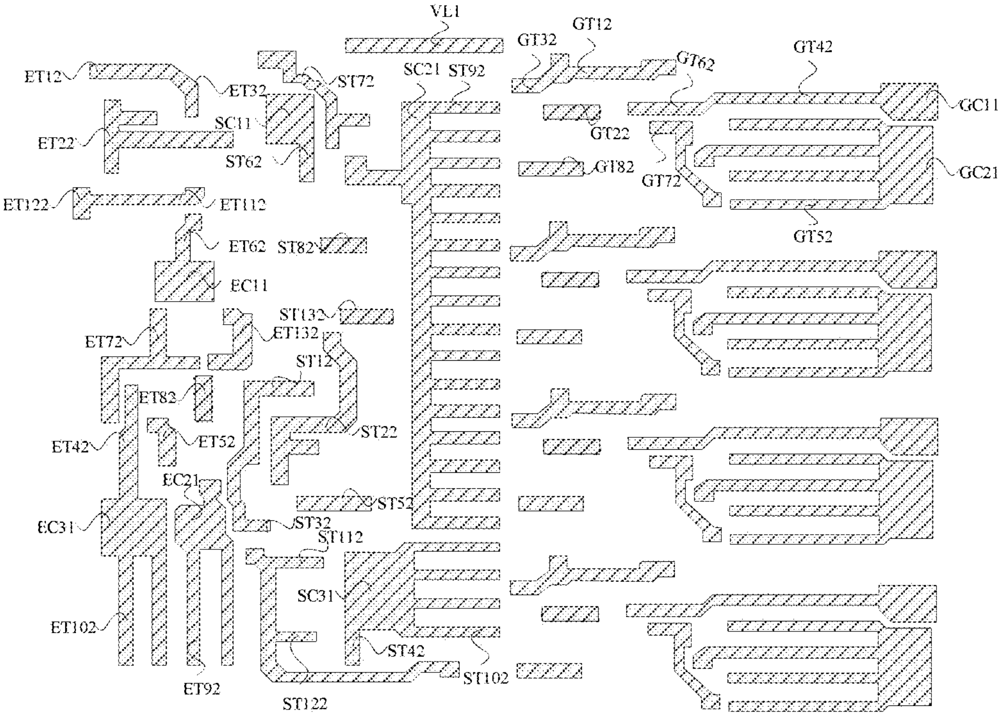
FIG. 11 is a schematic diagram of a first conductive layer.
Figure 12:
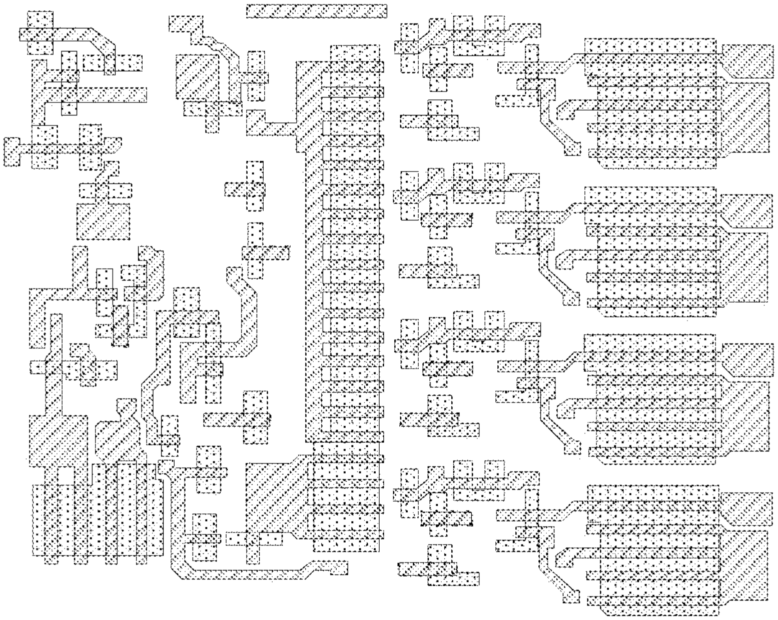
FIG. 12 is a schematic diagram after a first conductive layer is formed.

(2) A first conductive layer is formed, which includes: a first insulation thin film is deposited on the base substrate on which the aforementioned pattern is formed, the first insulation thin film is patterned through a patterning process to form a first insulation layer, a first conductive thin film is deposited on the first insulation layer, and the first conductive thin film is patterned through a patterning process to form a first metal layer, as shown in FIG. 11 and FIG. 12, FIG. 11 is a schematic diagram of the first conductive layer, and FIG. 12 is a schematic diagram after the first conductive layer is formed.

In an exemplary embodiment, the first conductive layer may include: a control electrode ET12 of the first light emitting control transistor to a control electrode ET132 of the thirteenth light emitting control transistor, a first electrode plate EC11 of a first light emitting capacitor to a first electrode plate EC31 of a third light emitting capacitor, a control electrode ST12 of the first scan transistor to a control electrode ST132 of the thirteenth scan transistor, a first electrode plate SC11 of a first scan capacitor to a first electrode plate SC31 of the third scan capacitor, a control electrode GT12 of the first control transistor to a control electrode GT82 of the eighth control transistor, a first electrode plate GC11 of a first control capacitor and a first electrode plate GC21 of a second control capacitor, and a first connection electrode VL1.

In an exemplary embodiment, a control electrode ET12 of the first light emitting control transistor and a control electrode ET32 of the third light emitting control transistor are integrally formed, a control electrode ET112 of the eleventh light emitting control transistor and a control electrode ET122 of the twelfth light emitting control transistor are integrally formed, a control electrode ET62 of the sixth light emitting control transistor and a first electrode plate EC11 of a first light emitting capacitor are integrally formed, a control electrode ET42 of the fourth light emitting control transistor, a first electrode plate EC31 of a third light emitting capacitor and a control electrode ET102 of the tenth light emitting control transistor are integrally formed, a control electrode ET92 of the ninth light emitting control transistor and a first electrode plate EC21 of a second light emitting capacitor are integrally formed, a scan electrode ST12 of the first scan transistor and a scan electrode ST32 of the third scan transistor are integrally formed, a scan electrode ST112 of the eleventh scan transistor and a scan electrode ST122 of the twelfth scan transistor are integrally formed, a scan electrode ST62 of the sixth scan transistor and a first electrode plate SC11 of a first scan capacitor are integrally formed, a scan electrode ST42 of the fourth scan transistor, a first electrode plate SC31 of a third scan capacitor and a scan electrode ST102 of the tenth scan transistor are integrally formed, a scan electrode ST92 of the ninth scan transistor and a first electrode plate SC21 of a second scan capacitor are integrally formed, a control electrode GT12 of the first control transistor and a control electrode GT32 of the third control transistor are integrally formed, a control electrode GT42 of the fourth control transistor, a control electrode GT62 of the sixth control transistor, and a first electrode plate GC11 of a first control capacitor are integrally formed, and a control electrode GT52 of the fifth control transistor and a first electrode plate GC21 of a second control capacitor are integrally formed.

Figure 13:
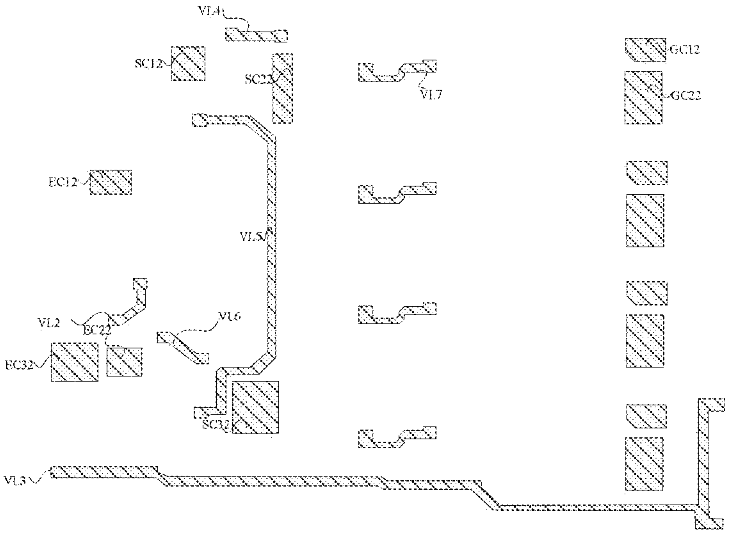
FIG. 13 is a schematic diagram of a second conductive layer.
Figure 14:
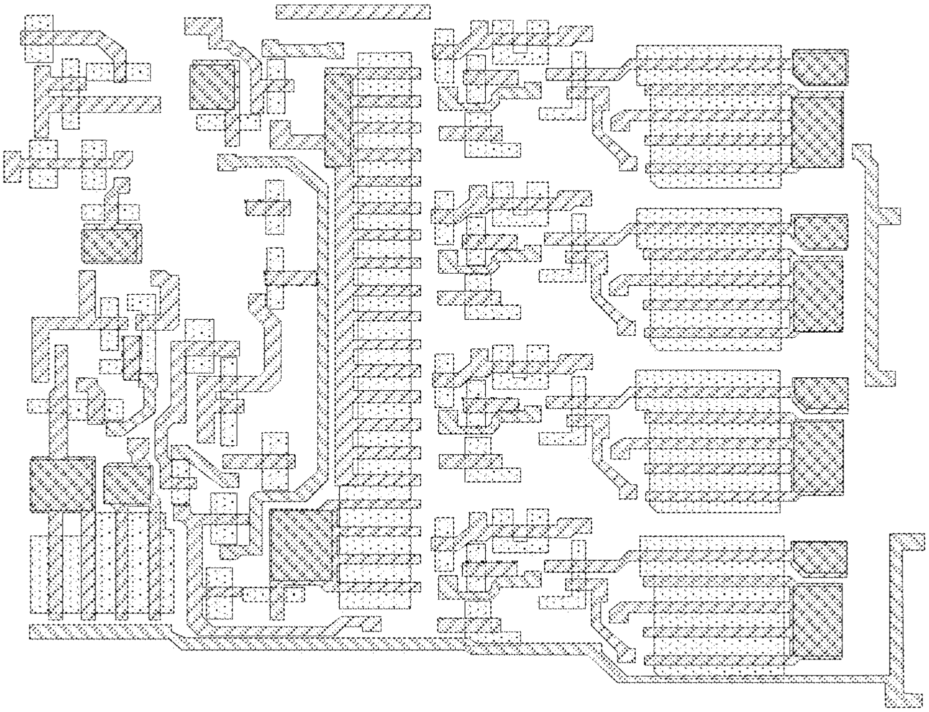
FIG. 14 is a schematic diagram after a second conductive layer is formed.

(3) A second conductive layer is formed, which includes: a second insulation thin film is deposited on the base substrate on which the aforementioned patterns are formed, and the second insulation thin film is patterned through a patterning process to form a second insulation layer. A second conductive thin film is deposited on the base substrate on which the second insulation layer is formed, and the second conductive thin film is patterned through a patterning process to form the second conductive layer. As shown in FIG. 13 and FIG. 14, FIG. 13 is a schematic diagram of the second conductive layer, and FIG. 14 is a schematic diagram after the second conductive layer is formed.

In an exemplary embodiment, the second conductive layer includes a second connection electrode VL2 to an eighth connection electrode VL8, a second electrode plate EC12 of the first light emitting capacitor to a second electrode plate EC32 of the third light emitting capacitor, a second electrode plate SC12 of the first scan capacitor to a second electrode plate SC32 of the third scan capacitor, and a second electrode plate GC12 of the first control capacitor and a second electrode plate GC22 of the second control capacitor.

Figure 15:
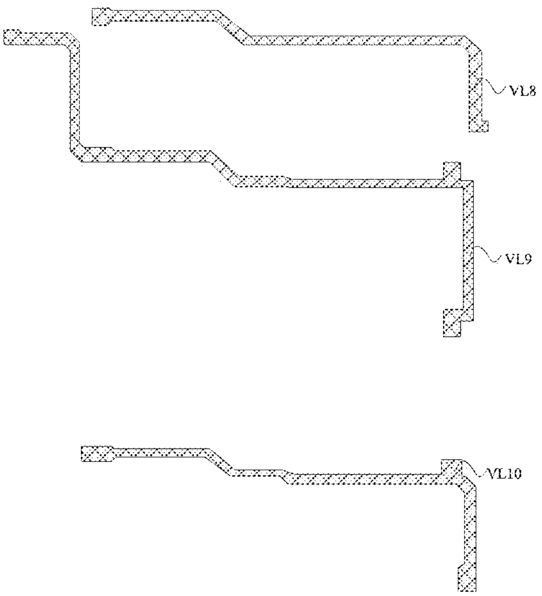
FIG. 15 is a schematic diagram of a fifth conductive layer.
Figure 16:
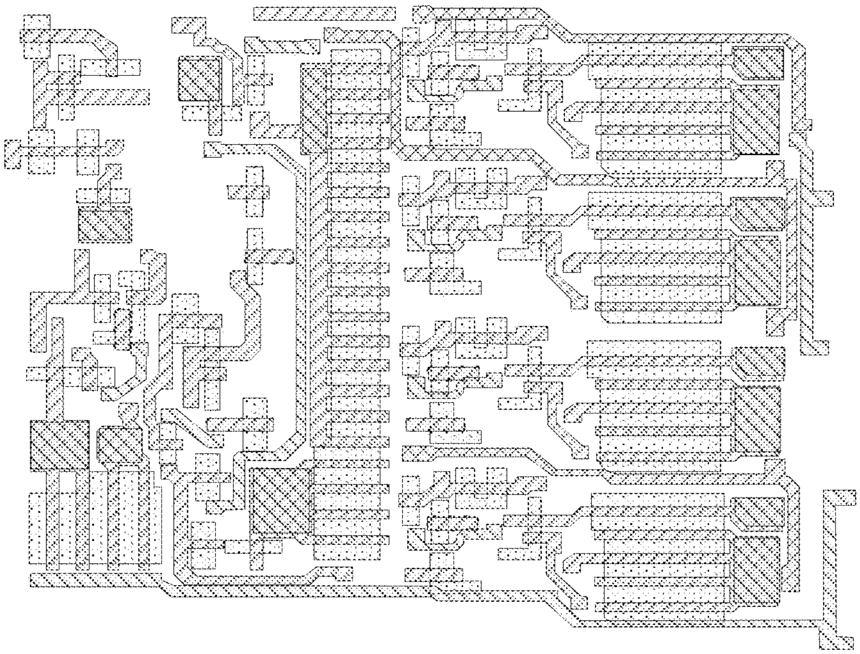
FIG. 16 is a schematic diagram after a fifth conductive layer is formed.

(4) A fifth conductive layer is formed, which includes: a fifth insulation thin film is deposited on the base substrate on which the aforementioned patterns are formed, the fifth insulation thin film is patterned through a patterning process to form a fifth insulation layer, a fifth conductive thin film is deposited on the fifth insulation layer, and the fifth conductive thin film is patterned through a patterning process to form the fifth conductive layer, as shown in FIG. 15 and FIG. 16, FIG. 15 is a schematic diagram of the fifth conductive layer, and FIG. 16 is a schematic diagram after the fifth conductive layer is formed.

In an exemplary embodiment, the fifth conductive layer includes an eighth connection electrode VL8 to a tenth connection electrode VL10.

Figure 17:
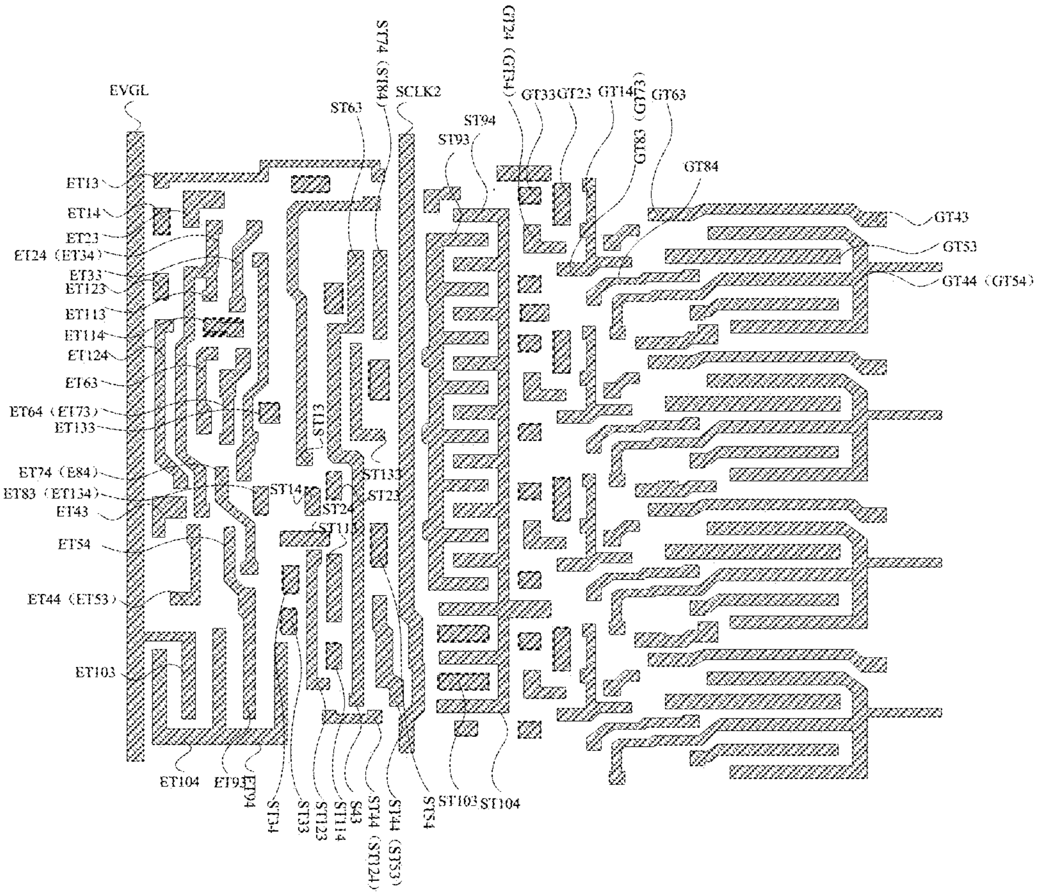
FIG. 17 is a schematic diagram of a third conductive layer.
Figure 18:
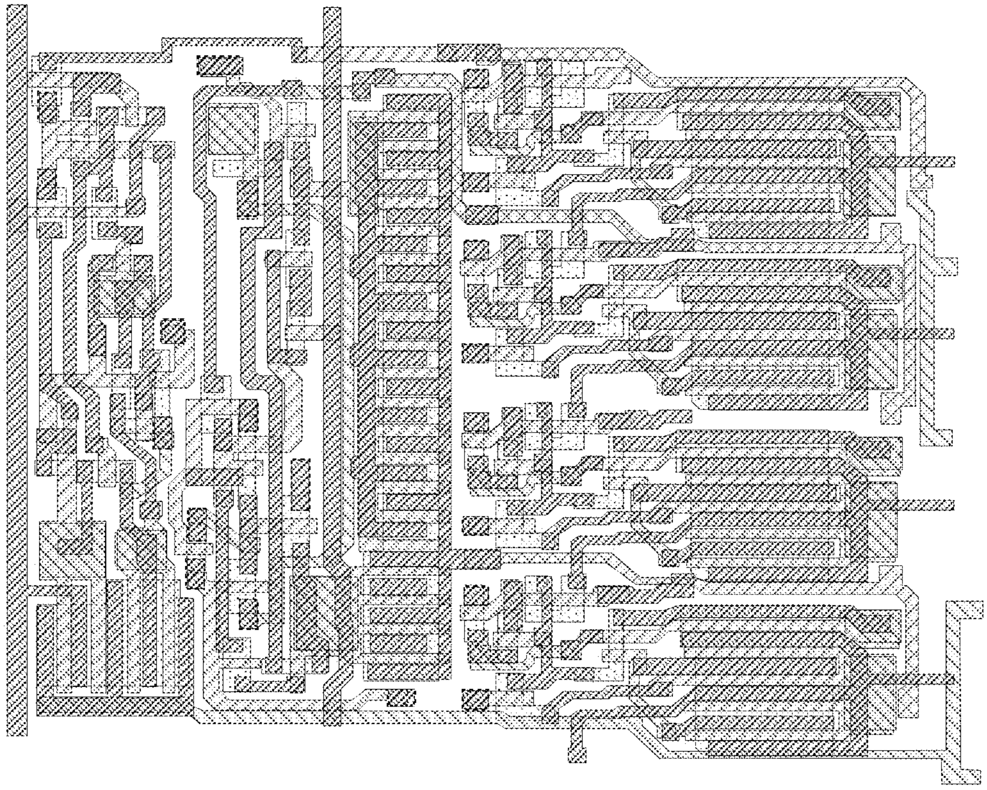
FIG. 18 is a schematic diagram after a third conductive layer is formed.

(5) A third conductive layer is formed, which includes: a third insulation thin film is deposited on the base substrate on which the aforementioned patterns are formed, the third insulation thin film is patterned through a patterning process to form a third insulation layer, a third conductive thin film is deposited on the third insulation layer, and the third conductive thin film is patterned through a patterning process to form the third conductive layer, as shown in FIG. 17 and FIG. 18, FIG. 17 is a schematic diagram of the third conductive layer, and FIG. 18 is a schematic diagram after the third conductive layer is formed.

In an exemplary embodiment, the third conductive layer at least includes: a low-level power supply line EVGL, a first electrode ET13 and a second electrode ET14 of the first light emitting control transistor to a first electrode ET133 and a second electrode ET134 of the thirteenth light emitting control transistor, a first electrode ST13 and a second electrode ST14 of the first scan transistor to a first electrode ST133 and a second electrode ST134 of the thirteenth scan transistor, a second scan clock signal line SCLK2, a first electrode GT13 and a second electrode GT14 of the first control transistor to a first electrode GT83 and a second electrode GT84 of the eighth control transistor.

In an exemplary embodiment, the first connection electrode VL1 is electrically connected with the first electrode ET13 of the first light emitting control transistor and the eighth connection electrode VL8, respectively. The second connection electrode VL2 is electrically connected with the second electrode ET54 of the fifth light emitting control transistor and the first electrode ET83 of the eighth light emitting control transistor, respectively. The third connection electrode VL3 is connected with the second electrode ET104 of the tenth light emitting control transistor. The fourth connection electrode is electrically connected with the tenth connection electrode VL10 and the first electrode ST13 of the first scan transistor. The fifth connection electrode VL5 is electrically connected with the second electrode ST114 of the eleventh scan transistor and the control electrode of the sixth scan transistor, respectively. The sixth connection electrode VL6 is electrically connected with the second electrode ST34 of the third scan transistor and the second electrode ST24 of the second scan transistor, respectively. The seventh connection electrode VL7 is electrically connected with the second electrode of the second control transistor and the second electrode of the fourth control transistor, respectively. The tenth connection electrode VL10 is electrically connected with the second electrode ST104 of the tenth scan transistor.

Figure 19:
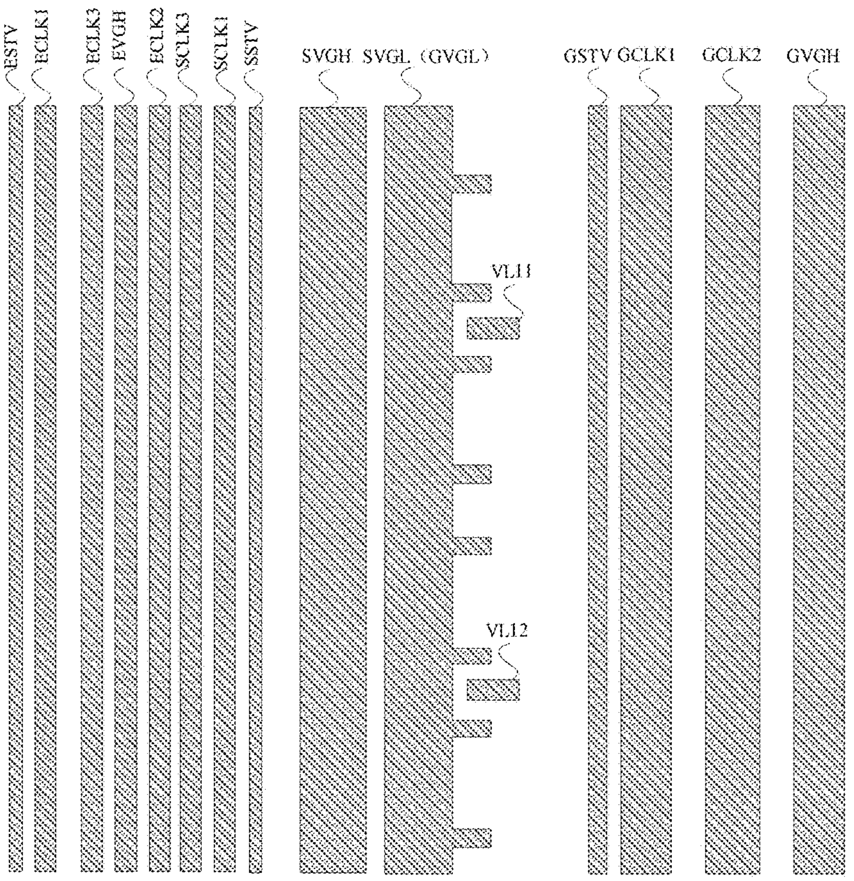
FIG. 19 is a schematic diagram of a fourth conductive layer.
Figure 20:
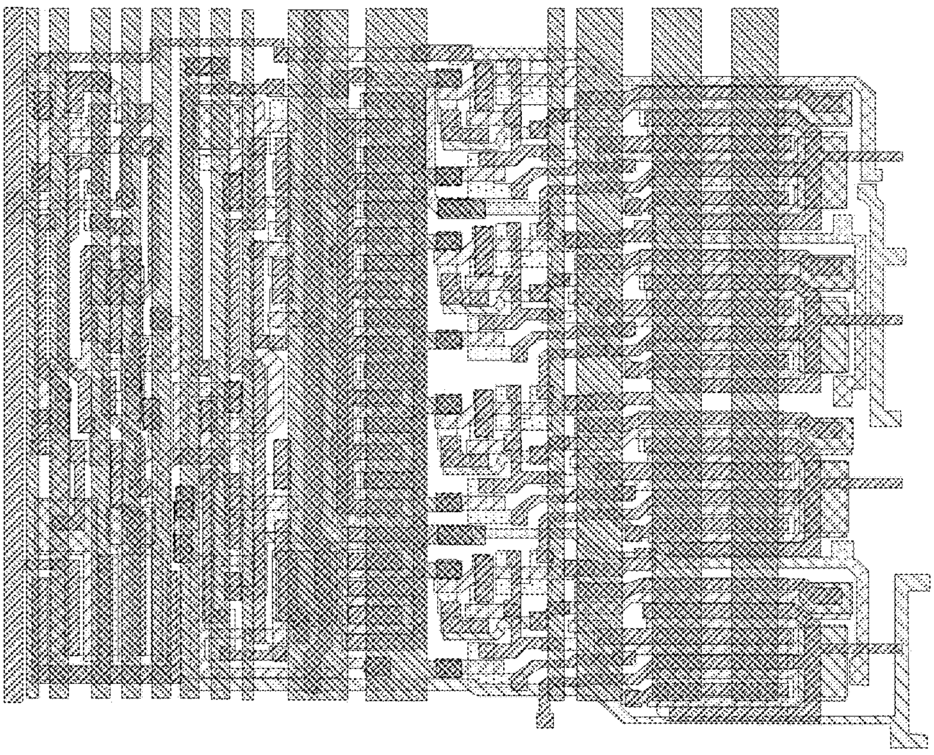
FIG. 20 is a schematic diagram after a fourth conductive layer is formed.

(6) A fourth conductive layer is formed, which includes: a fourth insulation thin film is deposited on the base substrate on which the aforementioned patterns are formed, the fourth insulation thin film is patterned through a patterning process to form a fourth insulation layer, a fourth conductive thin film is deposited on the fourth insulation layer, and the fourth conductive thin film is patterned through a patterning process to form the fourth conductive layer, as shown in FIG. 19 and FIG. 20, FIG. 19 is a schematic diagram of the fourth conductive layer, and FIG. 20 is a schematic diagram after the fourth conductive layer is formed.

In an exemplary embodiment, the fourth conductive layer at least includes: a light emitting initial signal line ESTV, a first light emitting clock signal line ECLK1 to a third light emitting clock signal line ECLK3, a scan initial signal line SSTV, a first scan clock signal line SCLK1, a third scan clock signal line SCLK3, a control initial signal line GSTV, a first control clock signal line GCLK1, a second control clock signal line GCLK2, a high-level power supply line EVGH connected with a light emitting drive circuit, a high-level power supply line SVGH connected with a scan drive circuit, a high-level power supply line GVGH connected with a control drive circuit, a low-level power supply line VGL connected with the scan drive circuit, a low-level power supply line GVGL connected with the control drive circuit, an eleventh connection electrode VL11, and a twelfth connection electrode VL12.

In an exemplary embodiment, the twelfth connection electrode VL12 is electrically connected with the second electrode of the tenth scan transistor, and the eleventh connection electrode is electrically connected with the eighth connection electrode.

In an exemplary embodiment, the low-level power supply line SVGL with which the scan drive circuit is connected and the low-level power supply line GVGL with which the control drive circuit is connected are a same power supply line.

In an exemplary embodiment, the light emitting drive circuit is connected with two low-level power supply lines, a control electrode of a tenth light emitting transistor in the light emitting drive circuit is electrically connected with a low-level power supply line EVGL with which the light emitting drive circuit is connected, and a control electrode of an eleventh light emitting transistor and a control electrode of a twelfth light emitting transistor are electrically connected with the low-level power supply line SVGL with which the scan drive circuit is connected.

In an exemplary embodiment, widths of a high-level power supply line and a low-level power supply line are greater than widths of any initial signal line and any clock signal line.

Figure 21:
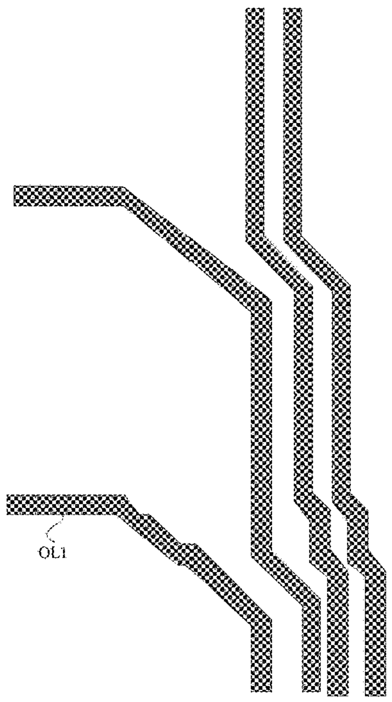
FIG. 21 is a schematic diagram of a sixth conductive layer.
Figure 22:
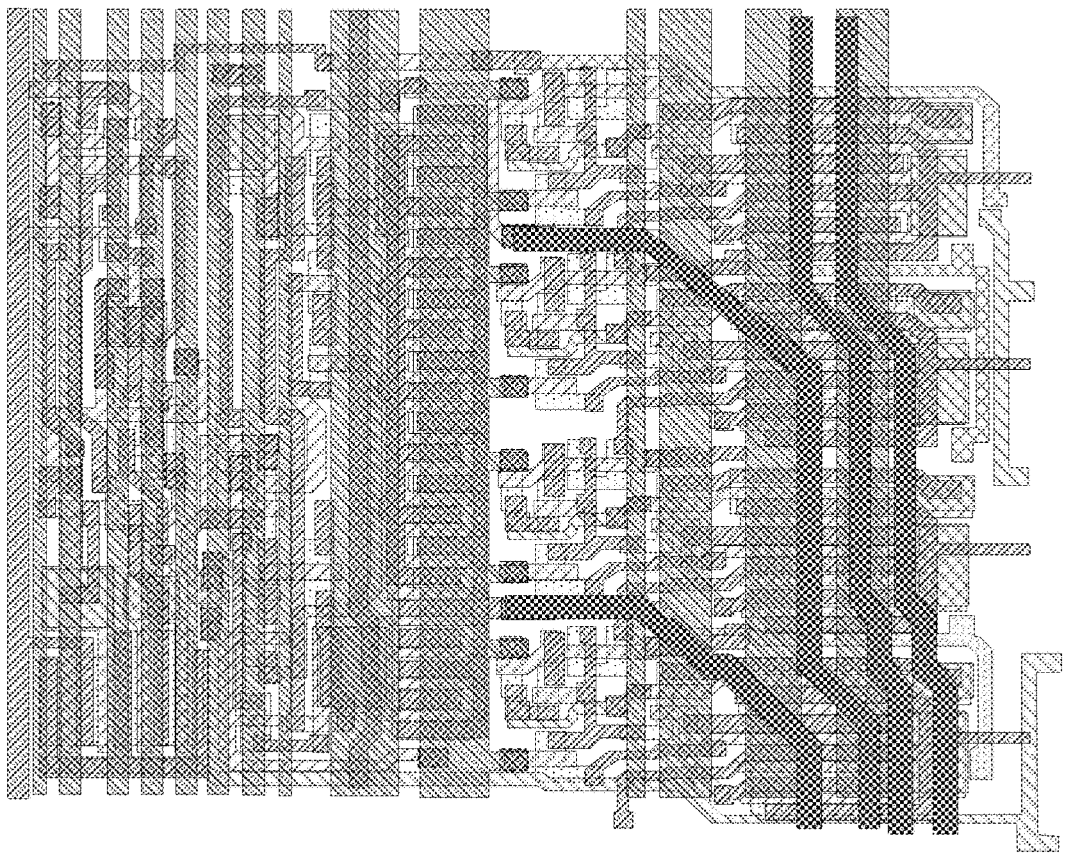
FIG. 22 is a schematic diagram after a sixth conductive layer is formed.

(7) A sixth conductive layer is formed, which includes: a planarization thin film is coated on the base substrate on which the aforementioned patterns are formed, and a planarization layer is formed by masking, exposing, and developing the planarization thin film. A transparent conductive thin film is deposited on the planarization layer, and the transparent conductive thin film is patterned through a patterning process to form the sixth conductive layer, as shown in FIG. 21 and FIG. 22, FIG. 21 is a schematic diagram of the sixth conductive layer, and FIG. 22 is a schematic diagram after the sixth conductive layer is formed.

In an exemplary embodiment, the sixth conductive layer includes a first output signal line OL1. Among them, the first output signal line is an output signal line of the scan drive circuit; an orthographic projection of at least one first output signal line on the base substrate is at least partially overlapped with an orthographic projection of at least one of the control drive circuit, the scan drive circuit, and the light emitting drive circuit on the base substrate.

In an exemplary embodiment, an included angle between an extension direction of the first output signal line and a first direction is greater than or equal to 0 degree and less than 45 degrees, wherein the included angle between the extension direction of the first output signal line and the first direction may be equal to 0 degree, which is not limited in the present disclosure.

(8) A light emitting structure layer is formed, which includes: a second planarization thin film is coated on the base substrate on which the aforementioned patterns are formed, the second planarization thin film is patterned through a patterning process to form a second planarization layer, an anode thin film is deposited on the second planarization layer, the anode thin film is patterned through a patterning process to form an anode, a pixel definition thin film is deposited on the anode, the pixel definition thin film is patterned through a patterning process to form a pixel definition layer, an organic emitting thin film is evaporated on the pixel definition layer, the organic emitting thin film is patterned through a patterning process to form an organic emitting layer, a cathode thin film is deposited on the organic emitting layer, and the cathode thin film is patterned through a patterning process to form a cathode.

In an exemplary embodiment, a pattern of an optical coupling layer may be formed after the cathode is formed. The optical coupling layer is disposed on the cathode. A refractive index of the optical coupling layer may be greater than a refractive index of the cathode, which facilitates light extraction and increases a light output efficiency. A material of the optical coupling layer may be an organic material, or an inorganic material, or an organic material and an inorganic material, and may be a single layer, a multi-layer, or a composite layer, which is not limited in the present disclosure.

In an exemplary embodiment, the semiconductor layer may be a metal oxide layer. The metal oxide layer may be made of an oxide containing indium and tin, an oxide containing tungsten and indium, an oxide containing tungsten and indium and zinc, an oxide containing titanium and indium, an oxide containing titanium and indium and tin, an oxide containing indium and zinc, an oxide containing silicon and indium and tin, or an oxide containing indium or gallium and zinc, etc. The metal oxide layer may be a single layer, or a double-layer, or may be a multi-layer. An active layer thin film may be made of an amorphous Indium Gallium Zinc Oxide (a-IGZO), Zinc Oxynitride (ZnON), Indium Zinc Tin Oxide (IZTO), amorphous Silicon (a-Si), polycrystalline Silicon (p-Si), hexathiophene, polythiophene, and other materials, that is, the present disclosure is applicable to transistors manufactured based on an oxide technology, a silicon technology, and an organic matter technology.

In an exemplary embodiment, the first insulation layer, the second insulation layer, the third insulation layer to the fifth insulation layer may be made of any one or more of Silicon Oxide (SiOx), Silicon Nitride (SiNx), and Silicon Oxynitride (SiON), and may be a single layer, a multi-layer, or a composite layer.

In an exemplary embodiment, the first conductive thin film to the fifth conductive thin film may be made of a metal material, such as any one or more of Argentum (Ag), Copper (Cu), Aluminum (Al), Titanium (Ti), and Molybdenum (Mo), or an alloy material of the abovementioned metals, such as an Aluminum-Neodymium alloy (AlNd) or a Molybdenum-Niobium alloy (MoNb), and may be of a single layer structure, or a multi-layer composite structure such as Ti/Al/Ti.

In an exemplary embodiment, a material of the pixel definition layer may include polyimide, acrylic, or polyethylene terephthalate.

In an exemplary embodiment, a patterning process of a half tone mask or a gray tone mask may be employed to form a pattern of a Post Spacer (PS) 25 during formation of the pixel definition layer, wherein the post spacer 25 may be disposed outside of a pixel opening, and the post spacer 25 is configured to support a fine metal mask in a subsequent evaporation process.

In an exemplary embodiment, the planarization layer may be made of an organic material. In an exemplary embodiment, the anode thin film may be made of Indium Tin Oxide (ITO) or Indium Zinc Oxide (IZO).

In an exemplary implementation mode, the cathode thin film may be made of any one or more of Magnesium (Mg), Argentum (Ag), Aluminum (Al), Copper (Cu), and Lithium (Li), or an alloy made of any one or more of the above metals.

The display substrate according to the embodiment of the present disclosure may be applied to a display product with any resolution.

An embodiment of the present disclosure also provides a display apparatus, including a display substrate.

In an exemplary embodiment, the display apparatus may be any product or component with any display function, such as a display, a television, a mobile phone, a tablet computer, a navigator, a digital photo frame, and a wearable display product.

The display substrate is the display substrate according to any of the aforementioned embodiments, and has similar implementation principles and implementation effects, which will not be repeated here.

The accompanying drawings of the present disclosure only involve structures involved in the embodiments of the present disclosure, and other structures may refer to usual designs.

For the sake of clarity, in the accompanying drawings used for describing the embodiments of the present disclosure, a thickness and a dimension of a layer or a micro structure is enlarged. It may be understood that when an element such as a layer, a film, a region, or a substrate is described as being "on" or "under" another element, the element may be "directly" located "on" or "under" the another element, or there may be an intermediate element.

Although implementation modes disclosed in the present disclosure are as above, the described contents are only implementation modes used for convenience of understanding the present disclosure and are not intended to limit the present disclosure. Any person skilled in the art to which the present disclosure pertains may make any modification and variation in implementation forms and details without departing from the spirit and scope disclosed in the present disclosure. However, the scope of patent protection of the present disclosure is still subject to the scope defined in the appended claims.

The invention claimed is:

1. A display substrate, comprising a display region and a non-display region, wherein;

the display substrate comprises: a base substrate and a circuit structure layer disposed on the base substrate, the circuit structure layer comprises: a plurality of pixel circuits arranged in an array and located in the display region and a plurality of drive circuits located in the non-display region; at least one pixel circuit comprises a plurality of transistors, the plurality of drive circuits are configured to provide drive signals to the plurality of transistors;

the circuit structure layer further comprises: a high-level power supply line and a low-level power supply line located in the non-display region, at least one drive circuit is electrically connected with the high-level power supply line and the low-level power supply line respectively, and the high-level power supply line and the low-level power supply line extend along a first direction;

high-level power supply lines connected with at least two drive circuits are a same power supply line and/or low-level power supply lines connected with at least two drive circuits are a same power supply line;

the circuit structure layer comprises: a semiconductor layer, a first insulation layer, a first conductive layer, a second insulation layer, a second conductive layer, a third insulation layer, a third conductive layer, a fourth insulation layer, and a fourth conductive layer that are sequentially stacked on the base substrate;

the high-level power supply line and the low-level power supply line are located in the third conductive layer and/or the fourth conductive layer;

the plurality of transistors comprise: a writing transistor, a compensation transistor, and a light emitting transistor, and the plurality of drive circuits comprise: a light emitting drive circuit and a control drive circuit; the light emitting drive circuit is configured to provide a drive signal to the light emitting transistor, and the control drive circuit is configured to provide a drive signal to the writing transistor and/or the compensation transistor; and a high-level power supply line connected with the light emitting drive circuit and a high-level power supply line connected with the control drive circuit are a same power supply line and/or a low-level power supply line connected with the light emitting drive circuit and a low-level power supply line connected with the control drive circuit are a same power supply line.

2. The display substrate according to claim 1, wherein the display region comprises: a first side and a second side disposed opposite to each other, and at least one drive circuit is located on the first side and/or the second side of the display region;

the plurality of drive circuits extend along a second direction, and the first direction intersects with the second direction.

3. The display substrate according to claim 1, wherein the circuit structure layer further comprises: a fifth insulation layer and a fifth conductive layer;

the fifth insulation layer and the fifth conductive layer are located between the second conductive layer and the third insulation layer, and the fifth insulation layer is located on a side of the fifth conductive layer close to the base substrate.

4. The display substrate according to claim 1, wherein when the high-level power supply line connected with the light emitting drive circuit and the high-level power supply line connected with the control drive circuit are the same power supply line, an orthographic projection of the high-level power supply line on the base substrate is at least partially overlapped with an orthographic projection of the light emitting drive circuit or the control drive circuit on the base substrate, or is located between the light emitting drive circuit and the control drive circuit.

5. The display substrate according to claim 1, wherein when the low-level power supply line connected with the light emitting drive circuit and the low-level power supply line connected with the control drive circuit are the same power supply line, an orthographic projection of the low-level power supply line on the base substrate is at least partially overlapped with an orthographic projection of the light emitting drive circuit or the control drive circuit on the base substrate, or is located between the light emitting drive circuit and the control drive circuit.

6. The display substrate according to claim 1, wherein the light emitting drive circuit is located on a side of the control drive circuit away from the display region;

the circuit structure layer further comprises: a light emitting initial signal line, a plurality of light emitting clock signal lines, a control initial signal line, and a plurality of control clock signal lines which are located in the non-display region and extending along the first direction; the light emitting drive circuit is electrically connected with the light emitting initial signal line and the plurality of light emitting clock signal lines respectively, and the control drive circuit is electrically connected with the control initial signal line and the plurality of control clock signal lines respectively;

the light emitting initial signal line and the plurality of light emitting clock signal lines are located on a side of the control initial signal line and the plurality of control clock signal lines away from the display region, and the light emitting initial signal line is located on a side of the plurality of light emitting clock signal lines close to or away from the display region; and the control initial signal line is located on a side of the plurality of control clock signal lines close to the display region or away from the display region.

7. The display substrate according to claim 6, wherein the light emitting drive circuit comprises a plurality of light emitting transistors and a plurality of light emitting capacitors, and the control drive circuit comprises a plurality of control transistors and a plurality of control capacitors;

the first conductive layer comprises: gate electrodes of the plurality of light emitting transistors, gate electrodes of the plurality of control transistors, first electrode plates of the plurality of light emitting capacitors, and first electrode plates of the plurality of control capacitors;

the second conductive layer comprises: second electrode plates of the plurality of light emitting capacitors and second electrode plates of the plurality of control capacitors;

the third conductive layer comprises: source-drain electrodes of the plurality of light emitting transistors and source-drain electrodes of the plurality of control transistors;

the fourth conductive layer comprises a light emitting initial signal line, at least one light emitting clock signal line, a control initial signal line, and at least one control clock signal line.

8. The display substrate according to claim 1, wherein the plurality of transistors comprise: a writing transistor, a first reset transistor, a compensation transistor, and a light emitting transistor, transistor types of the first reset transistor and the compensation transistor are different from transistor types of the writing transistor and the light emitting transistor, the plurality of drive circuits comprise: a light emitting drive circuit, a scan drive circuit, and a control drive circuit; the light emitting drive circuit is configured to provide a drive signal to the light emitting transistor, the control drive circuit is configured to provide a drive signal to the writing transistor, and the scan drive circuit is configured to provide a drive signal to the first reset transistor and/or the compensation transistor;

high-level power supply lines connected with at least two adjacent drive circuits in the light emitting drive circuit, the scan drive circuit, and the control drive circuit are a same power supply line and/or low-level power supply lines connected with at least two adjacent drive circuits in the light emitting drive circuit, the scan drive circuit, and the control drive circuit are a same power supply line.

9. The display substrate according to claim 8, wherein when the high-level power supply lines connected with two adjacent drive circuits in the light emitting drive circuit, the scan drive circuit, and the control drive circuit are the same power supply line, an orthographic projection of the high-level power supply line on the base substrate is partially overlapped with an orthographic projection of one of the drive circuits connected with the high-level power supply line on the base substrate, or is located between the connected two adjacent drive circuits;

or, when high-level power supply lines connected with the light emitting drive circuit, the scan drive circuit, and the control drive circuit are a same power supply line, an orthographic projection of the high-level power supply line on the base substrate is partially overlapped with an orthographic projection of one of the drive circuits with which the high-level power supply line is connected on the base substrate, or is located between two adjacent drive circuits.

10. The display substrate according to claim 8, wherein when the low-level power supply lines connected with two adjacent drive circuits in the light emitting drive circuit, the scan drive circuit, and the control drive circuit are the same power supply line, an orthographic projection of the low-level power supply line on the base substrate is partially overlapped with an orthographic projection of one of the drive circuits connected with the low-level power supply line on the base substrate, or is located between the connected two adjacent drive circuits;

or, when low-level power supply lines connected with the light emitting drive circuit, the scan drive circuit, and the control drive circuit are a same power supply line, an orthographic projection of the low-level power supply line on the base substrate is partially overlapped with an orthographic projection of one of the drive circuits with which the low-level power supply line is connected on the base substrate, or is located between two adjacent drive circuits.

11. The display substrate according to claim 8, wherein the light emitting drive circuit is located on a side of the scan drive circuit away from the display region, and the control drive circuit is located on a side of the scan drive circuit close to the display region;

the circuit structure layer further comprises a light emitting initial signal line, a plurality of light emitting clock signal lines, a control initial signal line, a plurality of control clock signal lines, a scan initial signal line, and a plurality of scan clock signal lines which are located in the non-display region and extending along the first direction; the light emitting drive circuit is electrically connected with the light emitting initial signal line and the plurality of light emitting clock signal lines respectively, the control drive circuit is electrically connected with the control initial signal line and the plurality of control clock signal lines respectively, and the scan drive circuit is electrically connected with the scan initial signal line and the plurality of scan clock signal lines respectively;

the light emitting initial signal line and the plurality of light emitting clock signal lines are located on a side of the scan initial signal line and the plurality of scan clock signal lines away from the display region, and the light emitting initial signal line is located on a side of the plurality of light emitting clock signal lines close to the display region or away from the display region;

the control initial signal line and the plurality of control clock signal lines are located on a side of the scan initial signal line and the plurality of scan clock signal lines close to the display region, and the control initial signal line is located on a side of the plurality of control clock signal lines close to the display region or away from the display region; and the scan initial signal line is located on a side of the plurality of scan clock signal lines close to the display region or away from the display region.

12. The display substrate according to claim 11, wherein the light emitting drive circuit comprises a plurality of light emitting transistors and a plurality of light emitting capacitors, the scan drive circuit comprises a plurality of scan transistors and a plurality of scan capacitors, and the control drive circuit comprises a plurality of control transistors and a plurality of control capacitors;

the first conductive layer comprises: gate electrodes of the plurality of light emitting transistors, gate electrodes of the plurality of scan transistors, gate electrodes of the plurality of control transistors, first electrode plates of the plurality of light emitting capacitors, first electrode plates of the plurality of scan capacitors, and first electrode plates of the plurality of control capacitors;

the second conductive layer comprises: second electrode plates of the plurality of light emitting capacitors, second electrode plates of the plurality of scan capacitors, and second electrode plates of the plurality of control capacitors;

the third conductive layer comprises: source-drain electrodes of the plurality of light emitting transistors, source-drain electrodes of the plurality of scan transistors, and source-drain electrodes of the plurality of control transistors; and the fourth conductive layer comprises: a light emitting initial signal line, at least one light emitting clock signal line, a scan initial signal line, at least one scan clock signal line, a control initial signal line, and at least one control clock signal line.

13. The display substrate according to claim 1, wherein the plurality of transistors comprise: a writing transistor, a compensation transistor, a first reset transistor, a second reset transistor, and a light emitting transistor; the plurality of drive circuits comprise a light emitting drive circuit, a first reset drive circuit, a second reset drive circuit, and a control drive circuit; the light emitting drive circuit is configured to provide a drive signal to the light emitting transistor, the control drive circuit is configured to provide a drive signal to the writing transistor and/or the compensation transistor, the first reset drive circuit is configured to provide a drive signal to the first reset transistor, and the second reset drive circuit is configured to provide a drive signal to the second reset transistor; and high-level power supply lines connected with at least two adjacent drive circuits in the light emitting drive circuit, the first reset drive circuit, the second reset drive circuit, and the control drive circuit are a same power supply line and/or low-level power supply lines connected with at least two adjacent drive circuits in the light emitting drive circuit, the first reset drive circuit, the second reset drive circuit, and the control drive circuit are a same power supply line.

14. The display substrate according to claim 13, wherein when the high-level power supply lines connected with two adjacent drive circuits in the light emitting drive circuit, the first reset drive circuit, the second reset drive circuit, and the control drive circuit are the same power supply line, an orthographic projection of the high-level power supply line on the base substrate is partially overlapped with an orthographic projection of one of the drive circuits connected with the high-level power supply line on the base substrate, or is located between the connected two adjacent drive circuits;

or, when high-level power supply lines connected with at least three adjacent drive circuits in the light emitting drive circuit, the first reset drive circuit, the second reset drive circuit, and the control drive circuit are a same power supply line, an orthographic projection of the high-level power supply line on the base substrate is partially overlapped with an orthographic projection of one of the drive circuits with which the high-level power supply line is connected on the base substrate, or is located between two adjacent drive circuits.

15. The display substrate according to claim 13, wherein when the low-level power supply lines connected with two adjacent drive circuits in the light emitting drive circuit, the first reset drive circuit, the second reset drive circuit, and the control drive circuit are the same power supply line, an orthographic projection of the low-level power supply line on the base substrate is partially overlapped with an orthographic projection of one of the drive circuits connected with the low-level power supply line on the base substrate, or is located between the connected two adjacent drive circuits;

or, when low-level power supply lines connected with at least three adjacent drive circuits in the light emitting drive circuit, the first reset drive circuit, the second reset drive circuit, and the control drive circuit are a same power supply line, an orthographic projection of the low-level power supply line on the base substrate is partially overlapped with an orthographic projection of one of the drive circuits with which the low-level power supply line is connected on the base substrate, or is located between two adjacent drive circuits.

16. The display substrate according to claim 13, wherein the light emitting drive circuit is located on a side of the control drive circuit away from the display region, the first reset drive circuit is located between the light emitting drive circuit and the control drive circuit, and the second reset drive circuit is located on a side of the control drive circuit close to the display region;

the circuit structure layer further comprises a light emitting initial signal line, a plurality of light emitting clock signal lines, a control initial signal line, a plurality of control clock signal lines, a first reset initial signal line, a plurality of first reset clock signal lines, a second reset initial signal line, and a plurality of second reset clock signal lines which are located in the non-display region and extending along the first direction; the light emitting drive circuit is respectively electrically connected with the light emitting initial signal line and the plurality of light emitting clock signal lines, the control drive circuit is respectively electrically connected with the control initial signal line and the plurality of control clock signal lines, the first reset drive circuit is respectively electrically connected with the first reset initial signal line and the plurality of first reset clock signal lines, and the second reset drive circuit is respectively electrically connected with the second reset initial signal line and the plurality of second reset clock signal lines;

the light emitting initial signal line and the plurality of light emitting clock signal lines are located on a side of the first reset initial signal line and the plurality of first reset clock signal lines away from the display region, and the light emitting initial signal line is located on a side of the plurality of light emitting clock signal lines close to the display region or away from the display region;

the first reset initial signal line and the plurality of first reset clock signal lines are located on a side of the control initial signal line and the plurality of control clock signal lines close to the display region, and the first reset initial signal line is located on a side of the plurality of first reset clock signal lines close to the display region or away from the display region;

the control initial signal line and the control clock signal lines are located on a side of the second reset initial signal line and the plurality of second reset clock signal lines away from the display region, and the control initial signal line is located on a side of the plurality of control clock signal lines close to the display region or away from the display region; and the second reset initial signal line is located on a side of the plurality of second reset clock signal lines close to the display region or away from the display region.

17. The display substrate according to claim 16, wherein the light emitting drive circuit comprises: a plurality of light emitting transistors and a plurality of light emitting capacitors, the scan drive circuit comprises a plurality of scan transistors and a plurality of scan capacitors, the first reset drive circuit comprises a plurality of first reset transistors and a plurality of first reset capacitors, and the second reset drive circuit comprises a plurality of second reset transistors and a plurality of second reset capacitors;

the first conductive layer comprises: gate electrodes of the plurality of light emitting transistors, gate electrodes of the plurality of control transistors, gate electrodes of the plurality of first reset transistors, gate electrodes of the plurality of second reset transistors, first electrode plates of the plurality of light emitting capacitors, first electrode plates of the plurality of control capacitors, first electrode plates of the plurality of first reset capacitors, and first electrode plates of the plurality of second reset capacitors;

the second conductive layer comprises: second electrode plates of the plurality of light emitting capacitors, second electrode plates of the plurality of control capacitors, second electrode plates of the plurality of first reset capacitors, and second electrode plates of the plurality of second reset capacitors;

the third conductive layer comprises source-drain electrodes of the plurality of light emitting transistors, source-drain electrodes of the plurality of control transistors, source-drain electrodes of the plurality of first reset transistors, and source-drain electrodes of the plurality of second reset transistors; and the fourth conductive layer comprises a light emitting initial signal line, at least one light emitting clock signal line, a control initial signal line, at least one control clock signal line, a first reset initial signal line, at least one first reset clock signal line, a second reset initial signal line, and at least one second reset clock signal line.

18. A display apparatus, comprising a display substrate according to claim 1.

* * * * *